(12) United States Patent
Shimizu et al.

(10) Patent No.: US 6,866,193 B1
(45) Date of Patent: Mar. 15, 2005

(54) PURCHASED COMMODITY ACCOMMODATING AND TRANSPORTING APPARATUS HAVING ELEMENTS FOR PURCHASING A COMMODITY FIXED TO A TRANSPORTABLE ACCOMMODATION SECTION

(75) Inventors: Chizu Shimizu, Kawasaki (JP); Kazuhito Sakai, Kawasaki (JP); Chizuo Suzuki, Kawasaki (JP); Kaoru Kikuchi, Hachioji (JP); Kyouko Terada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/792,468

(22) Filed: Jan. 31, 1997

Related U.S. Application Data

(60) Continuation of application No. 08/526,091, filed on Sep. 11, 1995, now abandoned, which is a division of application No. 08/274,041, filed on Jul. 12, 1994, now Pat. No. 5,898,158.

(30) Foreign Application Priority Data

Nov. 18, 1993  (JP) .............................................. 5-289324

(51) Int. Cl.⁷ .............................................. G06K 15/00
(52) U.S. Cl. ........................ 235/383; 235/385; 186/61; 186/62
(58) Field of Search ................................ 235/383, 385; 186/61, 62

(56) References Cited

U.S. PATENT DOCUMENTS

| | | | | |
|---|---|---|---|---|
| 3,836,755 A | * | 9/1974 | Ehrat ........................ | 235/383 |
| 3,878,365 A | | 4/1975 | Schwartz | |
| 4,071,740 A | * | 1/1978 | Gogulski .................... | 235/431 |
| 4,929,819 A | * | 5/1990 | Collins, Jr. ............. | 235/383 X |
| 5,149,947 A | * | 9/1992 | Collins, Jr. ............. | 235/383 X |
| 5,250,789 A | * | 10/1993 | Johnsen ...................... | 235/383 |
| 5,412,193 A | * | 5/1995 | Swartz et al. ............... | 235/383 |
| 5,418,354 A | * | 5/1995 | Halling et al. ............. | 235/383 |
| 5,426,423 A | * | 6/1995 | Raimbault et al. ...... | 235/383 X |

FOREIGN PATENT DOCUMENTS

| | | | |
|---|---|---|---|
| DE | 2139889 | * | 2/1973 |
| DE | 2-139-889 | | 2/1973 |
| DE | 3940605 | * | 6/1991 |

(List continued on next page.)

OTHER PUBLICATIONS

Copy of European Patent Office Communication including European Search Report for corresponding European Patent Application No. 00107973.0–1238, dated Nov. 26, 2002.
Copy of European Patent Office Communication including European Search Report for corresponding European Patent Application No. 00107974.8–1238 dated Nov. 19, 2002.
Copy of Korean Patent Notification of Reasons for Rejection for corresponding Korean Patent Application No. 10–1994–0018707 dated Mar. 31, 1999.

(List continued on next page.)

*Primary Examiner*—Michael G. Lee
*Assistant Examiner*—Daniel Hess
(74) *Attorney, Agent, or Firm*—Armstrong, Kratz, Quintos, Hanson & Brooks, LLP

(57) ABSTRACT

Unjust acts such as carrying out a commodity without reading a commodity code, whether it is intentional or accidental are prevented. The purchased commodity accommodating and transporting apparatus may include a commodity code reading section for reading a commodity code applied to a commodity and a transportable accommodation section for accommodating therein a commodity whose commodity code has been read. Further, elements for purchasing a commodity (such as a section for receiving a prepaid card, a credit card, a bank card or a similar card) may be fixed to said transportable accommodation section to allow a customer to perform purchasing operations during selection of a commodity when shopping.

12 Claims, 31 Drawing Sheets

FOREIGN PATENT DOCUMENTS

| | | | |
|---|---|---|---|
| DE | 39-40-605 A | | 6/1991 |
| EP | 0-178-223 | | 4/1986 |
| EP | 0178223 | * | 4/1986 |
| EP | 0 443 407 | | 8/1991 |
| EP | 0 513 456 | | 11/1992 |
| FR | 2 659 464 | | 9/1991 |
| GB | 1-267-630 | | 3/1972 |
| GB | 1267630 | * | 3/1972 |
| JP | 52-132651 | | 11/1977 |
| JP | 58-96367 | | 6/1983 |
| JP | 63-36119 | | 2/1988 |
| JP | 63-145591 | | 6/1988 |
| JP | 63-223998 | | 9/1988 |
| JP | 2-76097 | | 3/1990 |
| JP | 2-277412 | | 11/1990 |
| JP | 3-232079 | | 10/1991 |
| JP | 4-3294 | | 1/1992 |
| JP | 4-293198 | | 10/1992 |
| JP | 4-317194 | | 11/1992 |
| JP | 5-108954 | | 4/1993 |
| JP | 5108954 | * | 4/1995 |
| NL | 8800907 | | 11/1989 |

OTHER PUBLICATIONS

"Plus De Manipulation Ni D'Attente Aux Caisses Des Supermarchés", *Science & Vie,* No. 884, May 1991, p. 126.

XP 002013065, "Grocery Buggy", *IBM Technical Disclosure Bulletin,* vol. 31, No. 6, Nov. 1988, pp. 399–400.

XP 000308880, "Portable Self–Checkout Retail System", *IBM Technical Disclosure Bulletin,* vol. 35, No. 1A, Jun. 1992, pp. 315–318.

* cited by examiner

| XX(MONTH) XX(DAY) XX(YEAR) | | PM 2:30 | |
| --- | --- | --- | --- |
| | | MEMBERSHIP NO.XXXX | |
| 533 | TOFU | 2 | ¥222 |
| 532 | CHEESE | 1 | ¥399 |
| 511 | GREEN BASIL DRESSING | 1 | ¥168 |
| 511 | DRESSING | 1 | ¥178 |
| 524 | HACKBERRY MUSHROOM | 1 | ¥280 |
| TOTAL | | 6 | ¥1,247 |
| CONSUMPTION TAX | | | ¥37 |
| GRAND TOTAL | | | ¥1,284 |

[↑]  [↓]   [END]  [CANCEL]

PURCHASED COMMODITY ACCOMMODATING AND TRANSPORTING APPARATUS HAVING ELEMENTS FOR PURCHASING A COMMODITY FIXED TO A TRANSPORTABLE ACCOMMODATION SECTION

This application is a file wrapper continuation of application Ser. No. 08/526,091 filed Sep. 11, 1995, now abandoned, which is a Division of Ser. No. 08/274,041, filed Jul. 12, 1994, now U.S. Pat. No. 5,898,158, issued Apr. 27, 1999.

BACKGROUND OF THE INVENTION

1) Field of the Invention

This invention relates to a purchased commodity accommodating and transporting apparatus such as a shopping cart (hand cart) or a shopping basket for use in the distribution industry, particularly in a store such a mass sales store, a convenience store or a supermarket to allow a customer to accommodate and transport a purchased commodity, and more particularly to a purchased commodity accommodating and transporting apparatus having a self scanning function to allow a customer to purchase a commodity while the customer reads a commodity code such as a bar code, attached to the commodity and also to a POS (Point Of Sales) system to which such purchased commodity accommodating and transporting apparatus having a self scanning function is applied.

2) Description of the Related Art

Generally, a POS system is employed in various stores such as supermarkets and convenience stores. In the POS system, a customer walks around in a store pushing a shopping cart or carrying a shopping basket, places commodities to be purchased into the shopping cart or the shopping basket, and comes to a settlement POS terminal (POS register).

Then at the settlement POS terminal, an operator takes out the commodities one by one from the shopping cart or the shopping basket and reads the bar codes (commodity codes) applied to the commodities by means of a scanner to effect registration processing. In particular, in accordance with commodity code information read from each bar code, the price of the commodity corresponding to the commodity code is retrieved from a commodity price file (PLU (Price Look Up) file), and a total amount of money of the purchased commodities is calculated to settle the accounts.

With such POS system, however, since an operator must perform a reading operation of a commodity code of each commodity, much time is required for such reading operation and a settling operation, which causes the customer to wait for a long time. Accordingly, in a time band in which customers are crowded, a queue of customers is produced in front of a settlement POS terminal, and additionally, produces a heavy burden on the operator Thus, in recent years, a shopping cart (scanning cart) or a shopping basket having a scanner (commodity code reading section) for reading a bar code (commodity code) applied to a commodity has been developed and are disclosed in various publications including, for example, Japanese Patent Laid-Open Applications No. Showa 63-145591, No. Heisei 2-277412 and No. Heisei 5-81559.

In a POS system which employs a shopping cart or a shopping basket of the type mentioned, a customer reads a bar code applied to a commodity to be purchased by means of the scanner to register the commodity code information and places or accommodates the commodity into an accommodating section of the shopping cart or the shopping basket. Thereafter after selection of commodities to be purchased is completed, the commodities are placed into the shopping cart or the shopping basket and transported to a settlement POS terminal.

Then at the settlement POS terminal, the commodity code information (or commodity price information corresponding to the commodity code information) registered by the customer is down loaded, and a total amount of money of the purchased commodities is calculated based on the commodity code information (commodity price information) to effect settlement of the accounts.

With the POS system, an operator no longer needs to read the commodity codes of commodities one by one, and the time (register operation time) required for reading, processing and settling processing can be reduced significantly. Consequently, the customer no longer needs to wait for a long time any more and also the burden on the operator can be reduced remarkably.

In the POS system wherein an operator performs a reading operation for a commodity code to register the commodity, commodity registration of all of commodities accommodated in a shopping cart or a shopping basket is performed upon settlement of accounts. Accordingly, unless an intentional unjust act (shoplifting or the like) is performed, taking out a commodity without settlement of accounts can be prevented.

Additionally, conventional purchased commodity accommodating and transporting apparatuses, having a self scanning function described above or POS systems which employ such an apparatus do not include established means for detecting whether or not all commodities accommodated in a shopping cart or a shopping basket have been registered for commodity registration (the commodity codes haven been read), and the countermeasure against the case wherein a customer has placed a commodity into a shopping cart or a shopping basket without reading the commodity code by means of the scanner is not sufficient in the present situation.

For example, even if a customer fails to read a commodity code by means of the scanner, the commodity can be accommodated as it is, and an operator may possibly settle the accounts without being aware of such commodity. Accordingly, an unjust act such as shoplifting can be performed readily regardless of whether it is intentional or accidental.

In order to prevent such unjust acts, means have been proposed for causing, when a commodity code is read by means of a scanner, the color of the commodity code to be changed or for jetting colored ink to an area of the commodity code to clearly indicate that reading of the commodity code has been completed.

With the means, however, the color change condition or the application condition of ink must be checked, upon settlement of accounts, for the commodity codes of all commodities, and the burden on an operator cannot be reduced. Further, when one tries to return a commodity for which reading of the commodity code has been performed having intruded to purchase the commodity, the commodity code cannot be returned immediately to its condition before such reading, and a shopman must perform re-attachment of a commodity code (bar code) or a like operation. Further, the means which employs jetting of colored ink is not preferable in terms of sanitation where the commodity is food or the like.

Furthermore, in a conventional purchased commodity accommodating and transporting apparatus having a self scanning function described above or a POS system which employs the apparatus, since a final settling operation of accounts by an operator must be performed with a settlement POS terminal, a customer must wait for some interval of time at the settlement POS terminal, which imposes a burden on the operator. Therefore, it is desired to allow operations up to final settlement of accounts to be performed with each purchased commodity accommodating and transporting apparatus, while preventing an unjust act, to achieve a reduction of the burden on an operator, a reduction of the number of operators and smoothing the flow of customers.

SUMMARY OF THE INVENTION

It is an object of the present invention to provide a purchased commodity accommodating and transporting apparatus having a self scanning function and a POS system which prevents an unjust act such as carrying out a commodity without reading a commodity code (commodity registration) whether it is intentional or accidental.

It is another object of the present invention to provide a purchased commodity accommodating and transporting apparatus having a self scanning function and a POS system which allows operations up to final settlement of accounts to be performed by self service to achieve a reduction of the burden to an operator and a reduction of the number of operators and to provide agreeable shopping for a customer without any waiting time.

In order to attain the objects described above, according to an aspect of the present invention, there is provided a purchased commodity accommodating and transporting apparatus having a self scanning function, which comprises a commodity code reading section for reading a commodity code applied to a commodity, an accommodation section for accommodating therein a commodity whose commodity code has been read by the commodity code reading section, a weighing equipment for measuring the total weight of commodities accommodated in the accommodation section, a weight determination section for detecting the variation of the total weight of the commodities in the accommodation section measured by the weighing equipment, and an alarm generation section for generating an alarm when it is determined by the weight determination section that the total weight of the commodities in the accommodation section measured by the weighing equipment has changed without reading a commodity code by the commodity code reading section.

The purchased commodity accommodating and transporting apparatus may further comprise an alarm cancellation section for cancelling the alarm generated from the alarm generation section when it is determined by the weight determination section that the total weight of the commodities in the accommodation section, which changed without reading a commodity code by the commodity code reading section, has returned to its original weight before the change.

With the purchased commodity accommodating and transporting apparatus having a self scanning function, when it is determined by the weight determination section that the total weight of commodities in the accommodation section has changed without scanning a commodity code, an alarm is immediately generated there to give a warning to the customer. Consequently, such an unjust act as to carry out a commodity without reading a commodity code whether it is intentional or accidental can be prevented with certainty without giving a disagreeable feeling to the customer.

According to another aspect of the present invention, there is provided a POS system which comprises a plurality of purchased commodity accommodating and transporting apparatus having a self scanning function and each including a commodity code reading section for reading a commodity code applied to a commodity, and an accommodation section for accommodating therein a commodity whose commodity code has been read by the commodity code reading section, and a management section for managing the purchased commodity accommodating and transporting apparatus, each of the purchased commodity accommodating and transporting apparatus including a weighing equipment for measuring the total weight of commodities accommodated in the accommodation section, a weight determination section for detecting the variation of the total weight of the commodities in the accommodation section measured by the weighing equipment, an alarm generation section for generating an alarm when it is determined by the weight determination section that the total weight of the commodities in the accommodation section measured by the weighing equipment has changed without reading a commodity code by the commodity code reading section, a timer for counting an alarm generation time by the alarm generation section, a timer determination section for determining whether or not the counted time by the timer reaches a predetermined time, and an error transmission section for transmitting, when it is determined by the timer determination section that the counted time by the timer has reached the predetermined time, unique information of the purchased commodity accommodating and transporting apparatus as error information to the management section.

The management section may include an error reception section for receiving the error information from the error transmission section of any of the purchased commodity accommodating and transporting apparatus, an error display section for displaying, when the error information is received by the error reception section, the unique information of one of the purchased commodity accommodating and transporting apparatus from which the error information has been transmitted, and an error cancellation section for cancelling the display of the unique information of the one purchased commodity accommodating and transporting apparatus on the error display section when a countermeasure for the one purchased commodity accommodating and transporting apparatus, from which the error information has been transmitted, is completed.

With the POS system, if a customer ignores such an alarm as described above and does not take out the commodity for which scanning has not been performed, then the unique information of the purchased commodity accommodating and transporting apparatus with which the unjust act has been performed is transmitted as error information to and displayed on the management section. Consequently, some countermeasure can be taken immediately for the customer who has conducted the unjust act.

According to a further aspect of the present invention, there is provided a purchased commodity accommodating and transporting apparatus having a self scanning function, which comprises a commodity code reading section for reading a commodity code applied to a commodity, an accommodation section for accommodating therein a commodity whose commodity code has been read by the commodity code reading section, a weighing equipment for measuring the total weight of commodities accommodated in the accommodation section, a commodity weight retrieval section for retrieving the weight of a commodity in accordance with the commodity code information read by the commodity code reading section, a weight comparison section for comparing the weight of the commodity retrieved by the commodity weight retrieval section and the increment of the total weight of the commodities in the accommodation section after reading of the commodity code information measured by the weighing equipment, and an alarm generation section for generating an alarm when it is determined by the weight comparison section that the weight of the commodity retrieved by the commodity weight retrieval section and the increment of the total weight of the commodities in the accommodation section after reading of the commodity code measured by the weighing equipment are different from each other.

The purchased commodity accommodating and transporting apparatus may further comprise a weight determination section for detecting the variation of the total weight of the commodities in the accommodation section measured by the weighing equipment, and wherein the alarm generation section generates an alarm when it is determined by the weight determination section that the total weight of the commodities in the accommodation section measured by the weighing equipment has changed without reading a commodity code by the commodity code reading section.

According to a still further aspect of the present invention, there is provided a POS system which comprises a plurality of purchased commodity accommodating and transporting apparatus having a self scanning function and each including a commodity code reading section for reading a commodity code applied to a commodity, a commodity code registration section for registering the commodity code information read by the commodity code reading section, and an accommodation section for accommodating therein a commodity whose commodity code has been read by the commodity code reading section, a commodity information file for storing price information of commodities corresponding to the commodity code information as commodity information, and a settlement POS terminal for retrieving the commodity information file in accordance with the commodity code information registered in the commodity code registration section of any of the purchased commodity accommodating and transporting apparatus to perform final settlement of accounts for purchased commodities accommodated in the accommodation section of the purchased commodity accommodating and transporting apparatus, the commodity information file storing weight information of individual commodities corresponding to the commodity code information as commodity information, each of the purchased commodity accommodating and transporting apparatus including a weighing equipment for measuring the total weight of commodities accommodated in the accommodation section, and a data transmission section for transmitting, upon settlement of accounts at the settlement POS terminal, the total weight of the commodities in the accommodation section measured by the weighing equipment to the settlement POS terminal, the settlement POS terminal including a data reception section for receiving data from the data transmission section of any of the purchased commodity accommodating and transporting apparatus, a commodity weight retrieval section for retrieving the weights of the commodities corresponding to the commodity code information from the commodity information file in accordance with the commodity code information of all commodities registered by the commodity code registration section, a total weight calculation section for calculating the total weight of the weights of the commodities retrieved by the commodity weight retrieval section, a weight comparison section for comparing the total weight calculated by the total weight calculation section and the total weight of the commodities in the accommodation section received by the data reception section, and an alarm generation section for generating an alarm when it is determined by the weight comparison section that the total weight calculated by the total weight calculation section and the total weight of the commodities in the accommodation section received by the data reception section are different from each other.

Each of the purchased commodity accommodating and transporting apparatus may include a weight determination section for detecting the variation of the total weight of the commodities in the accommodation section measured by the weighing equipment, and an alarm generation section for generating an alarm when it is determined by the weight determination section that the total weight of the commodities in the accommodation section measured by the weighing equipment has changed without reading a commodity code by the commodity code reading section.

With the purchased commodity accommodating and transporting apparatus having a self scanning function and the POS system, when it is determined that an actual increment in weight and the weight corresponding to commodity code information are different from each other, or when it is determined that the total weight calculated in accordance with the commodity code information and the total weight of the commodities actually measured by the weighing equipment a re different from each other, an error is notified. Consequently, such an intentional unjust act as to register a single commodity and accommodate a plurality of commodities at a time into the accommodation or to accommodate a commodity into the accommodation section without registering the same and such an accidental unjust act as a miss of scanning or an error in scanning can be detected. Accordingly, those unjust acts can be prevented with certainty. Further, the safety equivalent to that of a conventional POS system, in which settlement of accounts is performed by a scanning operation of an operator, can be provided to the store side which adopts the present POS system, and better services can be provided to the store side and customers.

According to a yet further aspect of the present invention, there is provided a purchased commodity accommodating and transporting apparatus having a self scanning function, which comprises a commodity code reading section for reading a commodity code applied to a commodity, a commodity code registration section for registering the commodity code information read by the commodity code reading section, an accommodation section for accommodating therein a commodity whose commodity code has been read by the commodity code reading section, the commodity code reading section being used to read, upon settlement of accounts, the commodity code of a commodity selected at random from the commodities accommodated in the accommodation section, a commodity registration determination section for determining whether or not the commodity code information read by the commodity code reading section upon settlement of accounts is registered in the commodity code registration section, and an error notification section for notifying an error when it is determined by the commodity registration determination section upon settlement of accounts that the commodity code information read by the commodity code reading section is not registered.

According to a yet further aspect of the present invention, there is provided a purchased commodity accommodating and transporting apparatus having a self scanning function, which comprises a commodity code reading section for reading a commodity code applied to a commodity, a commodity code registration section for registering the commodity code information read by the commodity code reading section, an accommodation section for accommodating therein a commodity whose commodity code has been read by the commodity code reading section, the commodity code reading section being used to read, upon settlement of accounts, the commodity code of a commodity selected at random from the commodities accommodated in the accommodation section, and a commodity registration determination section for determining whether or not the commodity code information read by the commodity code reading section upon settlement of accounts is registered in the commodity code registration section, the commodity code registration section automatically registering the commodity code information read by the commodity code reading section when it is determined upon settlement of accounts by the commodity registration determination section that the commodity code information is not registered.

The purchased commodity accommodating and transporting apparatus may further comprise an error notification section for notifying an error when it is determined upon settlement of accounts by the commodity registration determination section that the commodity code information read by the commodity code reading section is not registered.

With the purchased commodity accommodating and transporting apparatus having a self scanning function, if a commodity which has been accommodated into the accommodation section without scanning the commodity code by a customer whether it is intentional or accidental is detected upon settlement of accounts by random scanning checking by an operator, then the unjust act can be notified as an error and the commodity can be automatically registered. Consequently, such an unjust act as shoplifting by a customer can be prevented by a restraining effect on a temptation to an unjust act without imposing a burden on the operator of the settlement POS terminal and without taking such a countermeasure as to change the color of the commodity code, and occurrence of unjust acts upon introduction of a POS system which involves self scanning can be prevented with certainty.

According to a yet further aspect of the present invention, there is provided a POS system which comprises a plurality of purchased commodity accommodating and transporting apparatus having a self scanning function and each including a commodity code reading section for reading a commodity code applied to a commodity, a commodity code registration section for registering the commodity code information read by the commodity code reading section, and an accommodation section for accommodating therein a commodity whose commodity code has been read by the commodity code reading section, and a settlement POS terminal for performing final settlement of accounts for purchased commodities accommodated in the accommodation section of any of the purchased commodity accommodating and transporting apparatus in accordance with the commodity code information registered in the commodity code registration section of the purchased commodity accommodating and transporting apparatus, the settlement POS terminal including a resonance tag detection section for detecting a resonance tag applied in advance to each commodity to detect the number of the commodities accommodated in the accommodation section of any of the purchased commodity accommodating and transporting apparatus, and a commodity number comparison section for comparing the number of the commodities detected by the resonance tag detection section and the number of registered commodities obtained in accordance with the commodity code information registered by the commodity code registration section.

With the purchased commodity accommodating and transporting apparatus having a self scanning function, since the registered number of commodities and the number of actual commodities detected by the resonance tag detection section of the settlement POS terminal are compared with each other and a result of the comparison is notified, presence or absence of a non-registered commodity can be confirmed readily at the settlement POS terminal and notified to the customer. Consequently, occurrence of unjust acts upon introduction of a POS system which involves self scanning can be prevented with certainty.

According to a yet further aspect of the present invention, there is provided a purchased commodity accommodating and transporting apparatus having a self scanning function, which comprises a commodity code reading section for reading a commodity code applied to a commodity, an accommodation section for accommodating therein a commodity whose commodity code has been read by the commodity code reading section, a prepaid card inputting processing section for receiving a prepaid card and reading remains information of the prepaid card, a commodity price retrieval section for retrieving the price of the commodity in accordance with the commodity code information read by the commodity code reading section, and a data updating section for registering a result obtained by subtraction of the price of the commodity retrieved by the commodity price retrieval section from the remains information read by the prepaid card inputting processing section as remains information of the prepaid card to update the remains information.

The purchased commodity accommodating and transporting apparatus may further comprise a notification section for notifying, when the remains read by the prepaid card inputting processing section runs short of the price of the commodity retrieved by the commodity price retrieval section, such shortage, and or a selection section for selecting, when the remains read by the prepaid card inputting processing section runs short of the price of the commodity retrieved by the commodity price retrieval section, whether the purchasing processing is to be continued inserting a second prepaid card into the prepaid card inputting processing section or the purchasing processing is to be ended.

The purchased commodity accommodating and transporting apparatus may further comprise a receipt issuance section for issuing a receipt upon completion of the purchasing, and/or a receipt issuance selection section for selecting whether the issuance of a receipt by the receipt issuance section is necessary or unnecessary.

According to a yet further aspect of the present invention, there is provided a purchased commodity accommodating and transporting apparatus having a self scanning function, which comprises a commodity code reading section for reading a commodity code applied to a commodity, an accommodation section for accommodating therein a commodity whose commodity code has been read by the commodity code reading section, a magnetic card reading section for receiving a credit card or a bank card and reading magnetic information of the card, a commodity price retrieval section for retrieving the price of the commodity in accordance with the commodity code information read by the commodity code reading section, and an automatic clearing processing section for automatically clearing the amount of money corresponding to the price of the commodity retrieved by the commodity price retrieval section from an account corresponding to the magnetic information of the card read by the magnetic card reading section at some other time.

The purchased commodity accommodating and transporting apparatus may further comprise a prepaid card inputting processing section for receiving a prepaid card and reading the remains information of the prepaid card, and a data updating section for registering a result obtained by subtraction of the price of the commodity retrieved by the commodity price retrieval section from the remains information read by the prepaid card inputting processing section as remains information of the prepaid card to update the remains information.

The purchased commodity accommodating and transporting apparatus may further comprise a data reception section for receiving data from a management section, and a power on/off drive section for automatically turning the power source on/off in response to a power on/off instruction received from the management section by way of the data reception section, and/or may further comprise a weighing equipment for measuring the total weight of commodities accommodated in the accommodation section, a weight determination section for detecting the variation of the total weight of the commodities in the accommodation section measured by the weighing equipment, and an alarm generation section for generating an alarm when it is determined by the weight determination section that the total weight of the commodities in the accommodation section measured by the weighing equipment has changed without reading a commodity code by the commodity code reading section.

With the purchased commodity accommodating and transporting apparatus having a self scanning function, since final settlement of accounts can be performed by self service using a prepaid card, a bank card or a credit cart, not only reduction of the burden on an operator and reduction of the number of operators can be achieved, but agreeable shopping free from a waiting time at a settlement POS terminal can be achieved and remarkable reduction of the shopping time and remarkable enhancement in convenience in a self shopping form can be realized.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspects of the Invention

Figure 1:
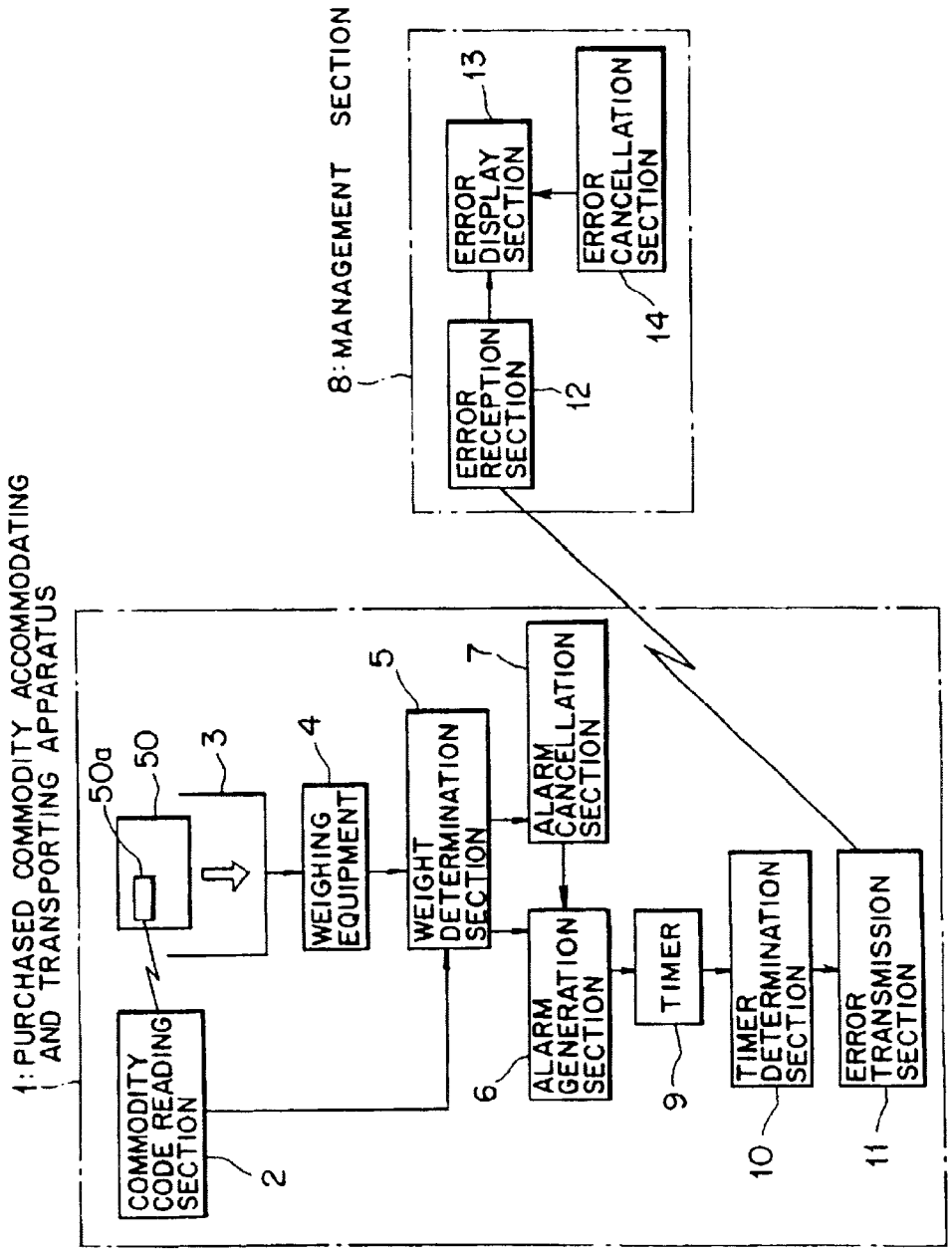
FIGS. 1 to 6 are block diagrams illustrating different aspects of the present invention.

Referring first to FIG. 1, there is illustrated an aspect of the present invention. The aspect illustrated is directed to a POS system which includes a plurality of purchased commodity accommodating and transporting apparatus 1 (only one is shown in FIG. 1) having a self scanning function, and a management section 8 for managing the purchased commodity accommodating and transporting apparatus 1. Each of the purchased commodity accommodating and transporting apparatus 1 includes a commodity code reading section 2 for reading a commodity code 50a applied to a commodity 50 and an accommodation section 3 for accommodating therein a commodity 50 whose commodity code 50a has been read by the commodity code reading section 2. The purchased commodity accommodating and transporting apparatus further includes a weighing equipment 4, a weight determination section 5, an alarm generation section 6, an alarm cancellation section 7, a timer 9, a timer determination section 10, and an error transmission section 11.

The weighing equipment 4 measures the total weight of commodities 50 accommodated in the accommodation section 3, and the weight determination section 5 detects the variation of the total weight of the commodities 50 in the accommodation section 3 measured by the weighing equipment 4.

The alarm generation section 6 generates an alarm when it is determined by the weight determination section 5 that the total weight of the commodities 50 in the accommodation section 3 measured by the weighing equipment 4 has changed without reading a commodity code 50a by the commodity code reading section 2. The alarm cancellation section 7 cancels the alarm generated from the alarm generation section 6 when it is determined by the weight determination section 5 that the total weight of the commodities 50 in the accommodation section 3, which changed without reading a commodity code 50a by the commodity code reading section 2, has returned to its original weight before the change.

The timer 9 counts an alarm generation time by the alarm generation section 6, and the timer determination section 10 determines whether or not the counted time by the timer 9 reaches a predetermined time. The error transmission section 11 transmits, when it is determined by the timer determination section 10 that the counted time by the timer 9 has reached the predetermined time, unique information of the purchased commodity accommodating and transporting apparatus 1 as error information to the management section 8.

Meanwhile, the management section 8 includes an error reception section 12, an error display section 13, and an error cancellation section 14.

The error reception section 12 receives error information from the error transmission section 11 of any of the purchased commodity accommodating and transporting apparatus 1. The error display section 13 displays, when such error information is received by the error reception section 12, the unique information of one of the purchased commodity accommodating and transporting apparatus 1 from which the error information has been transmitted, and the error cancellation section 14 cancels the display of the unique information of the one purchased commodity accommodating and transporting apparatus 1 on the error display section 13 when a countermeasure for the one purchased commodity accommodating and transporting apparatus 1, from which the error information has been transmitted, is completed.

In the POS system and the purchased commodity accommodating and transporting apparatus 1 described above with reference to FIG. 1, while a customer uses the purchased commodity accommodating and transporting apparatus 1 in order to purchase commodities, the total weight of commodities 50 accommodated in the accommodation section 3 of the purchased commodity accommodating and transporting apparatus 1 is measured by the weighing equipment 4, and the variation of the total weight of the commodities 50 in the accommodation section 3 from the weighing equipment 4 is detected by the weight determination section 5.

Then, if it is determined by the weight determination section 5 that the total weight of the commodities 50 in the accommodation section 3 measured by the weighing equipment 4 has changed without reading a commodity code 50a by the commodity code reading section 2, it is determined that the customer has accommodated or taken out a commodity 50 into or from the accommodation section 3 without performing reading (scanning) of the commodity code 50a, and an alarm is generated from the alarm generation section 6.

If it is determined by the weight determination section 5 after generation of the alarm that the total weight has returned to its original weight before the change, then it is determined that the commodity 50 which was accommodated into the accommodation section 3 by the customer without reading the commodity code 50a has been taken out from within the accommodation section 3, and the alarm generated by the alarm generation section 6 is immediately canceled by the alarm cancellation section 7.

On the other hand, when the alarm generated by the alarm generation section 6 is not canceled by the alarm cancellation section 7, the alarm generation time by the alarm generation section 6 is counted by the timer 9, and it is determined by the timer determination section 10 whether or not the counted time by the timer 9 reaches the predetermined time.

If it is determined by the timer determination section 10 that the counted time by the timer 9 reaches the predetermined time, then unique information of the purchased commodity accommodating and transporting apparatus 1 is transmitted as error information to the management section 8 by the error transmission section 11.

Then, on the management section 8 side to which the error information is transmitted, when the error information from the error transmission section 11 of the purchased commodity accommodating and transporting apparatus 1 is received by the error reception section 12, the unique information of the purchased commodity accommodating and transporting apparatus 1 from which the error information has been transmitted is displayed on the error display section 13.

The display of the unique information of the purchased commodity accommodating and transporting apparatus 1 on the error display section 13 continues until after some countermeasure is taken for the purchased commodity accommodating and transporting apparatus 1 from which the error information has been transmitted, and after the countermeasure is taken, the display is canceled by the error cancellation section 14.

With the purchased commodity accommodating and transporting apparatus having a self scanning function and the POS system described above with reference to FIG. 1, the following advantages can be achieved.

1. When it is determined by the weight determination section 5 that the total weight of commodities 50 in the accommodation section 3 has changed without scanning a commodity code 50a, an alarm is immediately generated there to give a warning to the customer. Consequently, such an unjust act as to carry out a commodity without reading a commodity code whether it is intentional or accidental can be prevented with certainty without giving a disagreeable feeling to the customer.

2. If the customer ignores such an alarm as described above and does not take out the commodity 50 for which scanning has not been performed, then the unique information of the purchased commodity accommodating and transporting apparatus 1 with which the unjust act has been performed is transmitted as error information to and displayed on the management section 8. Consequently, some countermeasure can be taken immediately for the customer who has conducted the unjust act.

Figure 2:
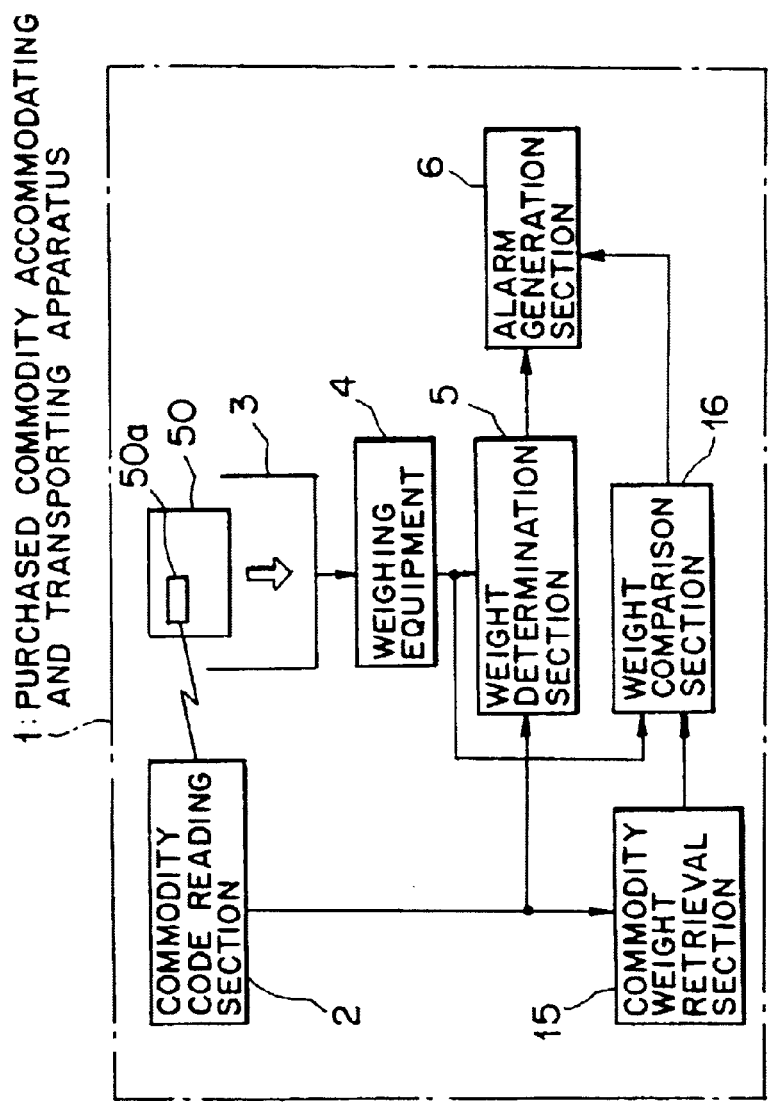

Referring now to FIG. 2, there is illustrated another aspect of the present invention. The aspect illustrated is directed to a purchased commodity accommodating and transporting apparatus 1 having a self scanning function. The purchased commodity accommodating and transporting apparatus 1 comprises a commodity code reading section 2, an accommodating section 3, a weighing equipment 4 and an alarm generation section 6 similar to those shown in FIG. 1. The purchased commodity accommodating and transporting apparatus 1 further comprises a commodity weight retrieval section 15 and a weight comparison section 16.

The commodity weight retrieval section 15 retrieves the weight of a commodity 50 in accordance with the commodity code information read by the commodity code reading section 2, and the weight comparison section 16 compares the weight of the commodity 50 retrieved by the commodity weight retrieval section 15 and the increment of the total weight of the commodities 50 in the accommodation section 3 after reading of the commodity code information measured by the weighing equipment 4.

The alarm generation section 6 generates an alarm when it is determined by the weight comparison section 16 that the weight of the commodity 50 retrieved by the commodity weight retrieval section 15 and the increment of the total weight of the commodities 50 in the accommodation section 3 after reading of the commodity code measured by the weighing equipment 4 are different from each other.

The purchased commodity accommodating and transporting apparatus 1 may further comprise a weight determination section 5 similar to that shown in FIG. 1 such that the alarm generation section 6 generates an alarm when it is determined by the weight determination section 5 that the total weight of the commodities 50 in the accommodation section 3 measured by the weighing equipment 4 has changed without reading a commodity code 50a by the commodity code reading section 2.

With the purchased commodity accommodating and transporting apparatus having a self scanning function described above with reference to FIG. 2, the weight of a commodity 50 is retrieved by the commodity weight retrieval section 15 in accordance with the commodity code information read by the commodity code reading section 2 and the weight of the commodity 50 retrieved by the commodity weight retrieval section 15 and an increment in total weight of the commodities 50 in the accommodation section 3 after reading of the commodity codes measured by the weighing equipment 4 are compared with each other by the weight comparison section 16.

If it is determined by the weight comparison section 16 that the weight of the commodity 50 retrieved by the commodity weight retrieval section 15 and the actual increment in total weight of the commodities 50 in the accommodation section 3 measured by the weighing equipment 4 are different from each other, then it is determined that the customer has accommodated the commodity 50 into the accommodation section 3 without scanning the commodity code 50a or the customer has placed into the accommodation section 3 a different commodity from an actually scanned commodity or some other unjust act has taken place. Consequently, an alarm is generated from the alarm generation section 6.

In this instance, similarly as in the purchased commodity accommodating and transporting apparatus 1 shown in FIG. 1, when it is determined by the weight determination section 5 that the total weight of the commodities 50 in the accommodation section 3 from the weighing equipment 4 has changed without scanning a commodity code 50a by the commodity code reading section 2, an alarm can be generated immediately by the alarm generation section 6.

Figure 3:
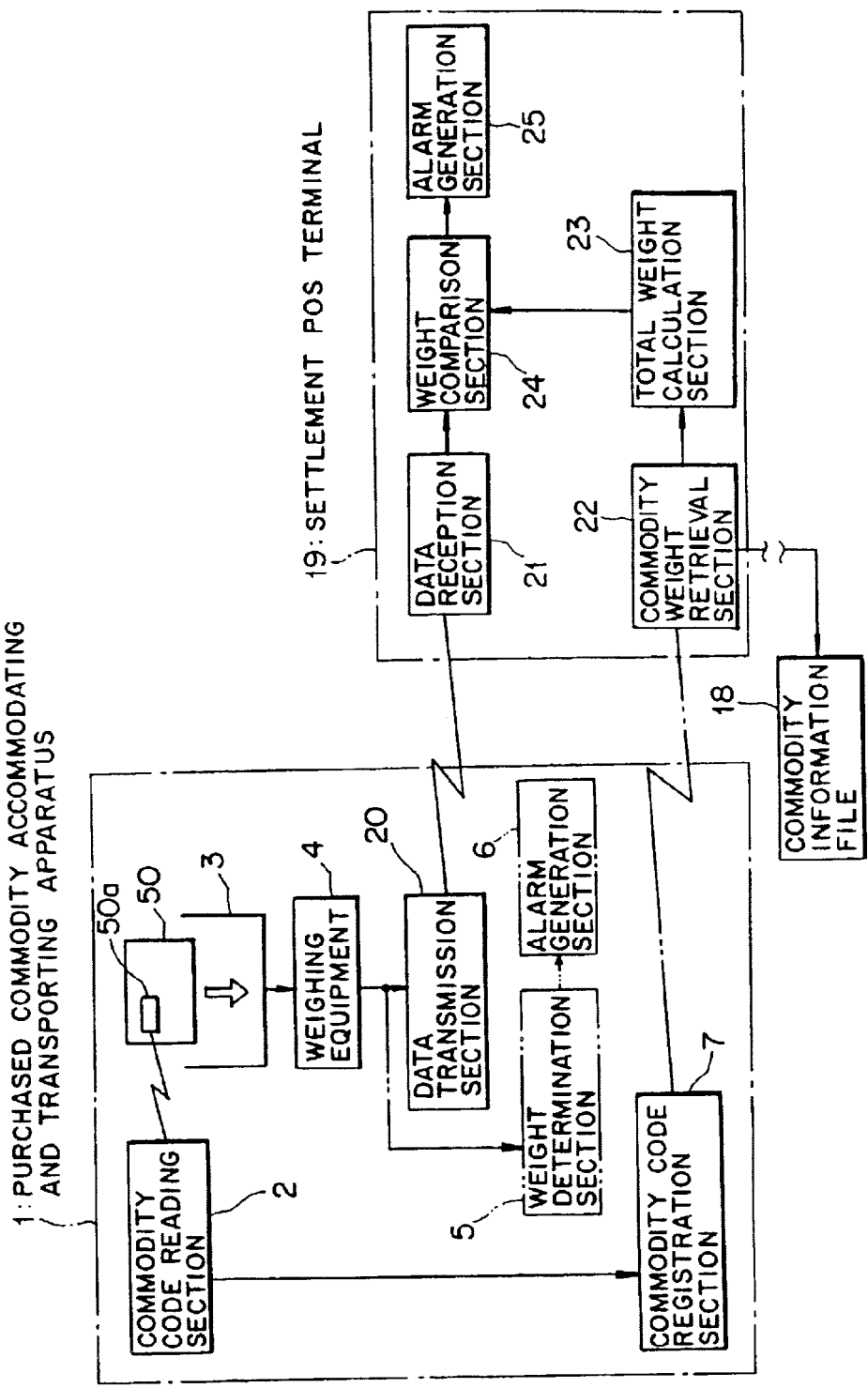

Referring now to FIG. 3, there is illustrated a further aspect of the present invention. The aspect illustrated is directed to a POS system which includes a plurality of purchased commodity accommodating and transporting apparatus 1 (only one is shown in FIG. 3) having a self scanning function, a commodity information file 18, and a settlement POS terminal 19. Each of the purchased commodity accommodating and transporting apparatus 1 includes, in addition to a commodity code reading section 2, an accommodation section 3, and a weighing equipment 4 similar to those shown in FIG. 1, a commodity code registration section 17, and a data communication section 20. The commodity code registration section 17 registers commodity code information read by the commodity code reading section 2. The data transmission section 20 transmits, upon settlement of accounts at the settlement POS terminal 19, the total weight of the commodities 50 in the accommodation section 3 measured by the weighing equipment 4 to the settlement POS terminal 19.

The commodity information file 18 stores price information of commodities 50 corresponding to commodity code information as commodity information. In the present invention, the commodity information file 18 also stores weight information of individual commodities 50 corresponding to the commodity code information as commodity information.

The settlement POS terminal 19 retrieves the commodity information file 18 in accordance with the commodity code information registered in the commodity code registration section 17 of any of the purchased commodity accommodating and transporting apparatus 1 to perform final settlement of accounts for purchased commodities accommodated in the accommodation section 3 of the purchased commodity accommodating and transporting apparatus 1. The settlement POS terminal 19 includes a data reception section 21, a commodity weight retrieval section 22, a total weight calculation section 23, a weight comparison section 24, and an alarm generation section 25.

The data reception section 21 receives data from the data transmission section 20 of any of the purchased commodity accommodating and transporting apparatus 1, and the commodity weight retrieval section 22 retrieves the weights of the commodities 50 corresponding to the commodity code information from the commodity information file 18 in accordance with the commodity code information of all commodities registered by the commodity code registration section 17. The total weight calculation section 23 calculates the total weight of the weights of the commodities 50 retrieved by the commodity weight retrieval section 22.

The weight comparison section 24 compares the total weight calculated by the total weight calculation section 23 and the total weight of the commodities 50 in the accommodation section 3 received by the data reception section 21, and the alarm generation section 25 generates an alarm when it is determined by the weight comparison section 24 that the total weight calculated by the total weight calculation section 23 and the total weight of the commodities 50 in the accommodation section 3 received by the data reception section 21 are different from each other.

Each of the purchased commodity accommodating and transporting apparatus 1 may include a weight determination section 5 and an alarm generation section 6 similar to those shown in FIG. 1 such that the alarm generation section 6 generates an alarm when it is determined by the weight determination section 5 that the total weight of the commodities 50 in the accommodation section 3 measured by the weighing equipment 4 has changed without reading a commodity code 50a by the commodity code reading section 2.

In the POS system described above with reference to FIG. 3, the commodity information file 18 for storing weight information together with price information as commodity information of commodities 50 corresponding to commodity code information is provided, and upon settlement of accounts at the settlement POS terminal 19, the total weight of purchased commodities in the accommodation section 3 of the purchased commodity accommodating and transporting apparatus 1 measured by the weighing equipment 4 is transmitted from the data transmission section 20 to the settlement POS terminal 19.

On the other hand, at the settlement POS terminal 19, the weights of the commodities 50 are retrieved from the commodity information file 18 in accordance with all commodity code information registered in the commodity code registration section 17 by the commodity weight retrieval section 22, and then the total weight of the weights of the commodities 50 retrieved by the commodity weight retrieval section 22 is calculated by the total weight calculation section 23.

Then, the total weight calculated by the total weight calculation section 23 and the total weight of the commodities 50 in the accommodation section 3 received at the data reception section 21 are compared with each other by the weight comparison section 24. If it is determined that the calculated total weight and the measured total weight from the purchased commodity accommodating and transporting apparatus 1 are different from each other, it is determined that the customer has accommodated a commodity 50 into the accommodation section 3 without scanning the commodity code 50a or the customer has placed a different commodity from an actually scanned commodity into the accommodation section 3 or a plurality of commodities have been placed into the accommodation section 3 for a single reading operation or some other unjust act has taken place. Consequently, an alarm is generated from the alarm generation section 25.

In this instance, similarly as in the purchased commodity accommodating and transporting apparatus 1 shown in FIG. 1, when it is determined by the weight determination section 5 that the total weight of the commodities 50 in the accommodation section 3 from the weighing equipment 4 has changed without scanning a commodity code 50a by the commodity code reading section 2, an alarm can be generated immediately by the alarm generation section 6.

With the purchased commodity accommodating and transporting apparatus having a self scanning function and the POS system described above with reference to FIG. 3, when it is determined that an actual increment in weight and the weight corresponding to commodity code information are different from each other, or when it is determined that the total weight calculated in accordance with the commodity code information and the total weight of the commodities actually measured by the weighing equipment 4 are different from each other, an error is notified. Consequently, such an intentional unjust act as to register a single commodity and accommodate a plurality of commodities at a time into the accommodation section 3 or to accommodate a commodity 50 into the accommodation section 3 without registering the same and such an accidental unjust act as a miss of scanning or an error in scanning can be detected. Accordingly, those unjust acts can be prevented with certainty. Further, the safety equivalent to that of a conventional POS system, in which settlement of accounts is performed by a scanning operation of an operator, can be provided to the store side which adopts the present POS system, and better services can be provided to the store side and customers.

Figure 4:
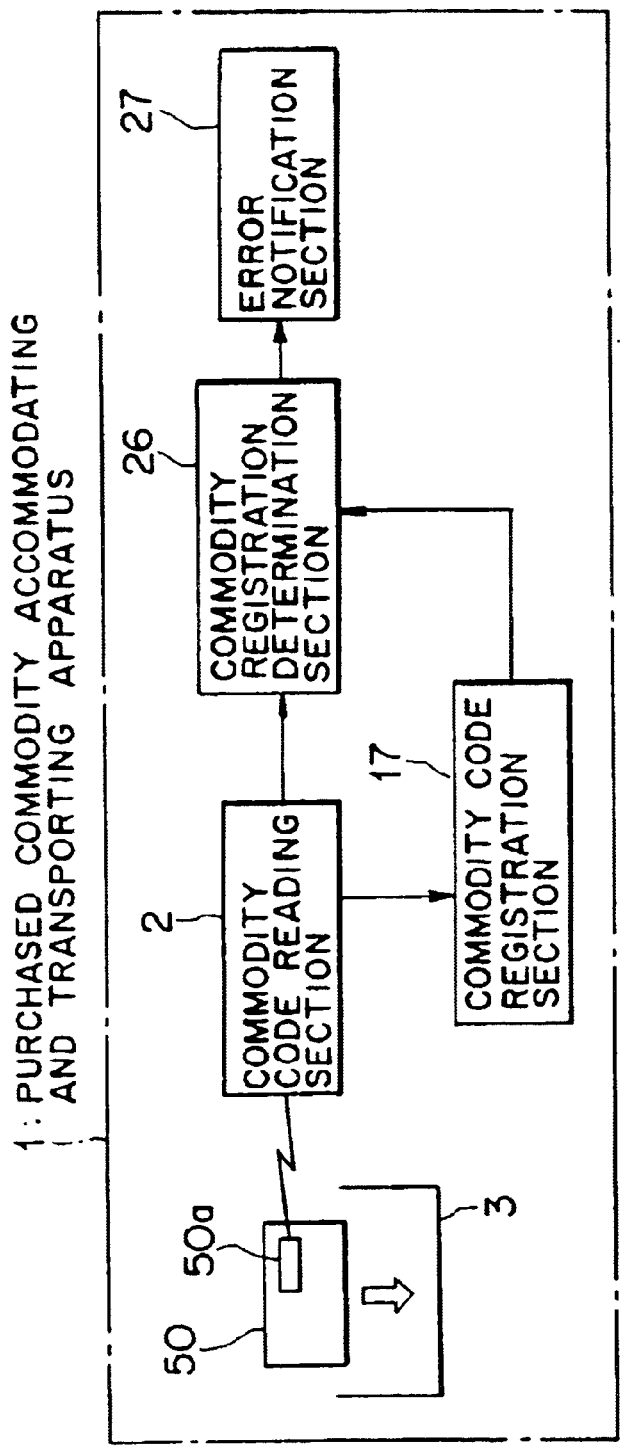

Referring now to FIG. 4, there is illustrated a still further aspect of the present invention. The aspect illustrated is directed to a purchased commodity accommodating and transporting apparatus 1 having a self scanning function. The purchased commodity accommodating and transporting apparatus 1 comprises, in addition to a commodity code reading section 2, an accommodating section 3, and a commodity code registration section 17 similar to those described hereinabove, a commodity registration determination section 26, and an error notification section 27.

The commodity code reading section 2 is used to read, upon settlement of accounts, the commodity code 50a of a commodity 50 selected at random from the commodities accommodated in the accommodation section 3.

The commodity registration determination section 26 determines whether or not the commodity code information read by the commodity code reading section 2 upon settlement of accounts is registered in the commodity code registration section 17, and the error notification section 27 notifies an error when it is determined by the commodity registration determination section 26 upon settlement of accounts that the commodity code information read by the commodity code reading section 2 is not registered.

The commodity code registration section 17 automatically registers the commodity code information read by the commodity code reading section 2 when it is determined upon settlement of accounts by the commodity registration determination section 26 that the commodity code information is not registered.

In the purchased accommodating and transporting apparatus 1 having a self scanning function described above with reference to FIG. 4, upon settlement of accounts at a settlement POS terminal or the like, the commodity code 50a of a commodity 50 selected at random from within commodities accommodated in the accommodation section 3 is read using the commodity code reading section 2 by an operator.

Then, it is determined by the commodity registration determination section 26 whether or not the commodity code information read by the commodity code reading section 2 upon settlement of accounts is registered in the commodity code registration section 17. When it is determined that the commodity code information is not registered, it is determined that the commodity 50 was placed into the accommodation section 3 without scanning the commodity code 50a thereof, and an error is notified by the error notification section 27. Simultaneously, the commodity code information is automatically registered into the commodity code registration section 17.

With the purchased commodity accommodating and transporting apparatus having a self scanning function, if a commodity 50 which has been accommodated into the accommodation section 3 without scanning the commodity code 50a by a customer whether it is intentional or accidental is detected upon settlement of accounts by random scanning checking by an operator, then the unjust act can be notified as an error and the commodity 50 can be automatically registered. Consequently, such an unjust act as shoplifting by a customer can be prevented by a restraining effect on a temptation to an unjust act without imposing a burden on the operator of the settlement POS terminal 19 and without taking such a countermeasure as to change the color of the commodity code 50a, and occurrence of unjust acts upon introduction of a POS system which involves self scanning can be prevented with certainty.

Figure 5:
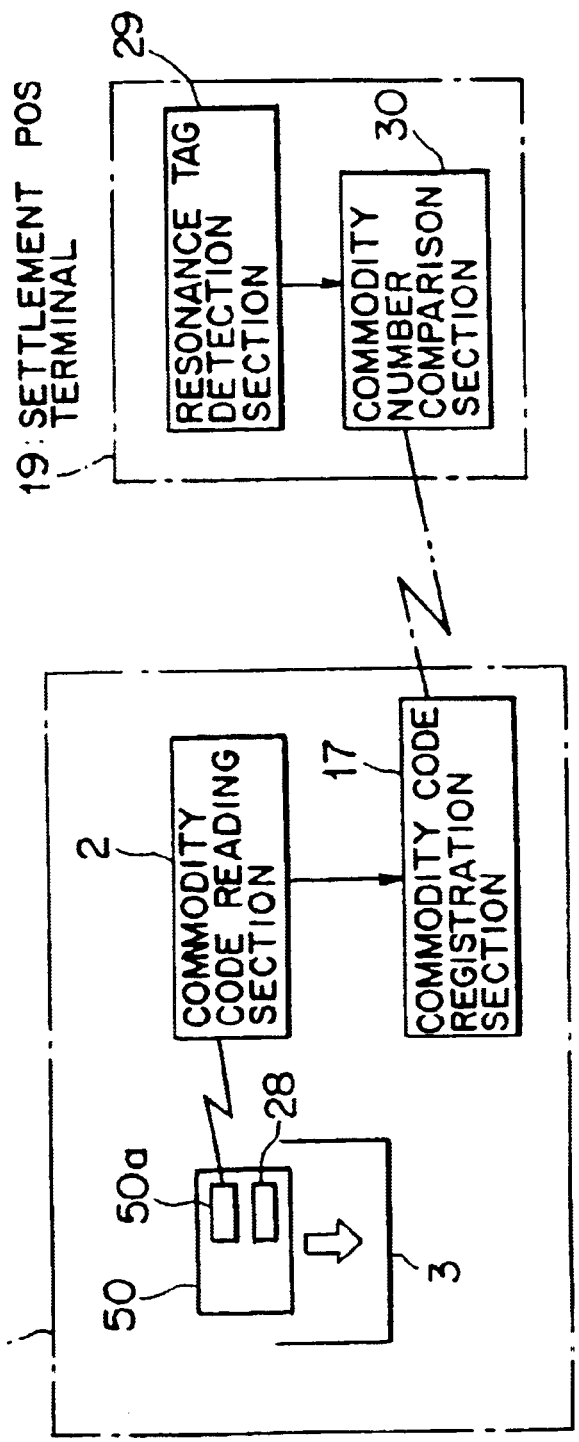

Referring now to FIG. 5, there is illustrated a yet further aspect of the present invention. The aspect illustrated is directed to a POS system which includes a plurality of purchased commodity accommodating and transporting apparatus 1 (only one is shown in FIG. 5) having a self scanning function, and a settlement POS terminal 19. Each of the purchased commodity accommodating and transporting apparatus 1 includes, in addition to a commodity code reading section 2, an accommodation section 3, and a commodity code registration section 17 similar to those described above.

The settlement POS terminal 19 performs final settlement of accounts for purchased commodities accommodated in the accommodation section 3 of any of the purchased commodity accommodating and transporting apparatus 1 in accordance with the commodity code information registered in the commodity code registration section 17 of the purchased commodity accommodating and transporting apparatus 1.

The settlement POS terminal 19 includes a resonance tag detection section 29, and a commodity number comparison section 30.

The resonance tag detection section 29 detects a resonance tag 28 applied in advance to each commodity 50 to detect the number of the commodities 50 accommodated in the accommodation section 3 of any of the purchased commodity accommodating and transporting apparatus 1, and the commodity number comparison section 30 compares the number of the commodities 50 detected by the resonance tag detection section 29 and the number of registered commodities obtained in accordance with the commodity code information registered by the commodity code registration section 17.

In the POS system described above with reference to FIG. 5, a resonance tag 28 is applied in advance to each commodity 50, and upon settlement of accounts at the settlement POS terminal 19, the resonance tags 28 of commodities 50 can be detected by the resonance tag detection section 29 of the settlement POS terminal 19 to detect the number of commodities accommodated in the accommodation section 3 of the purchased commodity accommodating and transporting apparatus 1.

Then, the number of the actual commodities 50 detected by the resonance tag detection section 29 and the number of registered commodities obtained in accordance with commodity code information registered in the commodity code registration section 17 are compared with each other by the commodity number comparison section 30 of the settlement POS terminal 19. When the result of the comparison reveals that the numbers are different from each other, it is determined that the customer has accommodated a commodity 50 into the accommodation section 3 without scanning the commodity code 50a of it or the customer has placed a different commodity from an actually scanned commodity into the accommodation section 3 or else a plurality of commodities have been accommodated for a single reading operation or some other unjust act has been conducted, and this is notified by some means.

Accordingly, with the purchased commodity accommodating and transporting apparatus having a self scanning function, since the registered number of commodities and the number of actual commodities detected by the resonance tag detection section 28 of the settlement POS terminal 19 are compared with each other and a result of the comparison is notified, presence or absence of a non-registered commodity can be confirmed readily at the settlement POS terminal 19 and notified to the customer. Consequently, occurrence of unjust acts upon introduction of a POS system which involves self scanning can be prevented with certainty.

Figure 6:
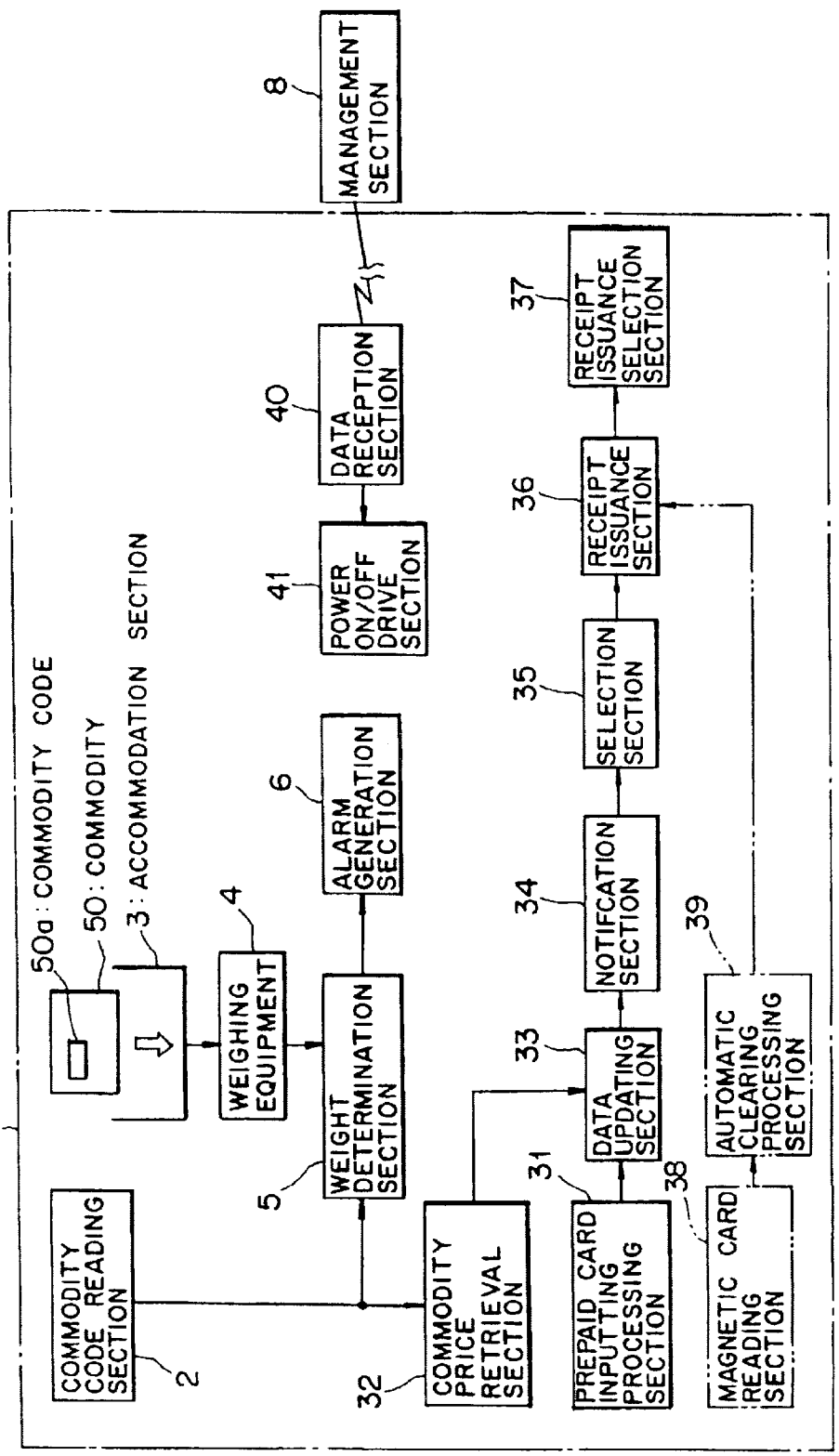

Referring finally to FIG. 6, there is illustrated a yet further aspect of the present invention. The aspect illustrated is directed to a purchased commodity accommodating and transporting apparatus 1 having a self scanning function. The purchased commodity accommodating and transporting apparatus 1 comprises, in addition to a commodity code reading section 2 and an accommodating section 3 similar to those described above, several additional elements denoted at 31 to 41.

In particular, the purchased commodity accommodating and transporting apparatus 1 comprises a prepaid card inputting processing section 31 for receiving a prepaid card and reading remains information of the prepaid card, a commodity price retrieval section 32 for retrieving the price of the commodity 50 in accordance with the commodity code information read by the commodity code reading section 2, and a data updating section 33 for registering a result obtained by subtraction of the price of the commodity 50 retrieved by the commodity price retrieval section 32 from the remains information read by the prepaid card inputting processing section 31 as remains information of the prepaid card to update the remains information.

The purchased commodity accommodating and transporting apparatus 1 may further comprise a notification section 34 for notifying, when the remains read by the prepaid card inputting processing section 31 run short of the price of the commodity 50 retrieved by the commodity price retrieval section 32 and updating by the data updating section 33 cannot be performed, such shortage, and a selection section 35 for selecting, when the remains read by the prepaid card inputting processing section 31 runs short of the price of the commodity 50 retrieved by the commodity price retrieval section 32, whether the purchasing processing is to be continued inserting a second prepaid card into the prepaid card inputting processing section 31 or the purchasing processing is to be ended.

The purchased commodity accommodating and transporting apparatus may further comprise a receipt issuance section 36 for issuing a receipt upon completion of the purchasing, and a receipt issuance selection section 37 for selecting whether the issuance of a receipt by the receipt issuance section 36 is necessary or unnecessary.

The purchased commodity accommodating and transporting apparatus may comprise, in place of or in addition to the prepaid card inputting processing section 31, the data updating section 33 and the notification section 34, a magnetic card reading section 38 for receiving a credit card or a bank card and reading magnetic information of the card, and an automatic clearing processing section 39 for automatically clearing the amount of money corresponding to the price of the commodity 50 retrieved by the commodity price retrieval section 32 from an accountcorresponding to the magnetic information of the card read by the magnetic card reading section 38 some other day.

The purchased commodity accommodating and transporting apparatus 1 may further comprise a data reception section 40 for receiving data from an management section 8, and a power on/off drive section 41 for automatically turning the power source on/off in response to a power on/off instruction received from the management section 8 by way of the data reception section 40.

The purchased commodity accommodating and transporting apparatus may further comprise a weighing equipment 4, a weight determination section 5, and an alarm generation section 6 such that the alarm generation section 6 generates an alarm when it is determined by the weight determination section 5 that the total weight of the commodities 50 in the accommodation section 3 measured by the weighing equipment 4 has changed without reading a commodity code 50a by the commodity code reading section 2.

With the purchased commodity accommodating and transporting apparatus 1 having a self scanning function described above with reference to FIG. 6, final settlement of accounts, which is conventionally performed by a settlement POS terminal, can be performed by self service using a prepaid card, a credit card or a bank card.

In particular, when a prepaid card is used, it is inserted into the prepaid card inputting processing section 31 of the purchased commodity accommodating and transporting apparatus 1. Consequently, remains information of the prepaid card is read by the prepaid card inputting processing section 31, and the price of the commodity 50 is retrieved by the commodity price retrieval section 32 in accordance with commodity code information read by the commodity code reading section 2.

Then, the data updating section 33 registers a result obtained by subtraction of the retrieved price of the commodity 50 from the remains information of the prepaid card as new remains information of the prepaid card to update the remains information of the prepaid card thereby to settle the accounts for the commodity 50.

On the other hand, when the remains read by the prepaid card inputting processing section 31 run short of the price of the commodity 50 retrieved by the commodity price retrieval section 32 and consequently the data of the prepaid card cannot be updated by the data updating section 33, this is notified from the notification section 34.

When the notification from the notification section 34 is received, the customer can select, by way of the selection section 35, whether it inserts a second prepaid card into the prepaid card inputting processing section 31 to continue its purchasing processing or it ends the purchasing processing.

Further, a receipt is issued, upon completion of the purchasing, from the receipt issuance section 36 provided in the purchased commodity accommodating and transporting apparatus 1. In this instance, whether or not a receipt should be issued from the receipt issuance section 36 can be switchably selected in accordance with a demand of the customer by way of the receipt issuance selection section 37.

On the other hand, when a credit card or a bank card is used, it is inserted into the magnetic card reading section 38 so that the magnetic information thereof is read, and the price of the commodity 50 is retrieved by the commodity price retrieval section 32 in accordance with commodity code information read by the commodity code reading section 2.

Then, the automatic clearing processing section 39 performs processing to automatically pay the amount of money corresponding to the retrieved price of the commodity 50 from an account corresponding to the magnetic information read by the magnetic card reading section 38 some other day thereby to complete settlement of the accounts for the commodity 50.

The purchased commodity accommodating and transporting apparatus 1 can automatically turn the power source on/off by means of the on/off drive section 41 in response to a power on/off instruction from the upper management section 8 received by way of the data reception section 40. Consequently, the turning on/off of the power source of the purchased commodity accommodating and transporting apparatus 1 can be managed without an artificial operation of a customer, an operator or some other person.

Further, also with the purchased commodity accommodating and transporting apparatus 1 in which settlement of accounts is performed by self service using a card, when it is determined by the weight determination section 5 that the total weight of commodities 50 in the accommodation section 3 from the weighing equipment 4 has changed without scanning a commodity code 50a by the commodity code reading section 2, an alarm can be generated immediately from the alarm generation section 6 similarly as in the apparatus shown in FIG. 1.

Thus, with the purchased commodity accommodating and transporting apparatus having a self scanning function, since final settlement of accounts can be performed by self service using a prepaid card, a bank card or a credit cart, not only reduction of the burden on an operator and reduction of the number of operators can be achieved, but agreeable shopping free from a waiting time at a settlement POS terminal can be achieved and remarkable reduction of the shopping time and remarkable enhancement in convenience in a self shopping form can be realized.

b. First Embodiment

Referring first to FIGS. 7 to 14, there are shown a purchased commodity accommodating and transporting apparatus and a POS system according to a first preferred embodiment of the present invention. Similarly to conventional POS system, the POS system of the first embodiment actually includes a plurality of purchased commodity accommodating and transporting apparatus and a single management section and may include one or more settlement POS terminals. However, since the purchased commodity accommodating and transporting apparatus operate independently of one another and each cooperates with one of the settlement POS terminals at a time, it is considered that a POS system can be constructed from a single purchased commodity accommodating and transporting apparatus and a single settlement POS terminal, and unless otherwise described, the following description of the POS system proceeds in regard to a single purchased commodity accommodating and transporting apparatus and a single settlement POS terminal in order to simplify the description. This similarly applies to the other embodiments hereinafter described.

Figure 10:
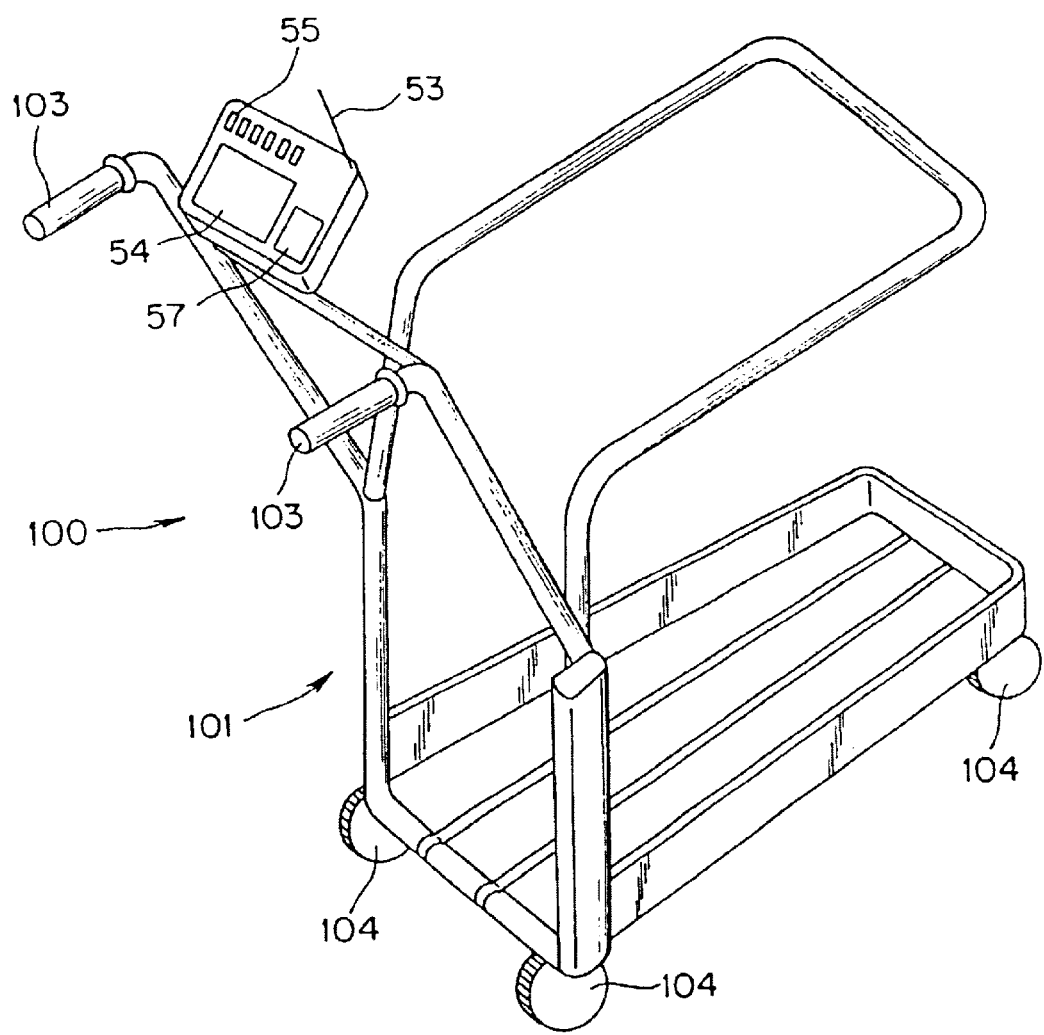
FIG. 10 is a perspective view showing a cart section of the purchased commodity accommodating and transporting apparatus shown in FIG. 7.
Figure 11:
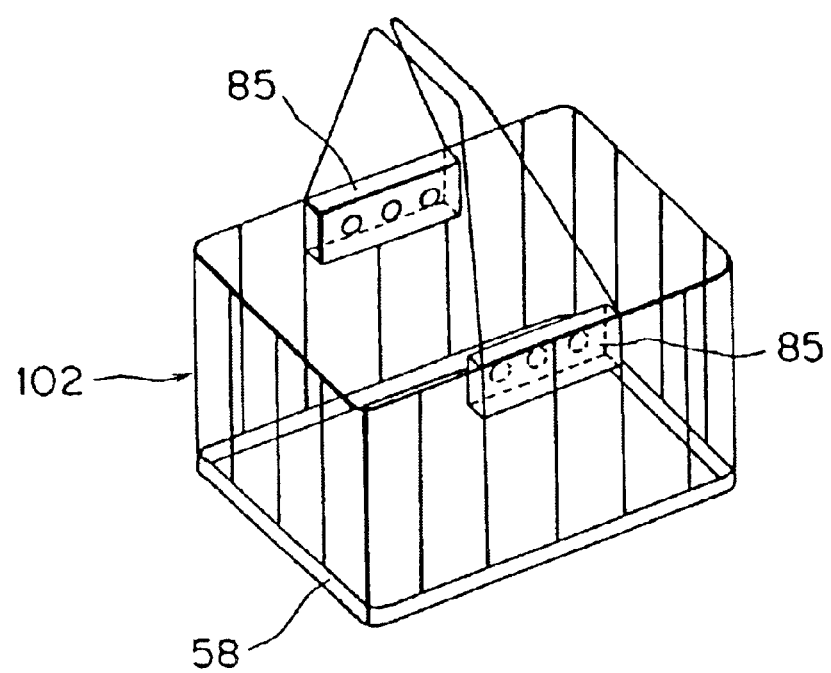
FIG. 11 is a perspective view showing an accommodating section of the purchased commodity accommodating and transporting apparatus shown in FIG. 7.

In the embodiments of the present invention including the first embodiment described below, the present invention is applied to such a scanning cart or shopping cart 100 as shown in FIGS. 10 and 11 as a purchased commodity accommodating and transporting apparatus having a self scanning function. Referring first to FIGS. 10 and 11, the scanning cart 100 includes a cart section 101 shown in FIG. 10 and a basket member 102 shown in FIG. 11 which serves as an accommodation section.

The cart section 101 is constructed so as to receive the basket member 102 thereon and includes a handle section 103 for being grasped by a using person such as a customer, and four roller members 104 provided for rotation on the bottom of the cart section 101. Accordingly, a customer can accommodate commodities to be purchased into the basket member 102 while freely moving the cart section 101 on which the basket member 102 is placed by grasping and pushing the handle section 103 to rotate the roller members 104.

The cart section 101 further includes, as hereinafter described in detail with reference also to FIGS. 7 and 8, a scanner 57 for reading a bar code applied to a commodity as well as a communication section 53 for communicating data from and to an upper control section (management section 60 in FIG. 7), a display section 54 for displaying various information, and a keyboard section 55 for inputting various information. Further, the purchased commodity accommodating and transporting apparatus in the present embodiment includes, though not shown in FIG. 10 but shown in FIG. 8, a weighing equipment 58 located on the bottom of the basket member 102 (or the receiving face of the cart section 101 for receiving the basket member 102 thereon) for measuring the total weight of commodities accommodated in the basket member 102.

In a POS system which employs the scanning cart 100 of the type described above, generally a customer itself reads a bar code applied to each commodity to be purchased by means of the scanner 57 to read the commodity code information into the upper control section (or a storage section 52 in the scanning cart 100 shown in FIG. 7), places or accommodates such commodities into the basket member 102, depresses, after selection of commodities to be purchased is completed, an end key (not shown) on the keyboard section 55, and carries them to a settlement POS terminal (not shown) with the commodities loaded on the scanning cart 100.

It is to be noted that, upon registration of commodity code information, a commodity price file (PLU file) in the scanning cart 100 or the upper control section is retrieved so that information of a commodity number, a commodity name, a price (unit price) and so forth of the registered commodity is displayed on the display section 54 of the scanning cart 100.

Then, in the settlement POS terminal, the commodity code information registered by the customer itself is loaded down from the upper control section (or the storage section 52), and in accordance with the commodity code information, the prices (unit prices) of the commodities corresponding to the commodity codes are retrieved from the commodity price file (PLU file) and then a total amount of money of the purchased commodities is calculated to effect settlement of the accounts.

Figure 7:
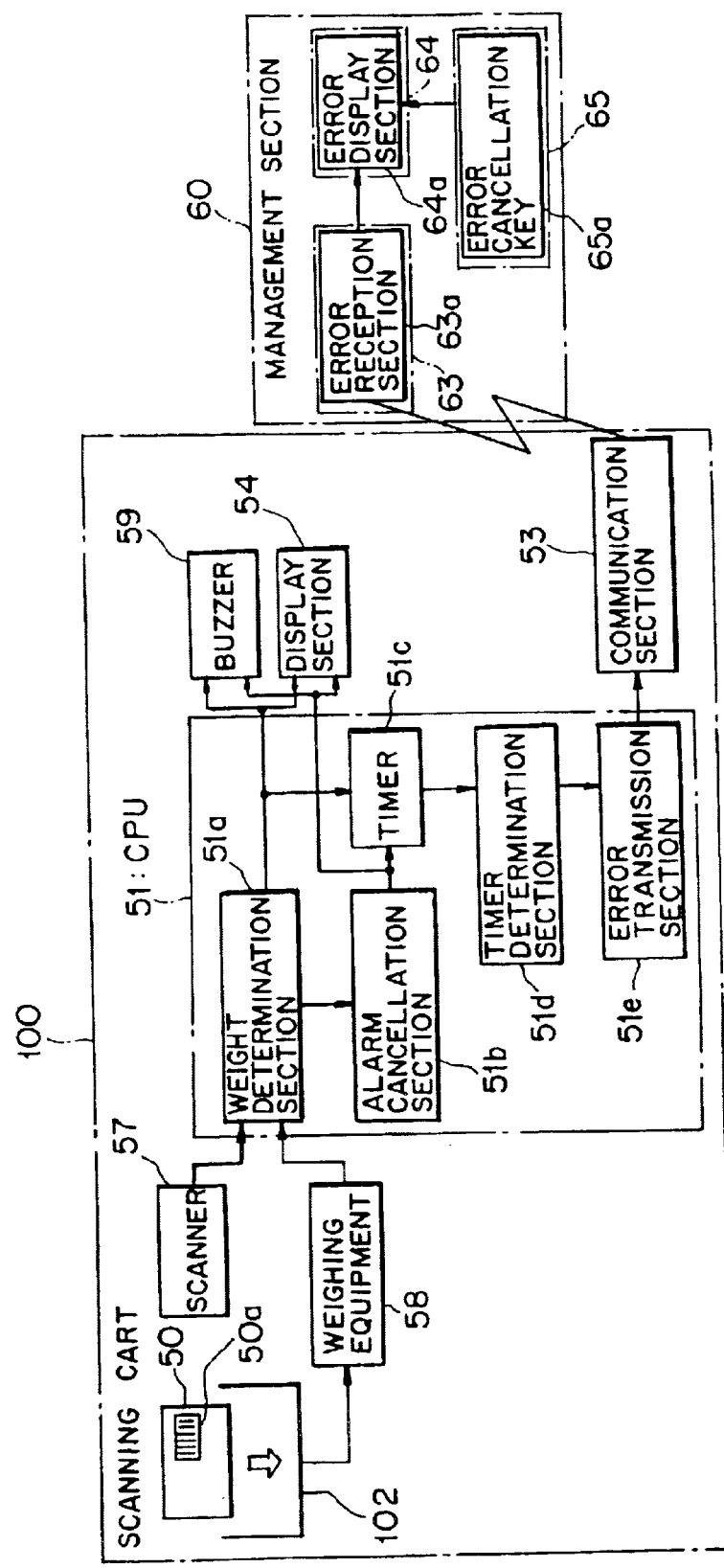
FIG. 7 is a block diagram showing a functional construction of a purchased commodity accommodating and transporting apparatus and a POS system according to a first preferred embodiment of the present invention.
Figure 8:
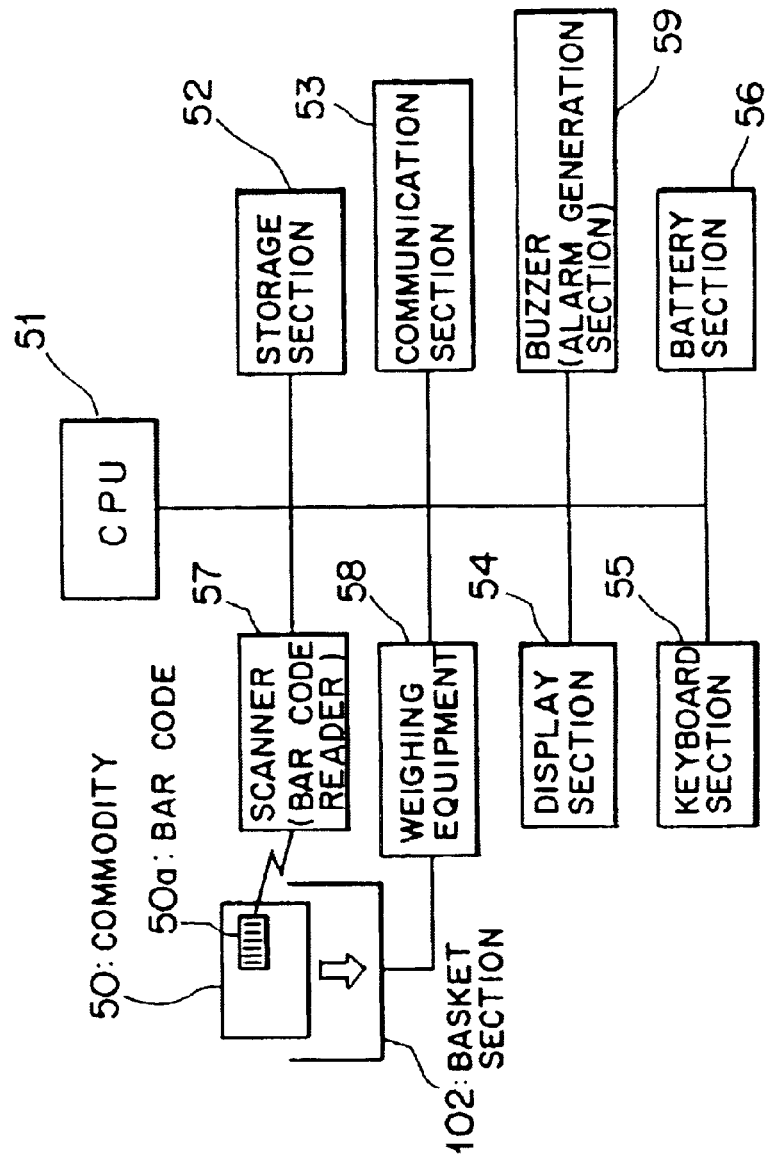
FIG. 8 is a block diagram showing a hardware construction of a control system of the purchased commodity accommodating and transporting apparatus shown in FIG. 7.
Figure 9:
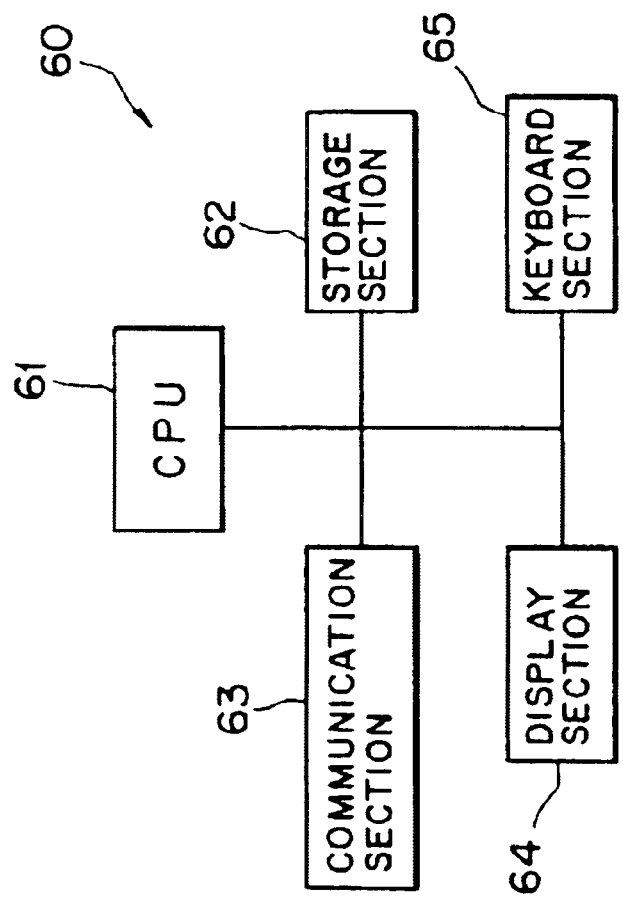
FIG. 9 is a block diagram showing a hardware construction of a management section of the POS system shown in FIG. 7.

In order to prevent, in the POS system which employs the scanning cart 100 of such construction as described above, such an unjust act of a customer as to accommodate a commodity into the basket member 102 without performing reading of the commodity code by means of the scanner 57 whether it is intentional or accidental, in the first embodiment of the present invention, a control system of the scanning cart 100 and a control section 60 are constructed in such a manner as shown in FIGS. 7 to 9.

Referring first to FIG. 8, there is shown the hardware construction of the control system of the scanning cart 100.

The control system includes a CPU (central processing unit) 51 for controlling the entire control system of the scanning cart 100, a storage section 52 for storing a program and various data (registered information and so forth including commodity code information of a scanned commodity), and the communication section 53 for communicating data with the management section 60 (or an upper control section such as a station controller or a store controller) by wireless (infrared rays or the like).

The control system further includes the display section 54 for displaying various information (commodity information of a scanned commodity 50, an alarm display which will be hereinafter described, and so forth), the keyboard section 55 for inputting various information, and a battery section 56 for supplying power to the control system of the scanning cart 100.

The control system further includes the scanner (bar code reader, commodity code reading section) 57 for optically reading a bar code (commodity code) 50a applied to a commodity 50, the weighing section 58 for weighing the total weight of commodities accommodated in the basket member 102, and a buzzer (alarm sound generation section, alarm generation section) 59 for generating sound in response to a control signal from the CPU 51 (weighing determination section 51a which will be hereinafter described) to generate an alarm.

Meanwhile, the management section 60 has such a hardware construction as shown in FIG. 9. In particular, referring to FIG. 9, the management section 60 includes a CPU 61 for controlling the entire management section 60, a storage section 62 for storing a program and various data, a communication section 63 for communicating data with the scanning cart 100 by wireless (infrared rays or the like), a display section 64 for displaying various information, and a keyboard section 65 for inputting various information.

The POS system in the present embodiment is functionally constructed in such a manner as shown in FIG. 7 from the scanning cart 100 and the management section 60 described above.

In particular, referring to FIG. 7, the CPU 51 of the scanning cart 100 has functions as a weight determination section 51a, an alarm cancellation section 51b, a timer 51c, a timer determination section 51d and an error transmission section 51e.

Figure 12:
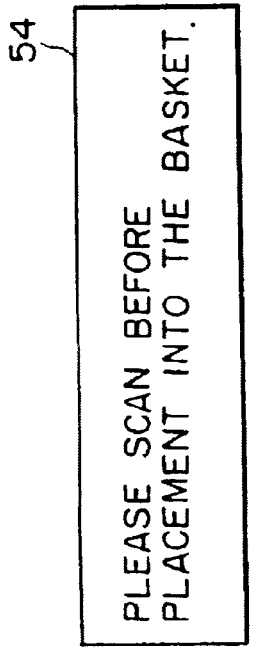
FIG. 12 is a schematic view showing an exemplary alarm display of a display section of the purchased commodity accommodating and transporting apparatus shown in FIG. 7.

The weight determination section 51a detects the variation of the total weight of commodities 50 in the basket member 102 weighed by the weighing equipment 58. When it is determined by the weight determination section 51a that the total weight of the commodities 50 in the basket member 102 weighed by the weighing equipment 58 has changed without reading a commodity code 50a by means of the scanner 57, the buzzer 59 generates sound in response to a control signal from the weight determination section 51a, and for example, such an alarm display "please scan before placement into the basket" as shown in FIG. 12 is displayed on the display section 54.

The alarm cancellation section 51b cancels the sounding operation of the buzzer 59 and the alarm display of the display section 54 when it is determined by the weight determination section 51a that the total amount of the commodities in the basket member 102 which changed without reading a commodity code 50a by means of the scanner 57 has decreased by such increment after generation of the alarm.

The timer 51c counts the operation time of the sounding operation of the buzzer 59 and the operation time of the alarm display of the display section 54. The timer 51c is activated to start its counting operation when a control signal for generation of an alarm is outputted from the weight determination section 51a. The timer 51c is reset simultaneously when the alarm is canceled by the alarm cancellation section 51b.

The timer determination section 51d determines whether or not the time counted by the timer 51c has reached a predetermined time. When it is determined by the timer determination section 51d that the counted time by the timer 51c has reached the predetermined time, the error transmission section 51e transmits unique information (cart number information) of the scanning cart 100, which is in an alarm generating condition, as error information to the management section 60. The error information from the error transmission section 51e is transmitted to the management section 60 by wireless by way of the communication section 53.

Meanwhile, in the management section 60, the communication section 63 has a function as an error reception section 63a which receives the error information transmitted thereto from the error transmission section 51e of the scanning cart 100 by way of the communication section 53.

Figure 13:
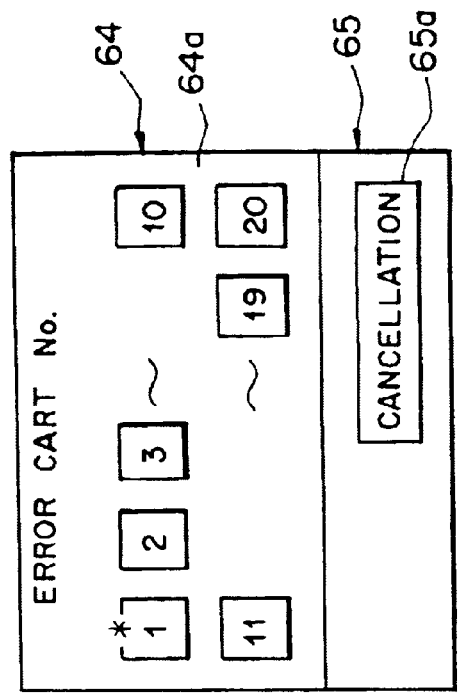
FIG. 13 is a view showing an exemplary display of an error display section and an error cancellation section of the management section shown in FIG. 7.

The display section 64 has a function as an error display section 64a for displaying, when the error information is received by the error reception section 63a, the cart number which is unique information of the scanning cart 100 which has transmitted the error information. The display of the error display section 64a is provided, for example as shown in FIG. 13, by lighting a portion (lamp or the like) of the error display section 64a corresponding to the cart number (one of "1" to "20"in FIG. 13). In FIG. 13, the display condition when error information has been received from the cart number "1" is shown, and it is shown clearly by the mark "*" that the portion indicating the cart number "1" is lit.

The keyboard section 65 has an error cancel key (error cancellation section) 65a for being depressed when some measure for the scanning cart 100 from which the error information has been transmitted (processing against an unjust act) is completed to cancel the display (lighting) of the cart number of the scanning cart 100 on the error display section 64a.

Figure 14:
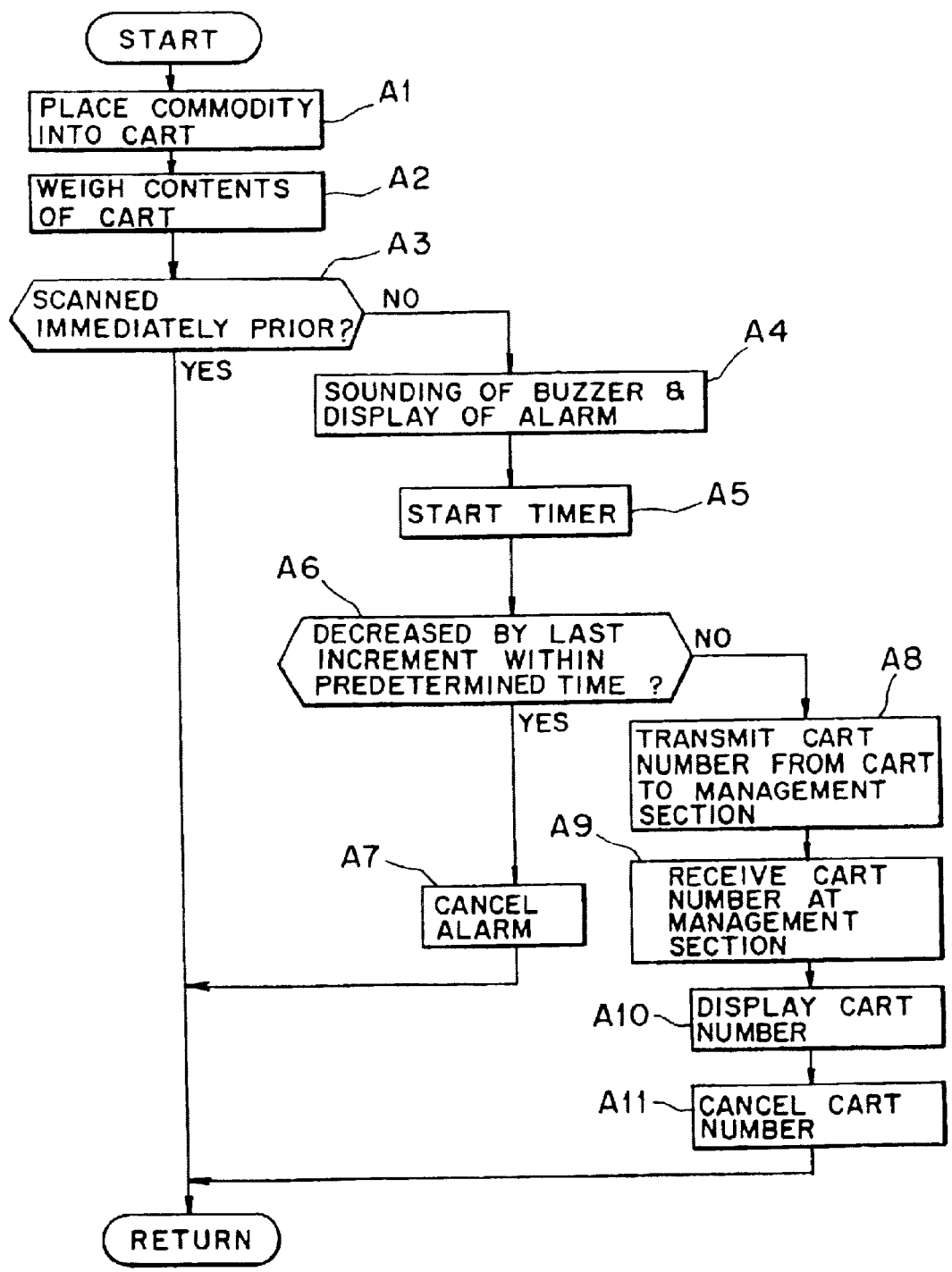
FIG. 14 is a flow chart illustrating operation of the POS system shown in FIG. 7.

In the POS system of the first embodiment of the present invention having the construction described above, the processing of a procedure illustrated in FIG. 14 is executed for a period of time after a customer starts use of the scanning cart 100 in order to purchase commodities 50 until the end key (not shown) on the keyboard section 55 is depressed to end the purchasing of the commodities 50.

Referring to FIG. 14, if a customer accommodates a commodity 50 into the basket member 102 of the scanning cart 100 (step A1), then the weight varied by the accommodation of the commodity 50 is weighed by the weighing equipment 58 (step A2).

When a weight variation (change of the output of the weighing equipment 58) is produced in the total weight of the commodities 50 accommodated in the basket member 102 of the scanning cart 100, this is detected by the weight determination section 51a, and then, it is determined whether or not reading (scanning) of the commodity code 50a by the scanner 57 has been performed immediately prior to the variation of the weight (step A3).

If scanning has been performed immediately prior, the control sequence returns, but on the contrary if it is determined that scanning has not been performed immediately prior, it is determined that the customer has accommodated a commodity 50 into the basket member 102 without performing scanning. Thus, the buzzer 59 is sounded and such an alarm display as shown in FIG. 12 is displayed on the display section 54 (step A4), and simultaneously the timer 51c is activated to count the time after generation of the alarm (step A5).

Thereafter, the weight determination section 51a determines within a predetermined time after the generation of the alarm whether or not the total weight of the commodities 50 in the basket member 102 weighed by the weighing equipment 58 has reduced by an amount equal to the increment which has been increased immediately prior (step A6). If it is detected that the total weight has decreased by the increment, then it is determined that the commodity 50 which the customer accommodated into the basket member 102 without scanning the same has been taken out from within the basket member 102. Consequently, the alarm cancellation section 51b immediately cancels the sounding operation of the buzzer 59 and the alarm display of the display section 54 and simultaneously resets the timer 51c (step A7).

On the contrary when it is determined by the timer determination section 51d that the counted time by the timer 51c reaches the predetermined time, that is, when it is determined that the total weight of the commodities 50 in the basket member 102 weighed by the weighing equipment 58 has not decreased by the increment increased immediately prior even after the predetermined time has elapsed after the generation of the alarm, the cart number of the scanning cart 100 is transmitted as error information from the error transmission section 51e to the management section 60 by way of the communication section 53 (step A8).

In the management section 60 to which the error information has been transmitted, the error information (cart number) from the scanning cart 100 is received by the error reception section 63a (step A9), and the cart number is displayed as shown in FIG. 13 by the error display section 64a (step A10).

An operator or some other person can grasp, by referring to the error display section 64a, the scanning cart 100 which has conducted an unjust act (an act of accommodating a commodity into the basket member 102 without performing scanning) whether it has been intentional or accidental. Thus, after the operator completes some countermeasure for the scanning cart 100, it will depress the error cancellation key 65a of the keyboard section 65 to cancel the error display (lighting display of the cart number) of the error display section 64a (step A11).

In this manner, according to the first embodiment of the present invention, when it is determined by the weight determination section 51a that the total weight of the commodities 50 in the basket member 102 from the weighing equipment 58 has increased without scanning a commodity code 50a, a sounding operation of the buzzer 59 and an alarm display of the display section 54 can be performed immediately to give a warning to the customer. Consequently, such an unjust act that a customer accommodates a commodity 50 into the basket member 102 missing a scanning operation or accommodates a commodity 50 into the basket member 102 without performing scanning intentionally can be prevented with certainty.

On the other hand, when a customer accommodates a commodity 50 into the basket member 102 missing a scanning operation of a commodity code 50a in error, if a warning by a sounding operation of the buzzer 59 and an alarm display of the display section 54 is given and the commodity 50 is taken out immediately from the basket member 102, then the alarming condition is immediately canceled by the alarm cancellation section 51b. Consequently, a warning of missing of scanning by accident can be given without checking it on a settlement POS terminal by an operator or a like person and an unjust act can be prevented with certainty without giving a disagreeable feeling to the customer.

Further, in the present embodiment, if a 15 customer ignores such an alarm as described above and does not take out the commodity 50 for which scanning has not been performed, then the cart number of the scanning cart 100 with which such act has been performed is transmitted as error information to and displayed on the management section 60. Consequently, some countermeasure can be taken immediately for the scanning cart 100 with which the unjust act has been performed.

It is to be noted that, while, in the embodiment described above, an alarm is generated when the total weight of the commodities 50 has increased without scanning operation, an alarm may be generated also when the total weight of the commodities 50 has decreased without scanning operation. Normally, in order to cancel purchase of a commodity 50 whose commodity code 50a has been read once, the commodity 50 is taken out from the basket section 102 and the commodity code 50a of it is scanned, whereafter a cancel key or a like element is manually operated. When such cancellation processing is necessitated, if a commodity 50 whose purchase should be canceled is taken out from the basket section 102 without scanning the same, then an alarm is generated since the total weight has decreased without scanning operation as described above. Consequently, it can be notified to the customer that the customer has missed cancellation processing.

c. Second Embodiment

Figure 15:
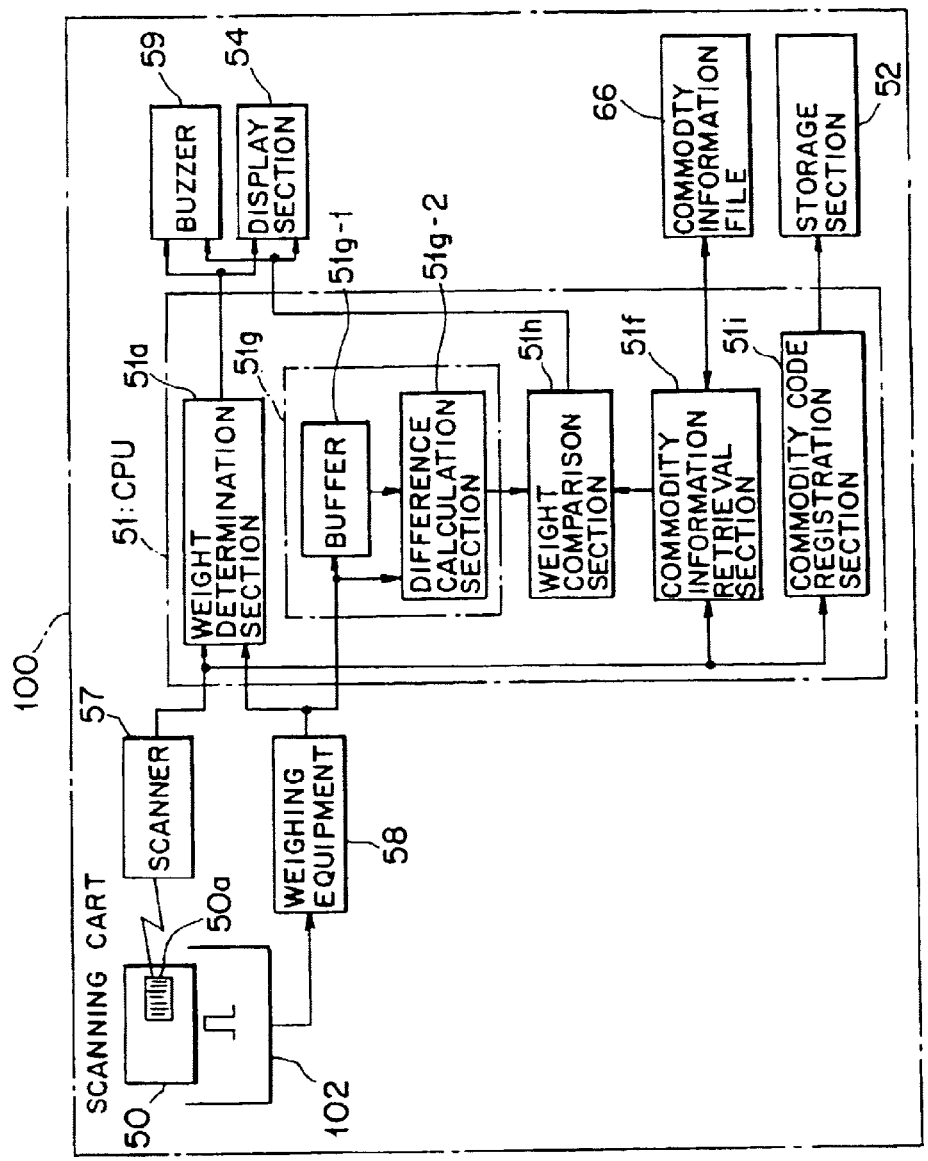
FIG. 15 is a block diagram showing a functional construction of a purchased commodity accommodating and transporting apparatus according to a second preferred embodiment of the present invention.
Figure 16:
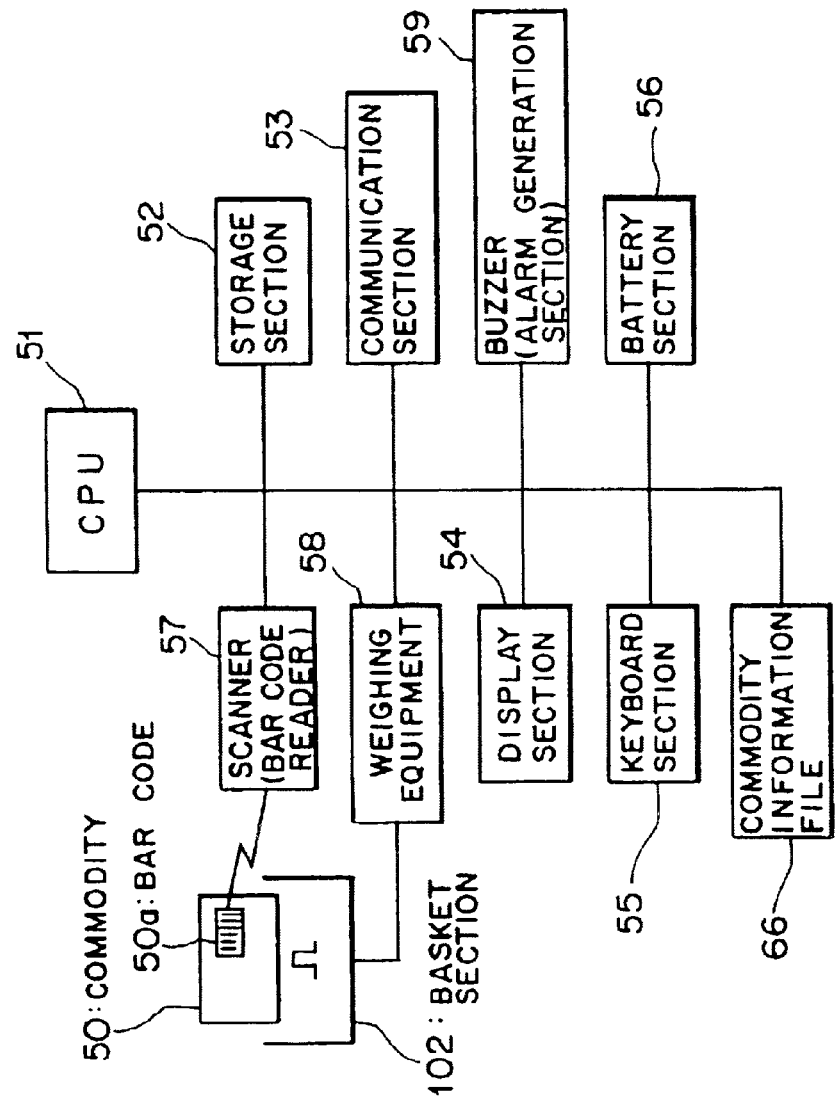
FIG. 16 is a block diagram showing a hardware construction of a control system of the purchased commodity accommodating and transporting apparatus shown in FIG. 15.
Figure 17:
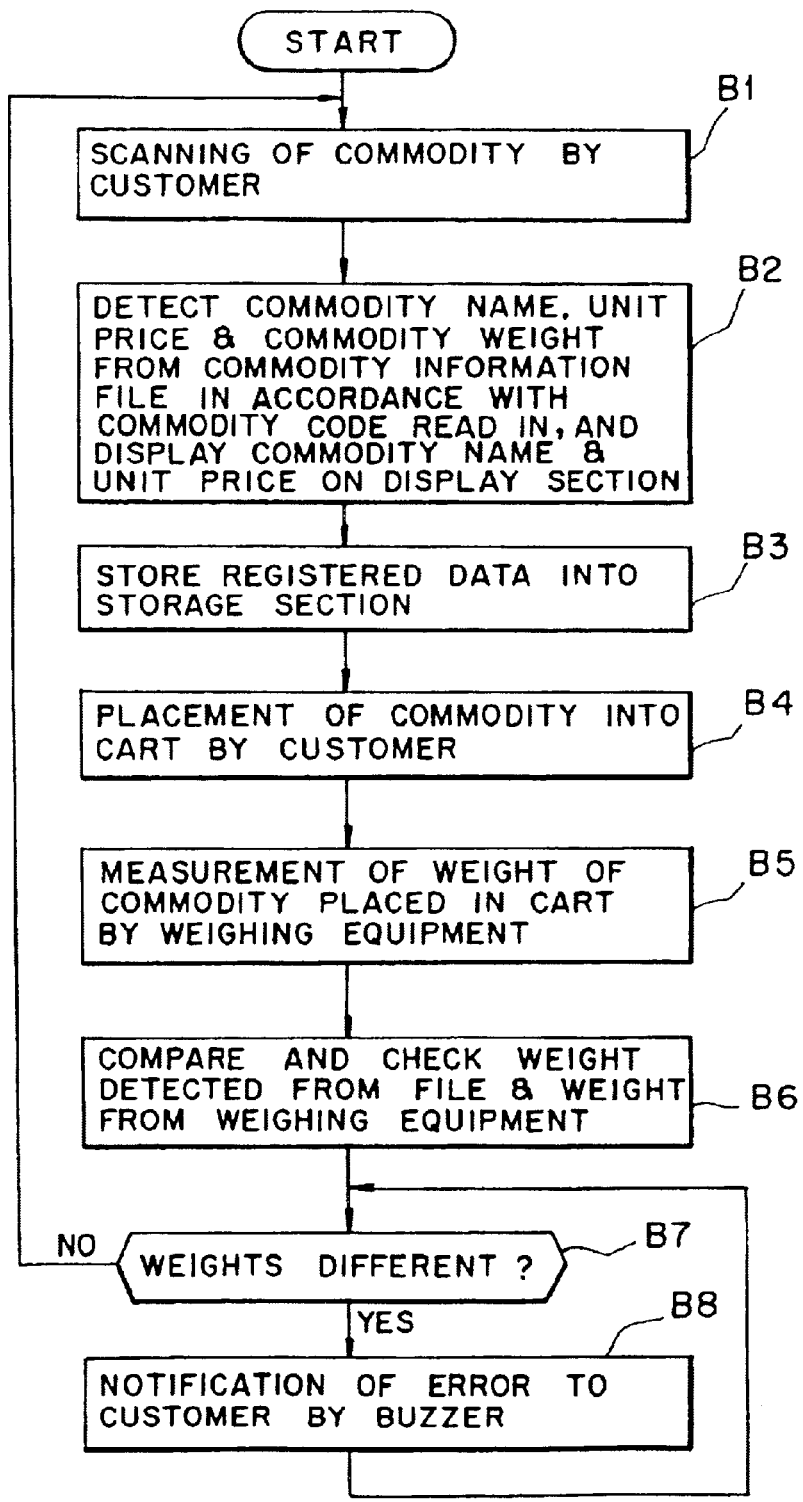
FIG. 17 is a flow chart illustrating operation of the purchased commodity accommodating and transporting apparatus shown in FIG. 15.

Referring now to FIGS. 15 to 17, there is shown a purchased commodity accommodating and transporting apparatus according to a second embodiment of the present invention. Also in the present embodiment, the present invention is applied to the scanning cart 100 shown in FIGS. 10 and 11. The purchased commodity accommodating and transporting apparatus in the present embodiment is a modification to and includes several common components to the purchased commodity accommodating and transporting apparatus in the first embodiment described above, and overlapping description of such common components is omitted herein to avoid redundancy. This similarly applies to the remaining embodiment of the present invention which will be hereinafter described.

Referring first to FIG. 16, the hardware construction of the control system of the scanning cart 100 in the present embodiment is different from that in the first embodiment (refer to FIG. 8) in that it additionally includes a commodity information file 66.

The commodity information file 66 is normally used as a PLU file and stores commodity information such as commodity numbers, commodity names and prices (unit prices) corresponding to commodity code information. In the present embodiment, however, also weight information of individual commodities 50 corresponding to the commodity code information is stored as commodity information in the commodity information file 66. It is to be noted that the weight information of each commodity 50 need not be held in the commodity information file 66 as described above, but may alternatively be provided in the form of a bar code on each commodity 50.

The control system of the scanning cart 100 in the present embodiment is functionally constructed in such a manner as shown in FIG. 15.

Referring now to FIG. 15, the CPU 51 of the scanning cart 100 has a function as the weight determination section 51a similar to that in the first embodiment and further has functions as a commodity information retrieval section (commodity weight retrieval section) 51f, a weight increment calculation section 51g, a weight comparison section 51h, and a commodity code registration section 51i.

The commodity information retrieval section 51f retrieves commodity information (a commodity number, a commodity name, a price (unit price), and a weight) of a commodity 50 in accordance with commodity code information obtained by reading the bar code 50a by means of the scanner 57.

The weight increment calculation section 51g calculates, after the bar code 50a is read by the scanner 57, the increment in weight increased as the commodity whose bar code 50a has been read is accommodated into the basket section 102. The weight increment calculation section 51g includes a buffer 51g-1 for storing a measured weight value by the weighing equipment 58 before an increase of the weight, and a difference calculation section 51g-2 for calculating the difference value between the measured weight value stored in the buffer 51g-1 and the measured value by the weighing equipment 58 after the increase of the weight, that is, the increment in weight.

The weight comparison section 51h compares the weight based on the commodity code of a commodity 50 whose bar code 50a has been read in the present cycle by the scanner 57 (weight retrieved by the commodity information retrieval section 51f) and the increment in total weight of commodities 50 in the accommodation section or basket member 102 after reading of the commodity code obtained from the weighing equipment 58 and the weight increment calculation section 51g.

When it is determined by the weight comparison section 51h that the retrieved weight by the commodity information retrieval section 51f and the increment in total weight calculated by the weight increment calculation section 51g are different from each other, a sounding operation of the buzzer 59 is performed.

The commodity code registration section 51i registers or stores commodity code information read from the bar code 50a of a commodity 50 by the scanner 57 or a result of retrieval retrieved by the commodity information retrieval section 51f as registered data into the storage section 52 in the scanning cart 100 by the commodity code registration section 51i.

It is to be noted that, also in the present embodiment, the weight determination section 51a similar to that of the first embodiment is provided, and when it is determined by the weight determination section 51a that the total weight of commodities 50 in the basket section 102 measured by the weighing equipment 58 has increased without reading a bar code 50a by the scanner 57, a sounding operation of the buzzer 59 and an alarming display by the display section 54 are performed.

In the scanning cart 100 of the second embodiment of the present invention having the construction described above, the processing of the procedure illustrated in FIG. 17 is executed for a period of time after a customer begins use of the scanning cart 100 in order to purchase commodities 50 until it depresses the end key (not shown) on the keyboard section 55 to end the purchasing of commodities 50.

In particular, if a customer reads the bar code 50a of a commodity 50 to be purchased by means of the scanner 57 (step B1), then the commodity information retrieval section 51f retrieves the weight of the commodity corresponding to the commodity code information from the commodity information file 66.

In this instance, in the present embodiment, also the commodity name and the price (unit price) of the commodity corresponding to the commodity code information are simultaneously retrieved from the commodity information file 66 by the commodity information retrieval section 51f, and the commodity name and the price (unit price) of the retrieved commodity are displayed on the display section 54 (step B2). The thus scanned commodity code information and the data obtained by retrieval are registered or stored as registered data into the storage section 52 by the commodity code registration section 51i (step B3).

When the customer accommodates, after the bar code 50a of the commodity 50 has been scanned, the commodity 50 into the basket section 102 of the scanning cart 100 (step B4), the total weight of the commodities in the basket section 102 into which the new commodity 50 has been accommodated is measured by the weighing equipment 58 (step B5).

Then, the difference value between the measured weight value stored in the buffer 51g-1 and the measured weight value by the weighing equipment 58 after the weight has increased is calculated as an increment in weight, that is, the weight of the commodity 50 which has just been accommodated newly into the basket section 102 by hand of the customer by the difference calculation section 51g-2 of the weight increment calculation section 51g. The increment in weight from the weight increment calculation section 51g and the weight corresponding to the commodity code information retrieved from the commodity information file 66 by the commodity information retrieval section 51f are compared with each other by the weight comparison section 51h (step B6).

If the comparison by the weight comparison section 16 reveals that the weights are equal to each other (substantially equal within a predetermined tolerance), that is, if the determination at step B7 is NO, the control sequence returns in order to wait for reading of a next bar code 50a.

On the contrary if it is determined at step B7 that the actual increment in weight and the weight corresponding to the commodity code information are different from each other, the buzzer 59 is sounded to notify an error to the customer (step B8). The sounding operation of the buzzer 59 is continued until the actual increment in weight and the weight corresponding to the commodity code information become coincident with each other, thereby to prevent reading or registration of a next commodity code. It is to be noted that the error notification to the customer may be performed not only by the sounding operation of the buzzer 59 but also by an alarm displaying operation of the display section 54.

Further, in the present embodiment, similarly as in the first embodiment, while the scanning cart 100 is used in order for a customer to purchase commodities, the total weight of the commodities 50 in the basket section 102 of the scanning cart 100 is normally supervised by the weighing equipment 58 and the weight determination section 51a, and when it is determined that the total weight of the commodities 50 in the basket section 102 from the weighing equipment 58 has increased without scanning a bar code 50a, a warning to the customer is immediately given there by a sounding operation of the buzzer 59 and an alarm display of the display section 54.

In this manner, according to the second embodiment of the present invention, when an intentional unjust act such as to accommodate a plurality of commodities at a time into the basket section 102 while scanning (registering) part of the commodities, to accommodate a commodity having a different weight from that of a registered commodity into the basket section 102 or to accommodate a commodity into the basket section 102 without scanning (registering) the same is performed or when an inadvertent (accidental) unjust act such as a miss of scanning or a scanning error occurs, the unjust act is detected by checking the total weight of the commodities 50 in the basket section 102. Consequently, such unjust acts as described above can be prevented with certainty.

Accordingly, similar safety to that of a conventional POS system in which settlement of accounts is performed by way of a scanning operation of an operator can be provided to a store side which has adopted the present POS system, and better services can be provided to the store side and customers.

It is to be noted that, while the commodity information file 66 in the embodiment described above is provided in the control system of the scanning cart 100, the commodity information file may alternatively be provided in an upper control section, and in this instance, retrieval of weight information is performed by way of communications between the commodity information retrieval section 51f and the upper control section having the commodity information file by way of the communication section 53.

Further, while, in the embodiment described above, commodity code information read from the bar code 50a of a commodity 50 by the scanner 57 is registered or stored into the storage section 52 in the scanning cart 100 by the commodity code registration section 51i, the commodity code information may otherwise be transmitted to the upper control section by way of the communication section 53 so that it may be registered or stored into the storage section in the upper control section.

d. Third Embodiment

Figure 18:
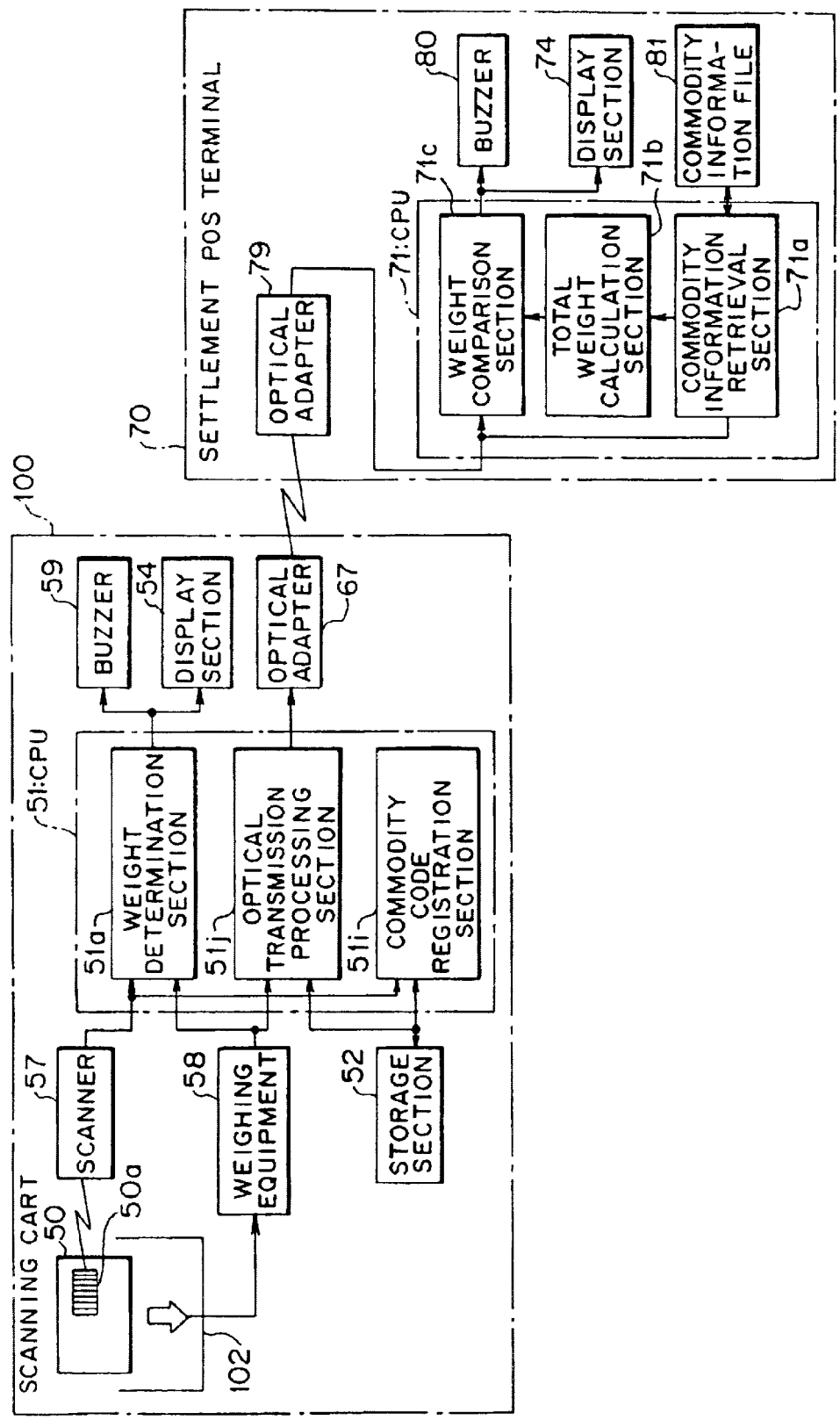
FIG. 18 is a block diagram showing a functional construction of a POS system according to a third preferred embodiment of the present invention.
Figure 19:
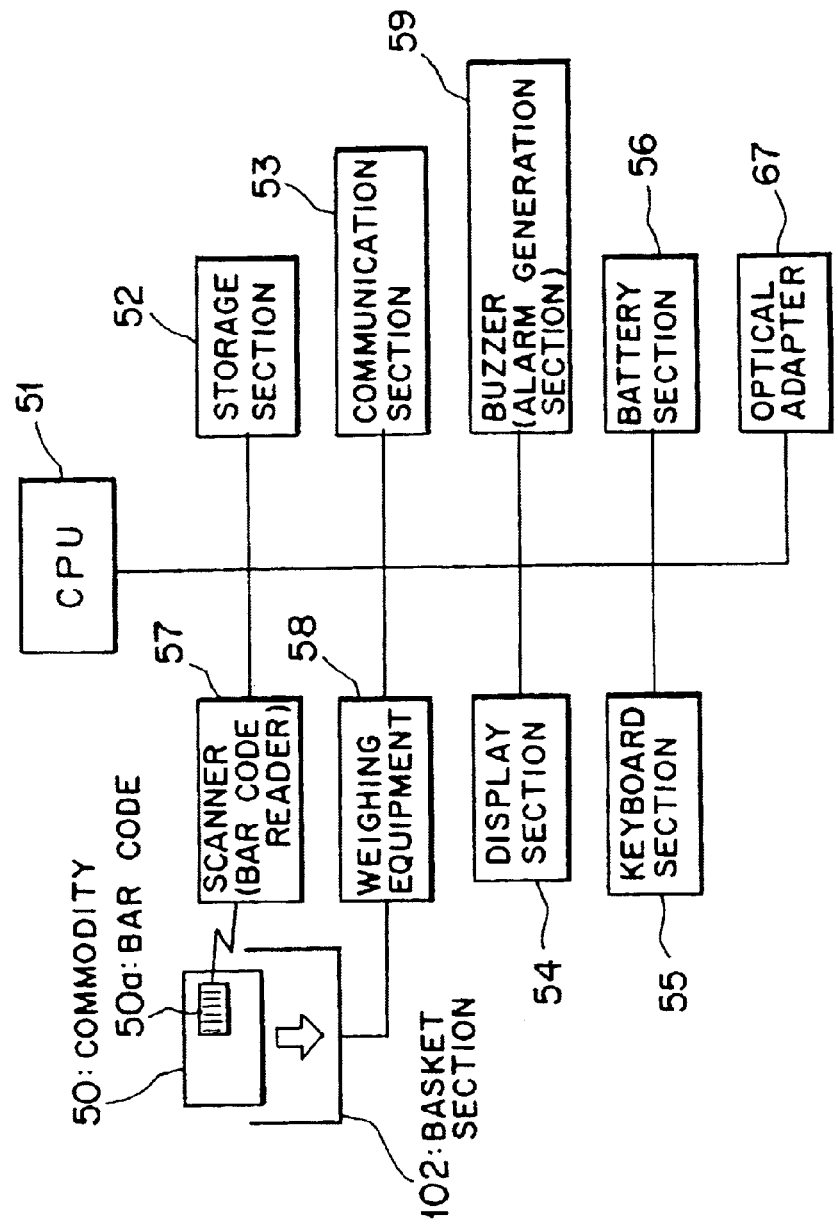
FIG. 19 is a block diagram showing a hardware construction of a control system of a purchased commodity accommodating and transporting apparatus in the POS system shown in FIG. 18.
Figure 20:
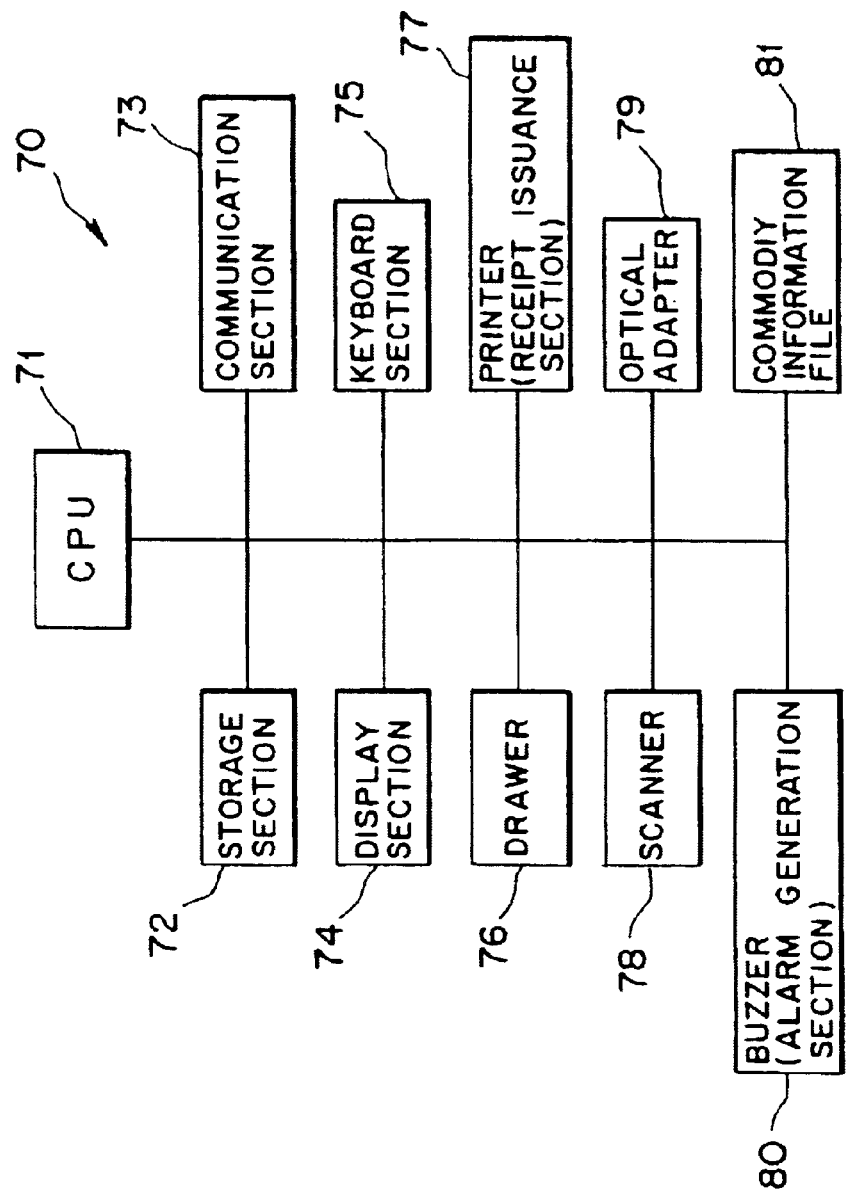
FIG. 20 is a block diagram showing a hardware construction of a settlement POS terminal employed in the POS system shown in FIG. 18.

Referring now to FIGS. 18 to 21, there is shown a POS system according to a third embodiment of the present invention. The POS system of the present embodiment is a modification to the POS system in the first embodiment described above and similarly employs the scanning cart 100 shown in FIGS. 10 and 11. In the POS system of the present embodiment, the control system of the scanning cart 100 and a settlement POS terminal 70 are constructed in such a manner as shown in FIGS. 19 and 20, respectively, in order to prevent an intentional or accidental unjust act.

Referring first to FIG. 18, the hardware construction of the control system of the scanning cart 100 in the present embodiment is different from that of the first embodiment (refer to FIG. 8) in that it additionally includes an optical adapter (data transmission section) 67.

The optical adapter 67 is provided for communicating, upon final settlement of accounts at the settlement POS terminal 70, an optical signal with another optical adapter 79 on the settlement POS terminal 70 side and transmits the total weight of commodities 50 in the basket section 102 weighed by the weighing equipment 58 and further transmits commodity code registered data stored in the storage section 52.

Meanwhile, the settlement POS terminal 70 is provided for retrieving a commodity information file 81, which will be hereinafter described, in accordance with commodity code information registered in the commodity code registration section 61i of the scanning cart 100 to effect final settlement of accounts for the purchased commodities accommodated in the basket section 102 of the scanning cart 100. The settlement POS terminal 70 in the present embodiment has such hardware construction as shown in FIG. 20.

In particular, referring to FIG. 20, the settlement POS terminal 70 includes a CPU 71 for controlling the entire settlement POS terminal 70, a storage section 72 for storing a program and various data, a communication section 73 for communicating data with an upper control section such as a station controller or a store controller by wireless (infrared rays or the like), a display section 74 for displaying various information (a receipt image of a result of settlement of accounts, an alarm display which will be hereinafter described, and so forth), a keyboard section 75 for inputting various information, and a drawer 76 (drawer section) for accommodating cash therein.

The settlement POS terminal 70 further includes a printer (receipt issuance section) 77 for issuing a result of settlement of accounts as a receipt, a scanner (bar code reader) 78 for reading a bar code at the settlement POS terminal 70 when necessary, and an optical adapter (data reception section) 79 for communicating an optical signal with the optical adapter 67 on the scanning cart 100 side as described hereinabove. Commodity total weight data or commodity code registered data from the scanning cart 100 is received by the optical adapter 79.

The settlement POS terminal 70 further includes a buzzer (alarm sound generation section, alarm generation section) 80 for generating sound in response to a control signal from the CPU 71 to generate an alarm, and a commodity information file 81 similar to the commodity information file 66 of the second embodiment. The commodity information file 81 is normally used as a PLU file and has commodity information such as commodity numbers, commodity names, prices (unit prices), weights and so forth corresponding to commodity code information.

The POS system of the third embodiment is functionally constructed in such a manner as shown in FIG. 18 from the scanning cart 100 and the settlement POS terminal 70 described above.

In particular, referring to FIG. 18, the CPU 51 of the scanning cart 100 has functions as the weight determination section 51a and the commodity code registration section 51i described above and further has a function as an optical transmission processing section 51j.

The optical transmission processing section 51i performs, upon settlement of accounts at the settlement POS terminal 70, processing for transmitting the total weight of the commodities 50 in the basket section 102 measured by the weighing equipment 58 and the commodity code registered data stored in the storage section 52 to the settlement POS terminal 70 side by the optical adapter 67.

Meanwhile, the CPU 71 in the settlement POS terminal 70 has functions as a commodity information retrieval section (commodity weight retrieval section) 71a, a total weight calculation section 71b and a weight comparison section 71c.

The commodity information retrieval section 71a retrieves commodity information (commodity numbers, commodity names, prices (unit prices), weights) of all of the commodities 50 registered at the scanning cart 100 from the commodity information file 81 in accordance with the entire commodity code information (registered data) transmitted thereto from the scanning cart 100 side by way of the optical adapters 67 and 79.

The total weight calculation section 71b receives the weight information of all of the commodities 50 registered at the scanning cart 100 retrieved by the commodity information retrieval section 71a and calculates a total weight of the weights of all of the commodities.

The weight comparison section 71c compares the total weight calculated by the total weight calculation section 71b and the total weight of the commodities 50 in the basket section 102 received from the scanning cart 100 side by way of the optical adapter 79.

If it is determined by the weight comparison section 71c that the total weight calculated by the total weight calculation section 71b and the total weight of the commodities received from the scanning cart 100 side are different from each other, the buzzer 80 is sounded and an alarm display is displayed on the display section 74 in response to a control signal from the weight comparison section 71c.

It is to be noted that, also in the present embodiment, the weight determination section 51a similar to that of the first embodiment is provided in the scanning cart 100, and when it is determined by the weight determination section 51a that the total weight of the commodities 50 in the basket section 102 measured by the weighing equipment 58 has increased without reading a bar code 50a by the scanner 57, a sounding operation of the buzzer 59 and an alarm display of the display section 54 are performed.

Figure 21:
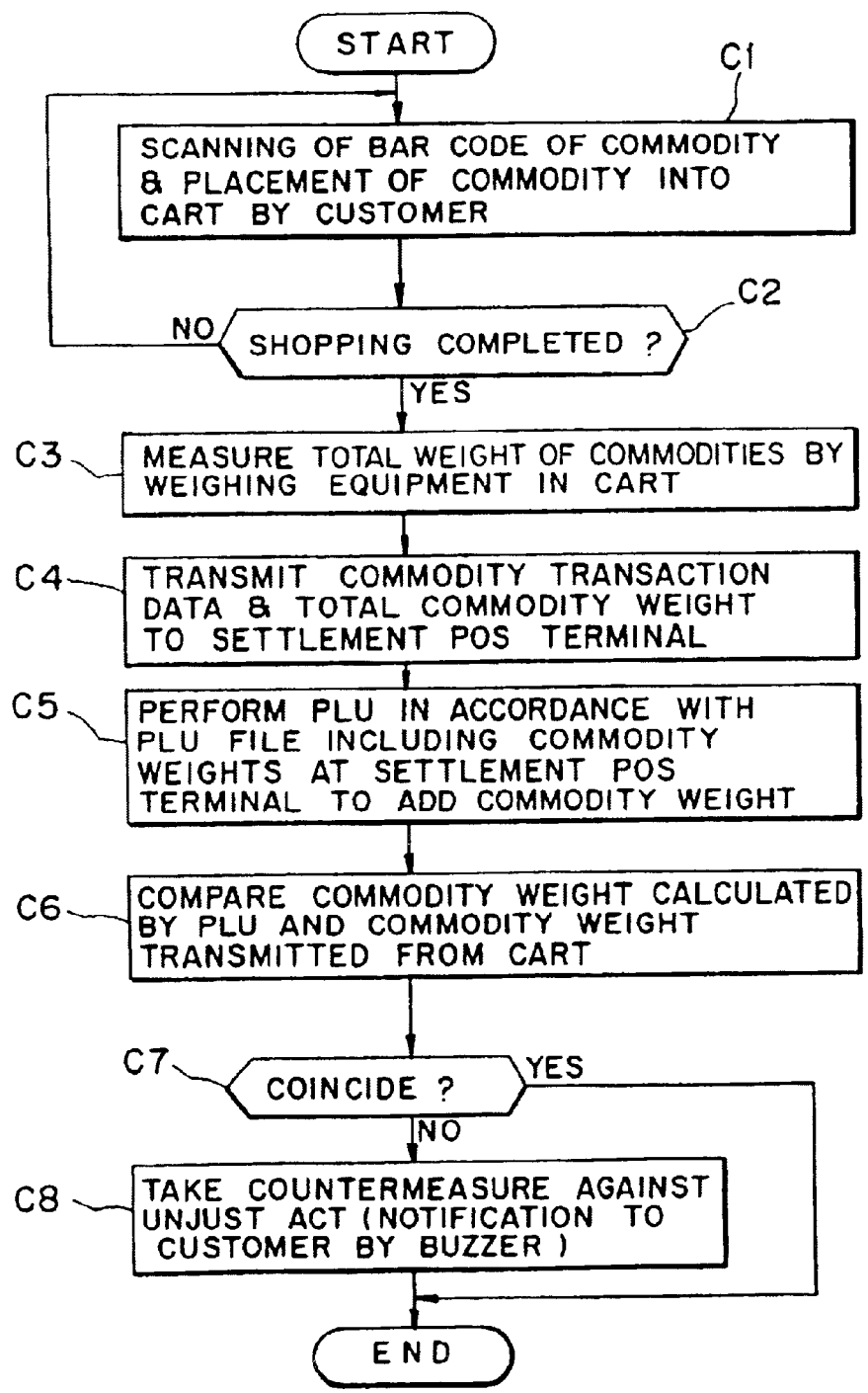
FIG. 21 is a flow chart illustrating operation of the POS system shown in FIG. 18.

The POS system of the third embodiment of the present invention having the construction described above operates in such a manner as illustrated in FIG. 21. Referring to FIG. 21, a customer itself will read the bar code 50a applied to a commodity to be purchased by means of the scanner 57 to register the commodity code information into the storage section 52 and load or accommodate the commodity into the basket section 102 (step C1). Then, it will depress the end key on the keyboard section 55 to end selection of commodities to be purchased (step C2), place the commodities into the scanning cart 100 and transport them to the settlement POS terminal 70.

Then, upon settlement of accounts at the settlement POS terminal 70, the commodity code information registered by the customer itself is transmitted from the storage section 52 of the scanning cart 100 to the settlement POS terminal 70 side by way of the optical transmission processing section 51i and the optical adapters 67 and 79, and the commodity information retrieval section 71a retrieves, in accordance with the individual commodity code information transmitted thereto, the prices (unit prices) of the commodities corresponding to the commodity code information from the commodity information file 81, calculates the total amount of the purchased commodities, and performs issuance of a receipt by the printer 77 or the like to effect final settlement of the accounts.

Upon settlement processing by such settlement POS terminal 70, in the present embodiment, the total weight of the commodities in the basket section 102 of the scanning cart 100 is measured by the weighing equipment 58 (step C3), and the total weight of the commodities is transmitted to the settlement POS terminal 70 side by way of the optical transmission processing section 51i and the optical adapters 67 and 79 (step C4).

Meanwhile, at the settlement POS terminal 70, the weights of the commodities 50 are retrieved from the commodity information file 81 by the commodity information retrieval section 71a in accordance with the commodity code information transmitted from the storage section 52 of the scanning cart 100 to the settlement POS terminal 70 side by way of the optical transmission processing section 51i and the optical adapters 67 and 79, and the total weight of the retrieved weights of the commodities 50 is calculated by the total weight calculation section 71b (step C5).

Then, the total weight calculated by the total weight calculation section 71b and the total weight data of the commodities from the scanning cart 100 are compared with each other by the weight comparison section 71c (step C6), and when it is determined, as a result of the comparison, that those weights coincide with each other (actually substantially coincide with each other within a predetermined tolerance), that is, when the determination at step C7 is YES, account settlement processing by the settlement POS terminal 70 is ended.

On the contrary when it is determined at step C7 that the weights described above do not coincide with each other, the buzzer 80 is sounded and an alarm display is displayed on the display section 74 to notify the error to the customer and an operator of the settlement POS terminal 70 so as to take some countermeasure against the unjust act (step C8).

Further, in the present embodiment, similarly as in the first embodiment, while a customer uses the scanning cart 100 in order to purchase commodities, the total weight of the commodities 50 in the basket section 102 of the scanning cart 100 is normally monitored by the weight determination section 51a, and when it is determined that the total weight of the commodities 50 in the basket section 102 from the weighing equipment 58 has increased without scanning a bar code 50a, a warning to the customer is immediately given there by a sounding. operation of the buzzer 59 and an alarm display of the display section 54.

In this manner, according to the third embodiment of the present invention, similar effects to those of the second embodiment are obtained.

It is to be noted that, while the commodity information file 81 in the embodiment described above is provided in the settlement POS terminal 70, it may alternatively be provided in an upper control section. In this instance, retrieval of weight information is performed by communications between the commodity information retrieval section 71a and the upper control section which has the commodity information file 81 by way of a communication section 83.

Further, while, in the embodiment described above, commodity code information read from the bar code 50a of a commodity 50 by the scanner 57 is registered or stored into the storage section 52 in the scanning cart 100 by the commodity code registration section 51i, the commodity code information may alternatively be transmitted to the upper control section by way of the communication section 53 so that it may be registered or stored into a storage section of the upper control section.

In this instance, upon settlement of the accounts at the settlement POS terminal 70, the commodity code information registered by the scanning cart 100 is transmitted from the upper control section to the commodity information retrieval section 71a by way of the communication section 73. In this instance, also total weight information of the commodities upon settlement of the accounts from the weighing equipment 58 may additionally be transmitted to the settlement POS terminal 70 side by way of the communication section 53, the upper control section and the communication section 73, and where such data transmission is performed, the optical adapters 67 and 79 may be omitted.

e. Fourth Embodiment

Figure 22:
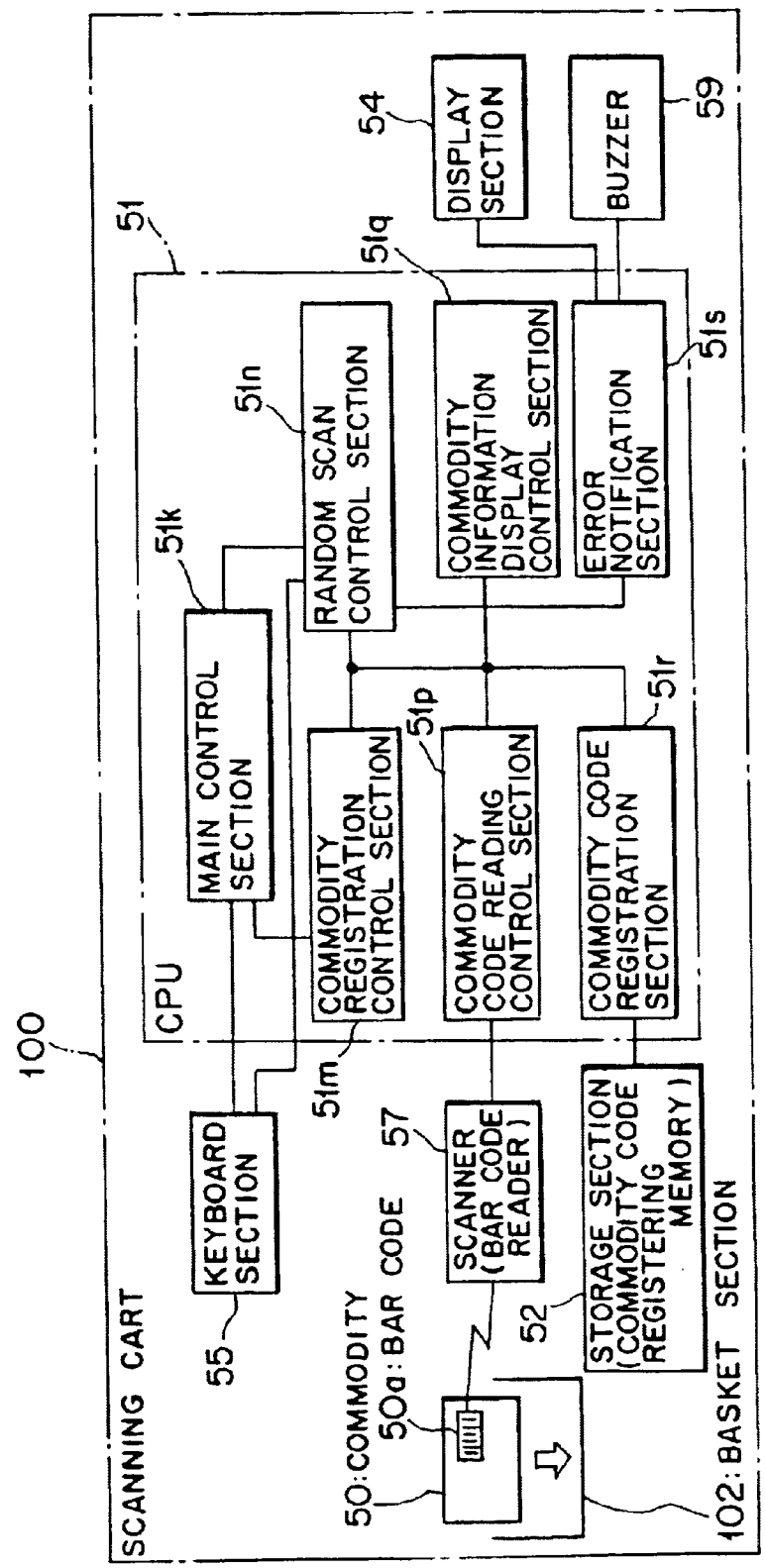
FIG. 22 is a block diagram showing a functional construction of a purchased commodity accommodating and transporting apparatus according to a fourth preferred embodiment of the present invention.
Figure 23:
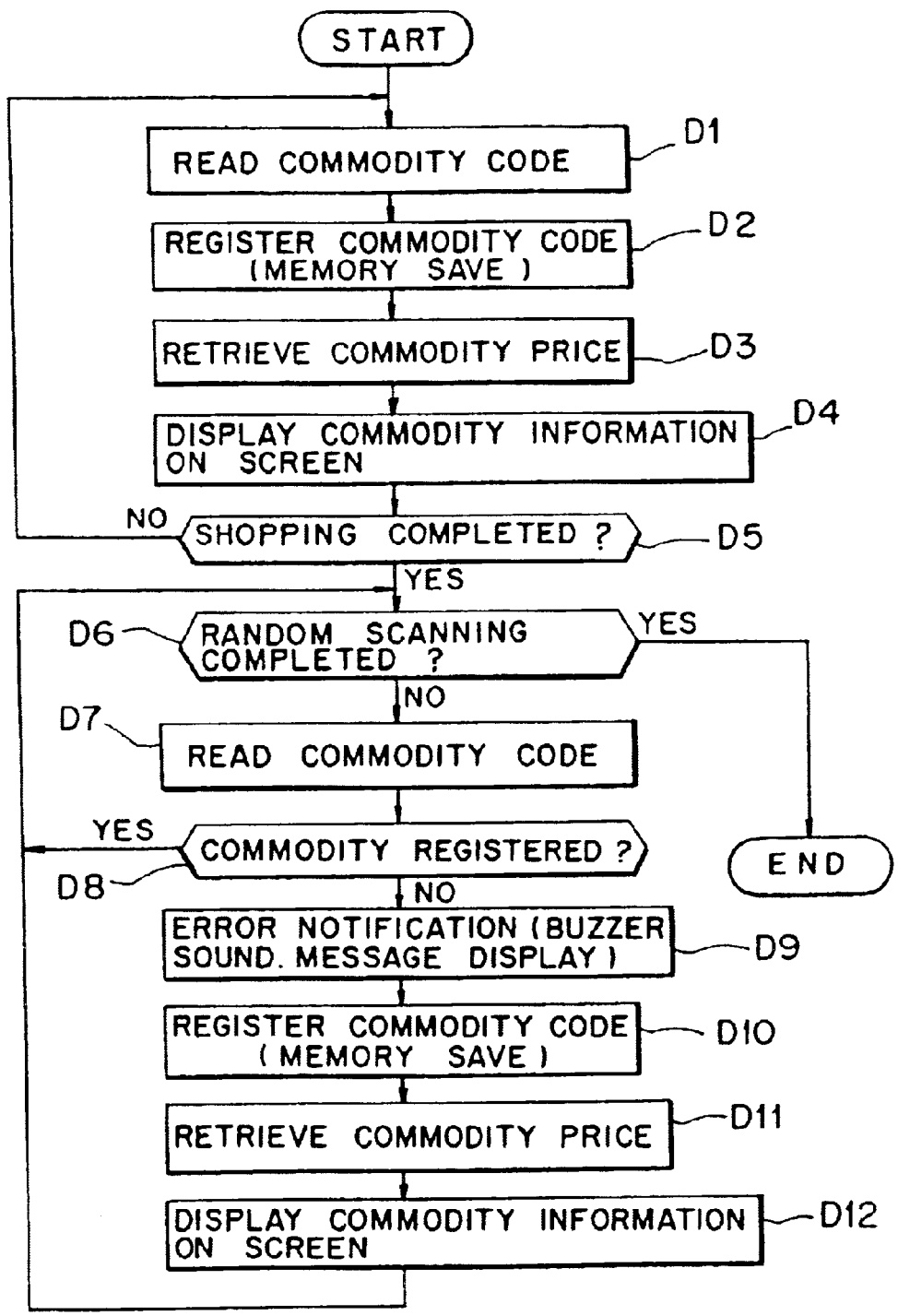
FIG. 23 is a flow chart illustrating operation of the purchased commodity accommodating and transporting apparatus shown in FIG. 22.

Referring now to FIG. 22, there is shown a purchased commodity accommodating and transporting apparatus according to a fourth embodiment of the present invention. The purchased commodity accommodating and transporting apparatus of the present embodiment is a modification to that in the first embodiment described above and similarly employs the scanning cart 100 shown in FIGS. 10 and 11.

While the hardware construction of the control system of the scanning cart 100 in the fourth embodiment is substantially similar to that of the first embodiment (refer to FIG. 8), in the present embodiment, the weighing instrument 58 for measuring the total weight of commodities 50 in the basket section 102 is omitted. Meanwhile, the scanner 57 in the present embodiment is used to read, upon random scan checking (which will be hereinafter described) which is performed by an operator upon settlement of accounts, the bar code 50a of a commodity 50 selected at random from the commodities accommodated in the basket section 102.

The control system of the scanning cart 100 in the present embodiment is functionally constructed in such a manner as illustrated in FIG. 22.

In particular, referring to FIG. 22, the CPU 51 of the scanning cart 100 has functions as a main control section 51k, a commodity registration control section 51m, a random scan control section (commodity registration determination section) 51n, a commodity code reading control section 51p, a commodity information display control section (commodity price retrieval section) 51q, a commodity code registration section 51r, and an error notification section 51s.

The main control section 51k controls the CPU 51 and effects, for example, input control (input control upon starting of use of the scanning cart 100 (depression of the start key), upon ending of purchasing (depression of the end key), upon ending of random scan checking and so forth) of various data from the keyboard section 55, accessing to the commodity registration control section 51m during shopping, accessing to the random scan control section 51n upon starting of random scan checking, and some other necessary control.

The commodity code reading control section 51p is provided to control reading of a bar code 50a by the scanner 57 and controls inputting of commodity code information obtained by reading the bar code 50a by the scanner 57 to the CPU 51.

The commodity registration control section 51m is accessed from and activated by the main control section 51k upon inputting of starting of use from the keyboard section 55 by a customer. The commodity registration control section 51m reads in, during shopping of the customer, commodity code information from the scanner 57 by the commodity code reading control section 51p and registers or stores (saves) the commodity code information into the storage section (commodity code registering memory) 52 using the commodity code registration section 51r.

The commodity information display control section (commodity price retrieval section) 51q is activated together with the commodity registration control section 51m and, simultaneously when commodity code information read in by the scanner 57 and the commodity code reading control section 51p is registered, performs, based on the commodity code information thus read in, retrieval of commodity information such as the price of the commodity from the commodity information file (not shown in FIG. 22) described hereinabove, whereafter it controls the display section 54 to display a result of the retrieval (the commodity name and the price (unit price)), the purchased quantity and the total amount of money thereon.

It is to be noted that the commodity information file may be provided in the control system of the scanning cart 100 or alternatively may be provided in the upper control section such as a station controller. However, where the commodity information file is provided in the upper control section, retrieval of commodity information such as a price is performed by way of communications between the commodity information display control section 51q and the upper control section having the commodity information file by way of the communication section 53.

The random scan control section (commodity registration determination section) 51n is accessed from and activated by the main control section 51k when a customer depresses the end key of the keyboard section 55 in order to end its shopping, and has a function of determining whether or not commodity code information read in from the commodity code reading control section 51p upon a random scan checking operation (an operation of scanning the bar code 50a of a commodity 50 selected at random from within the basket section 102 by means of the scanner 57) by an operator of a settlement POS terminal has been registered into the storage section 52 by the commodity code registration section 51r.

The error notification section 51s is activated when it is determined by the random scan control section 51n that commodity code information read in upon a random scan checking operation has not been registered, and causes the buzzer 59 to perform a sounding operation and causes the display section 54 to display an error message to notify the error to the customer or the operator.

Further, in the present embodiment, when it is determined by the random scan control section 51n that commodity code information read in upon a random scan checking operation has not been registered, the commodity code information of the commodity which has not been registered is automatically registered into the storage section 52 using the commodity registration control section 51m and the commodity code registration section 51r.

In the scanning cart 100 in the fourth embodiment of the present invention having the construction described above, when a customer starts shopping using the scanning cart 100, the start key of the keyboard section 55 will first be depressed to perform inputting of starting of use, whereupon the commodity registration control section 51m is started by the main control section 51k.

For a period of time until inputting of ending of use is performed from the keyboard section 55 after starting of use, the customer scans the bar code 50a of a commodity 50 to be purchased by means of the scanner 57 so that commodity code information is read in from the scanner 57 by means of the commodity code reading control section 51p (step D1), and then accommodates the commodity into the basket section 102.

Then, after the commodity code information is read in, the commodity code information is registered or stored into the storage section 52 using the commodity code registration section 51r by the commodity registration control section 51m (step D2).

Meanwhile, in accordance with the commodity code information, commodity information such as the price of the commodity is retrieved from the commodity information file by the commodity information display control section 51q (step D3), and a result (commodity name, price (unit price)) of the retrieval, the amount to be purchased and the total amount of money are displayed on the display section 54 (step D4).

The processes at the steps D1 to D4 are repeated until the customer depresses the end key of the keyboard section 55 to effect inputting of ending of use (step D5).

When the customer depresses the end key of the keyboard section 55 to end its shopping, the random scan control section 51n is activated by the main control section 51k so that a random scan checking condition is entered. The activated condition of the random scan control section 51n is continued until inputting of ending the random scan checking is performed from the keyboard section 55 (step D6).

At the settlement POS terminal, upon settlement of the accounts, random scan checking is performed for a commodity in the basket section 102 of the scanning cart 100 by the operator. In particular, the operator of the settlement POS terminal selects a commodity 50 at random from within the basket section 102 and scans the bar code 50a of the commodity 50 by means of the scanner 57 to read in commodity code information from the scanner 57 by the commodity code reading control section 51p (step D7).

Thereafter, it is determined by the random scan control section 51n whether or not the commodity code information read in at random in such a manner as described above is registered in the storage section 52 (step D8). When it is determined that the commodity code information is registered, the control sequence returns to step D6, but when it is determined that the commodity code information is not registered as yet, the error notification section 51s is activated so that sounding of the buzzer 59 and error message display of the display section 54 are performed by the error notification section 51s so that the error that the commodity has not been registered is notified to the customer or the operator (step D9).

Then, the commodity code information which has been determined that it has not been registered is automatically registered or stored into the storage section 52 using the commodity registration control section 51m and the commodity code registration section 51r in a similar manner as at steps D2 to D4 described above (step D10), and in accordance with the commodity code information, commodity information such as the price of the commodity is retrieved from the commodity informations file by the commodity information display control section 51q (step D11). Then, a result of the retrieval (the commodity name and the price (unit price)) and so forth are displayed on the display section 54 (step d12).

In this manner, according to the fourth embodiment of the present invention, upon settlement of the accounts at the settlement POS terminal or the like, random scan checking can be performed by the operator using the scanner 57, and if there is a commodity which has been accommodated into the basket section 102 without performing scanning whether it is intentional or accidental, then the unjust act can be notified as an error and the commodity can be automatically registered.

Accordingly, an unjust act by a customer such as shoplifting can be prevented without imposing a burden on an operator of a settlement POS terminal and without taking such a countermeasure as to change the color of the bar code 50a, and occurrence of an unjust act upon introduction of a POS system which involves self scanning can be prevented with certainty.

f. Fifth Embodiment

Referring now to FIGS. 24 to 27, there is shown a POS system according to a fifth embodiment of the present invention. The POS system of the present embodiment is a modification to the POS system in the first embodiment described above and similarly employs the scanning cart 100 shown in FIGS. 10 and 11.

Figure 24:
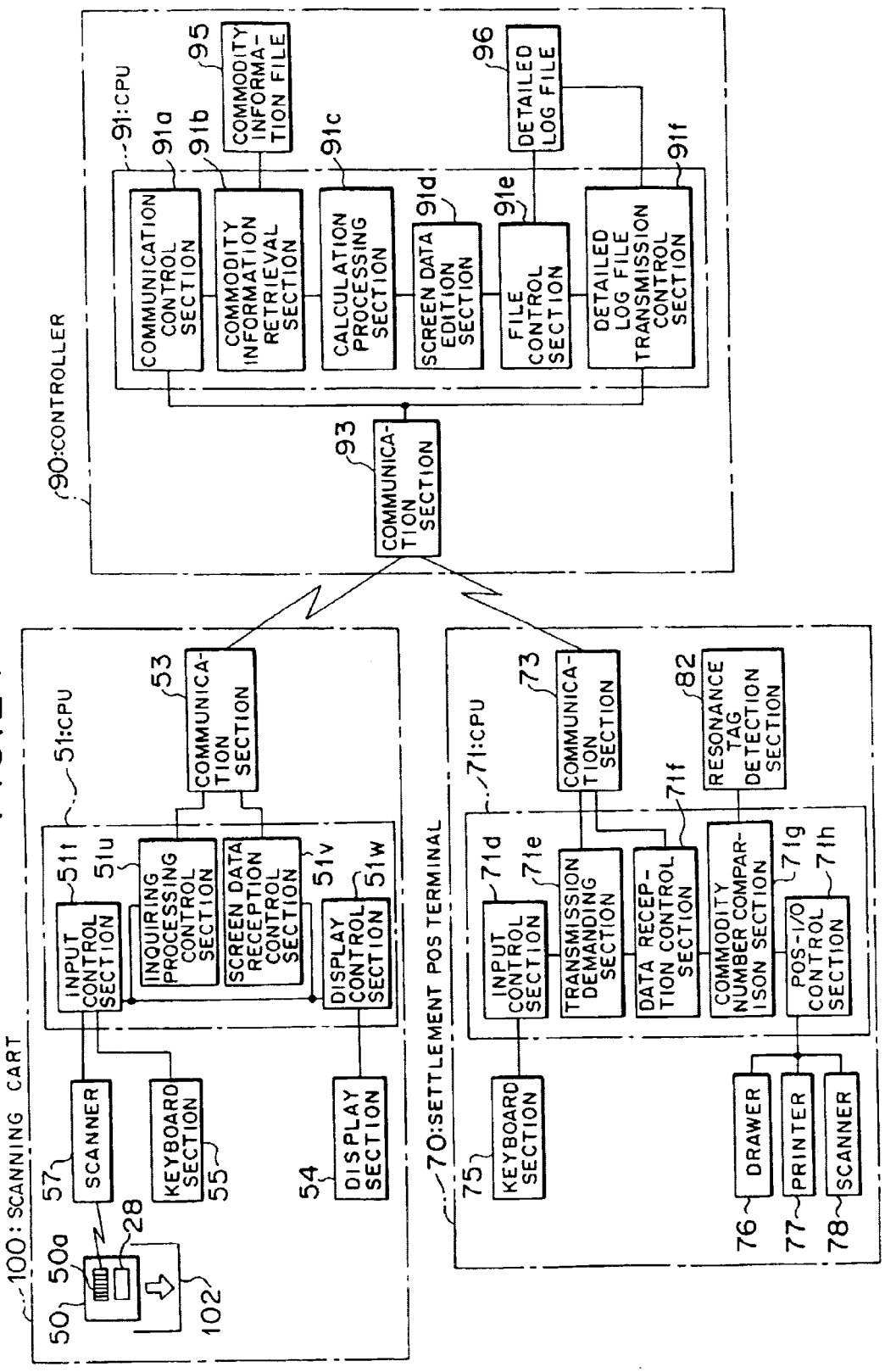
FIG. 24 is a block diagram showing a functional construction of a POS system according to a fifth preferred embodiment of the present invention.
Figure 25:
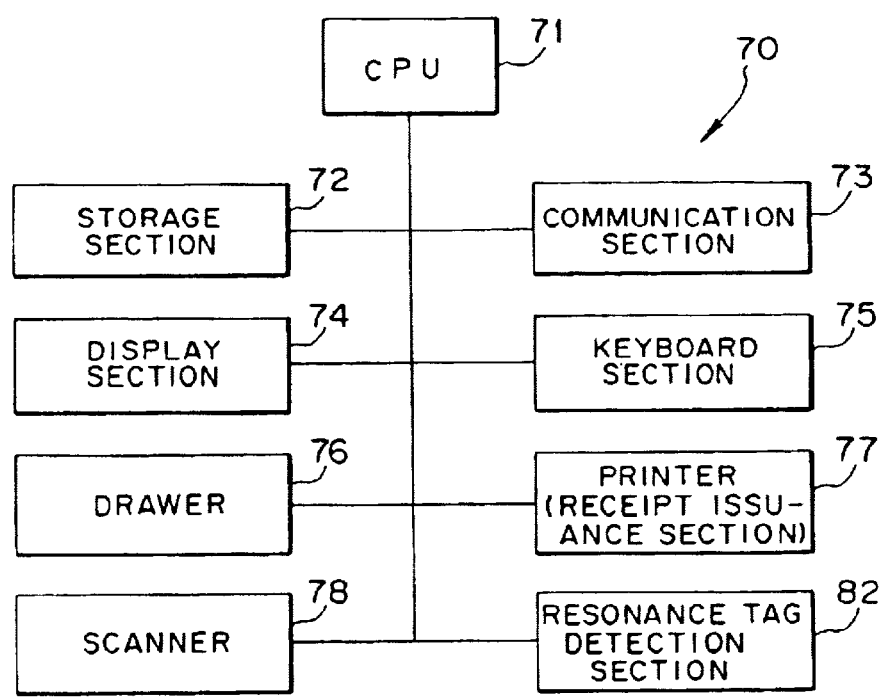
FIG. 25 is a block diagram showing a hardware construction of a settlement POS terminal employed in the POS system shown in FIG. 24.
Figures 26, 27:
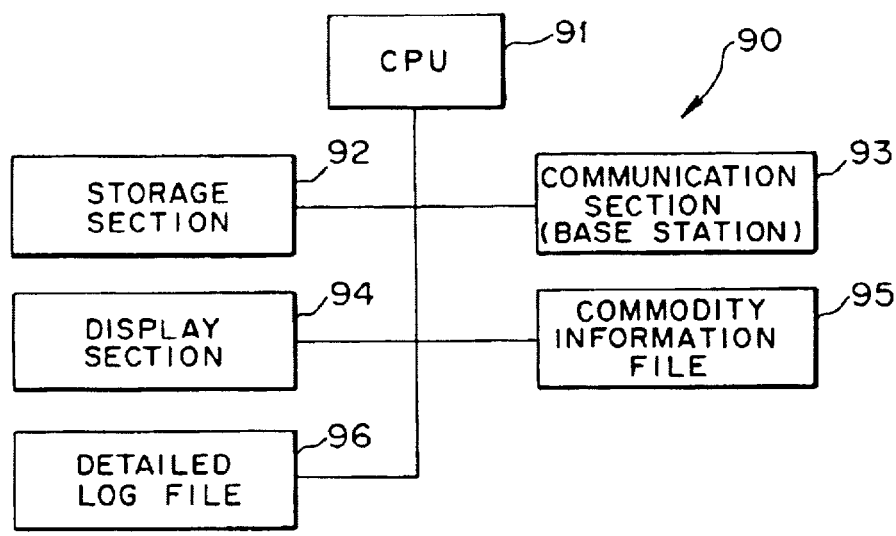
FIG. 26 is a block diagram showing a hardware construction of a controller or upper control section of the POS system shown in FIG. 24.
FIG. 27 is a view showing an exemplary display of a display section of a purchased commodity accommodating and transporting apparatus of the POS system shown in FIG. 24.
Figure 28:
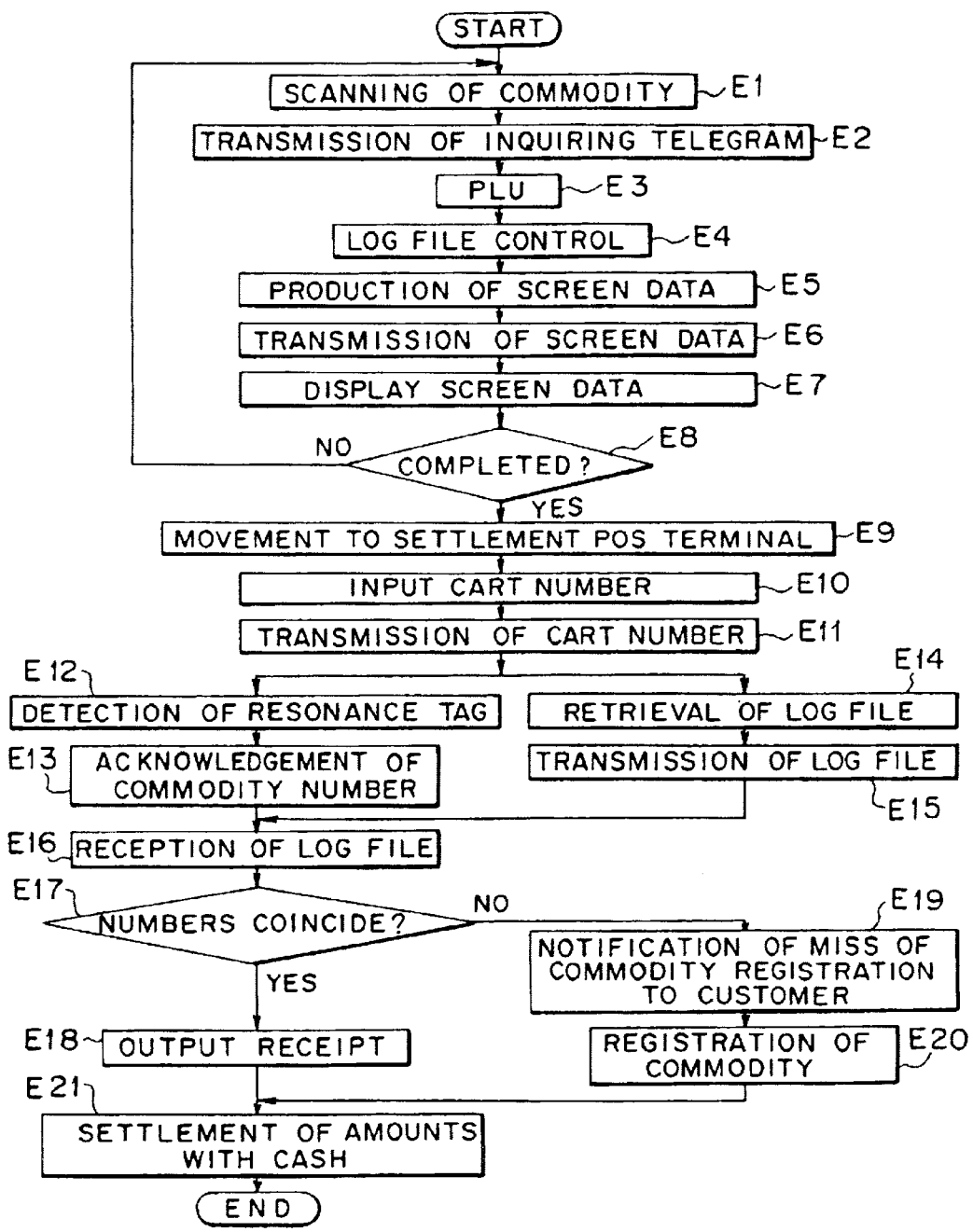
FIG. 28 is a flow chart illustrating operation of the POS system shown in FIG. 24.

In the present fifth embodiment, in order to prevent an intentional or accidental unjust act in the POS system which employs such scanning cart 100 as shown in FIGS. 10 and 11, the control system of the scanning cart 100, the settlement POS terminal 70 and a controller (upper control section) 90 are constructed in such a manner as shown in FIGS. 24 to 26.

While the hardware construction of the control system of the scanning cart 100 in the present embodiment is substantially similar to that of the first embodiment (refer to FIG. 8), in the present embodiment, the measuring instrument reference numeral 58 for measuring the total weight of the commodities 50 in the basket section 102 and the buzzer 59 may be omitted.

Meanwhile, the settlement POS terminal 70 in the present embodiment performs final settlement of accounts for purchased commodities accommodated in the basket section 102 of the scanning cart 100 in accordance with a detailed log (produced in accordance with commodity code information registered from the scanning cart 100) from a detailed log file (which will be hereinafter described) of the controller 90, and the hardware construction of the settlement POS terminal 70 is substantially similar to that of the third embodiment (refer to FIG. 20). However, in the present embodiment, the optical adapter 79 and the buzzer 80 are omitted while a resonance tag detection section 82 is additionally provided as shown in FIG. 25.

The resonance tag detection section 82 detects a resonance tag 28 applied in advance to each commodity 50 together with a bar code 50*a* to detect the number of commodities 50 accommodated in the basket member 102 of the scanning cart 100, and is constructed including an antenna section provided on the opposite sides of a passage of the scanning cart 100 to a settlement position at the settlement POS terminal 70.

The resonance tag 28 is constructed as a label which has a built-in resonance circuit therein.

Where resonance tags having resonance frequencies all different from one another are used for as such resonance tag 28, when the scanning cart 100 passes the antenna section of the resonance tag detection section 82, the frequency of radio waves of the antenna section is varied so as to transmit radio waves of frequencies with which resonance tags 28 resonate, thereby to establish resonance with all of the resonance tags 28. In this instance, the number of the resonance tags 28, that is, the number of the commodities 50 in the basket section 102, can be detected from the number of resonance reactions returned from the resonance tags 28.

On the other hand, where resonance tags having an equal frequency are used for the resonance tag 28 for all commodities 50, when the scanning cart 100 passes the antenna section of the resonance tag detection section 82, radio waves of the frequency with which the resonance tags 28 resonate are transmitted from the antenna section so that they may resonate with all of the resonance tag 28. In this instance, the number of the resonance tags 28, that is, the number of the commodities 50 in the basket section 102, can be detected from the magnitude (total magnitude) of the resonance reactions.

The controller 90 is an upper control section (for example, a station controller) for controlling the scanning cart 100 and the settlement POS terminal 70. The hardware construction of the controller 90 of the fifth embodiment is such as shown in FIG. 26.

In particular, referring to FIG. 26, the controller 90 includes a CPU 91 for controlling the entire controller 90, a storage section 92 for storing a program and various data, a communication section 93 for communicating data with the scanning cart 100 or the settlement POS terminal 70 by wireless (infrared rays and so forth), and a display section 94 for displaying various information (a screen edited by the CPU 91 as hereinafter described and so forth). The controller 90 further includes a commodity information file 95 used as a PLU file, in which commodity numbers, commodity names, prices (unit prices) and so forth corresponding to commodity code information are stored. The controller 90 further includes a detailed log file 96 for storing a detailed log produced in accordance with commodity code information registered from the scanning cart 100.

The POS system of the fifth embodiment is functionally constructed as illustrated in FIG. 24 from the scanning cart 100, the settlement POS terminal 70 and the controller 90 described above.

In particular, referring to FIG. 24, the CPU 51 of the scanning cart 100 has functions as an input control section 51*t*, an inquiring processing control section 51*u*, a screen data reception control section 51*v*, and a display control section 51*w*.

The input control section 51*t* executes input control for reading key input data from the keyboard section 55 and commodity code information read by the scanner 57 into the CPU 51.

The inquiring processing control section (commodity code registration section) 51*u* has a function of producing an inquiring telegraph having commodity code information of a commodity 50 read by the scanner 57 and transmitting the inquiring telegram to the controller 90 by way of the communication section 53 to register the commodity code information, and has another function of demanding screen data produced on the controller 90 side in accordance with the commodity code information as hereinafter described.

The screen data reception control section 51*v* receives screen data transmitted thereto from the controller 90 side by way of the communication section 53 in response to an inquiring telegraph transmitted from the inquiring processing control section 51*u* to the controller 90. The display control section 51*w* controls the display section 54 to display the screen data from the screen data reception control section 51*v* thereon.

The CPU 71 of the settlement POS terminal 70 has functions as an input control section 71*d*, a transmission demanding section 71*e*, a data reception control section 71*f*, a commodity number comparison section 71*g*, and a POS-I/O control section 71*h*.

The input control section 71*d* performs input control for reading key input data from the keyboard section 75 (for example, cart number data of a scanning cart 100 which makes an object for settlement of accounts at a settlement POS terminal 70) into the CPU 71. The transmission demanding section 71*e* demands, upon settlement of accounts, the controller 90 for transmission of a detailed log (detailed data) of a cart number from the input control section 71*d*.

The data reception control section 71*f* controls the communication section 53 to receive a detailed log transmitted thereto from the controller 90 side in response to a detailed log transmission demand from the transmission demanding section 71*e*.

The commodity number comparison section 71*g* compares the number of the commodities 50 detected by the resonance tag detection section 82 and the number of registered commodities obtained by referring to detailed logs received by the data reception control section 71*f*.

The POS-I/O control section 71*h* controls a printing operation of a journal/receipt by the printer 77, delivery of money by opening and closing operations of the drawer 76 and a reading operation by the scanner 78.

The CPU 91 of the controller 90 has functions as a communication control section 91*a*, a commodity price retrieval section 91*b*, a calculation processing section 91*c*, a screen data edition section 91*d*, a file control section 91*e*, and a detailed log file transmission control section 91*f*.

The communication control section 91*a* controls communications of data (an inquiring telegram, screen data to be displayed on the display section 54, and so forth) with the scanning cart 100 and the settlement POS terminal 70 by way of the communication section 93. The commodity price retrieval section 91b retrieves, in accordance with commodity code information of a commodity 50 read by the scanner 57 and transmitted thereto from the scanning cart 100 side, the commodity name, the price (unit price) and so forth of the commodity 50 from the commodity information file 95.

The calculation processing section 91c sums prices obtained by retrieving the commodity information file 95 in accordance with commodity code information from the scanning cart 100 by means of the commodity price retrieval section 91b to calculates the total amount of money of the purchased commodities 50 accommodated in the basket section 102 of the scanning cart 100.

The screen data edition section 91d produces, each time an inquiring telegram from a scanning cart 100 is received, new screen data in which the price of a commodity obtained in accordance with newly registered commodity code information is involved.

By the screen data edition section 91d, image data are produced in such a receipt image (receipt printed by the printer 77 of the settlement POS terminal 70) as shown, for example, in FIG. 27 wherein commodity information such as the price, the commodity name, the commodity number and so forth obtained by retrieval of the commodity price retrieval section 91b and a total amount of money calculated by the calculation processing section 91c are displayed. The screen data produced in response to the inquiring telegram from the scanning cart 100 in this manner are transmitted to the scanning cart 100 by way of the communication control section 91a and the communication section 93.

The file control section 91e makes a detailed log from a result of retrieval by the commodity price retrieval section 91b in accordance with commodity data information and so forth and controls storage of the detailed log into the detailed log file 96 in response to the cart number of the scanning cart 100. The file control section 91e also has a function of counting up, each time new commodity code information (inquiring telegram) is transmitted thereto, the number of such transmissions to count the number of scanned commodities and storing the counted number of commodities as information into the detailed log.

The detailed log file transmission control section 91f reads out, upon reception of a detailed log transmission demand from the transmission demanding section 71e of the settlement POS terminal 70, a detailed log corresponding to cart number information included in the detailed log transmission demand from the detailed log file 96 and controls transmission of the detailed log to the settlement POS terminal 70 by way of the communication section 93.

In the POS system of the fifth embodiment of the present invention having the construction described above, a customer reads the bar code 50a applied to a commodity to be purchased by means of the scanner 57 and inputs commodity code information of the bar code 50a (step E1), and then places and accommodates the commodity into the basket section 102.

In the CPU 51 of the scanning cart 100, each time commodity code information is read by the scanner 57, an inquiring telegram having the commodity code information is produced by the inquiring processing control section 51u and transmitted to the controller 90 by way of the communication section 53 (step E2). Consequently, the commodity code information read by the scanner 57 is registered on the controller 90 side.

In the meantime, in the CPU 91 of the controller 90 having received the inquiring telegram by way of the communication section 93, the inquiring telegram is inputted by the communication control section 91a, and the commodity information file 95 is retrieved (PLU) by the commodity price retrieval section 91b in accordance with the commodity code information included in the inquiring telegram so that commodity information such as the commodity number, the commodity tame, the price (unit price) and so forth of the commodity 50 corresponding to the commodity code information is obtained (step E3).

In this instance, a result of the retrieval by the commodity price retrieval section 91b in accordance with the commodity code information is stored as a detailed log into the detailed log file 96 in accordance with the cart number of the scanning cart 100, which has transmitted the inquiring telegram, by the file control section 91e. Upon such storage control, also the number of commodities in the scanning cart 100 counted up each time new commodity code information (inquiring telegram) is transmitted thereto is written into the detailed log by the file control section 91e (step E4).

Then, in the CPU 91, the prices retrieved by the commodity price retrieval section 91b are summed by the calculation processing section 91c to calculate the total amount of money of the purchased commodities 50 accommodated in the basket section 102 of the scanning cart 100.

Thereafter, screen data of such a receipt image as shown in FIG. 27 is produced by the screen data edition section 91d in accordance with commodity information such as the price, the commodity name, the commodity number and so forth retrieved for new commodity code information each time an inquiring telegram is received from the scanning cart 100 and the total amount of money calculated by the calculation processing section 91c (step E5).

The screen data produced in this manner are transmitted to the scanning cart 100 by way of the communication control section 91a and the communication section 93 (step E6). On the scanning cart 100 side, the screen data are received by the screen data reception control section 51v by way of the communication section 53 and displayed on the display section 54 by the display control section 51w (step E7).

The processes at the steps E1 to E7 are repeated until after the customer depresses the end key of the keyboard section 55 to effect inputting of ending of use (step E8).

The customer depresses the end key of the keyboard section 55 (or an "end" key displayed as a touch sensor on the screen of the display section 54 as shown in FIG. 27) to end its shopping, places the commodities into the scanning cart 100 and moves to the settlement POS terminal 70 (step E9).

At the settlement POS terminal 70, cart number data of the scanning cart 100 as an object for settlement of accounts are inputted from the keyboard section 75 by an operator (step E10). The inputted cart number data are inputted from the input control section 71d to the CPU 71, and the cart number is transmitted to the controller 90 side by way of the communication section 73 by the transmission demanding section 71e (step E11). Then the transmission demanding section 71e demands the controller 90 for transmission of a detailed log (detailed data) of the cart number.

Meanwhile, on the settlement POS terminal 70 side, each time a scanning cart 100 passes the antenna section of the resonance tag detection section 82 and comes to the settlement position, the resonance tags 28 in the scanning cart 100 are detected by the resonance tag detection section 82 (step E12), and the number of the commodities 50 in the basket section 102 is acknowledged (step E13).

On the other hand, on the controller 90 side, when the detailed log transmission demand from the transmission demanding section 71e of the settlement POS terminal 70 is received, a detailed log corresponding to the cart number information included in the detailed log transmission demand is retrieved and read out from the detailed log file 96 (step E14) and transmitted to the settlement POS terminal 70 by way of the communication section 93 by the detailed log file transmission control section 91f (step E15).

Then, on the settlement POS terminal 70 side, when the detailed log from the controller 90 side is received by the data reception control section 71f by way of the communication section 53 (step E16), the number of the commodities 50 acknowledged at step E13 by the resonance tag detection section 82 and the number of registered commodities stored in the detailed log received by the data reception control section 71f are compared with each other by the commodity number comparison section 71g (step E17).

When the acknowledged commodity number and the registered commodity number coincide with each other as a result of the comparison by the commodity number comparison section 71g, that is, when the determination at step E17 is YES, a receipt is outputted from the printer 77 in accordance with the detailed log from the controller 90 (step E18), and delivery of cash is performed, thereby ending the settlement of the accounts (step E21).

On the contrary when the acknowledged commodity number and the registered commodity number are different from each other as a result of the comparison by the commodity number comparison section 71g, that is, when the determination at step E17 is NO, this is displayed on the display section 74, and the operator notifies to the customer that there is a miss in registration of a commodity (step E19) and performs registration of the commodity (step E20), whereafter a receipt is outputted from the printer 77 (step E18) and delivery of cash is performed, thereby ending the settlement processing of the accounts (step E21).

In this manner, according to the fifth embodiment of the present invention, since the number of data (number of registered commodities) registered for commodity registration on a scanning cart 100 is held in the detailed log file 96 of the controller 90 and the data number and the number of acknowledged commodities detected by the resonance tag detection section 82 of the settlement POS terminal 70 are compared with each other and then a result of the comparison is notified, an operator of the settlement POS terminal 70 can confirm presence or absence of a non-registered commodity readily and can notify such presence or absence to the customer.

Accordingly, similarly as in the fourth embodiment, an unjust act by a customer such as shoplifting can be prevented without imposing a burden on an operator of a settlement POS terminal and without taking such a countermeasure as to change the color of the bar code 50a, and an restraining effect against a temptation to an unjust act can be anticipated. Consequently, occurrence of an unjust act upon introduction of a POS system which involves self scanning can be prevented with certainty.

It is to be noted that, while the commodity information file 95 in the embodiment described above is provided in the controller 90, the commodity information file may otherwise be provided in a scanning cart 100 or a settlement POS terminal 70. Where the commodity information file is provided in a scanning cart 100, a display screen for the display section 54 of the scanning cart 100 is produced on the scanning cart 100 side.

Further, while, in the embodiment described above, commodity code information read from the bar code 50a of a commodity 50 by the scanner 57 is transmitted to the controller 90 side and registered or stored as a detailed log into the detailed log file 96, the commodity code information may alternatively be registered or stored into the storage section 52 of the scanning cart 100 side.

In this instance, upon settlement of accounts at the settlement POS terminal 70, the commodity code information registered in the storage section 52 of the scanning cart 100 is transmitted to the settlement POS terminal 70 side by way of such an optical adapter as shown in FIG. 18 or by way of the controller 90.

g. Sixth Embodiment

Referring now to FIGS. 29 to 33, there is shown a purchased commodity accommodating and transporting apparatus according to a sixth embodiment of the present invention. The purchased commodity accommodating and transporting apparatus of the present embodiment is a modification to that in the first embodiment described above and similarly employs the scanning cart 100 shown in FIGS. 10 and 11.

Figure 29:
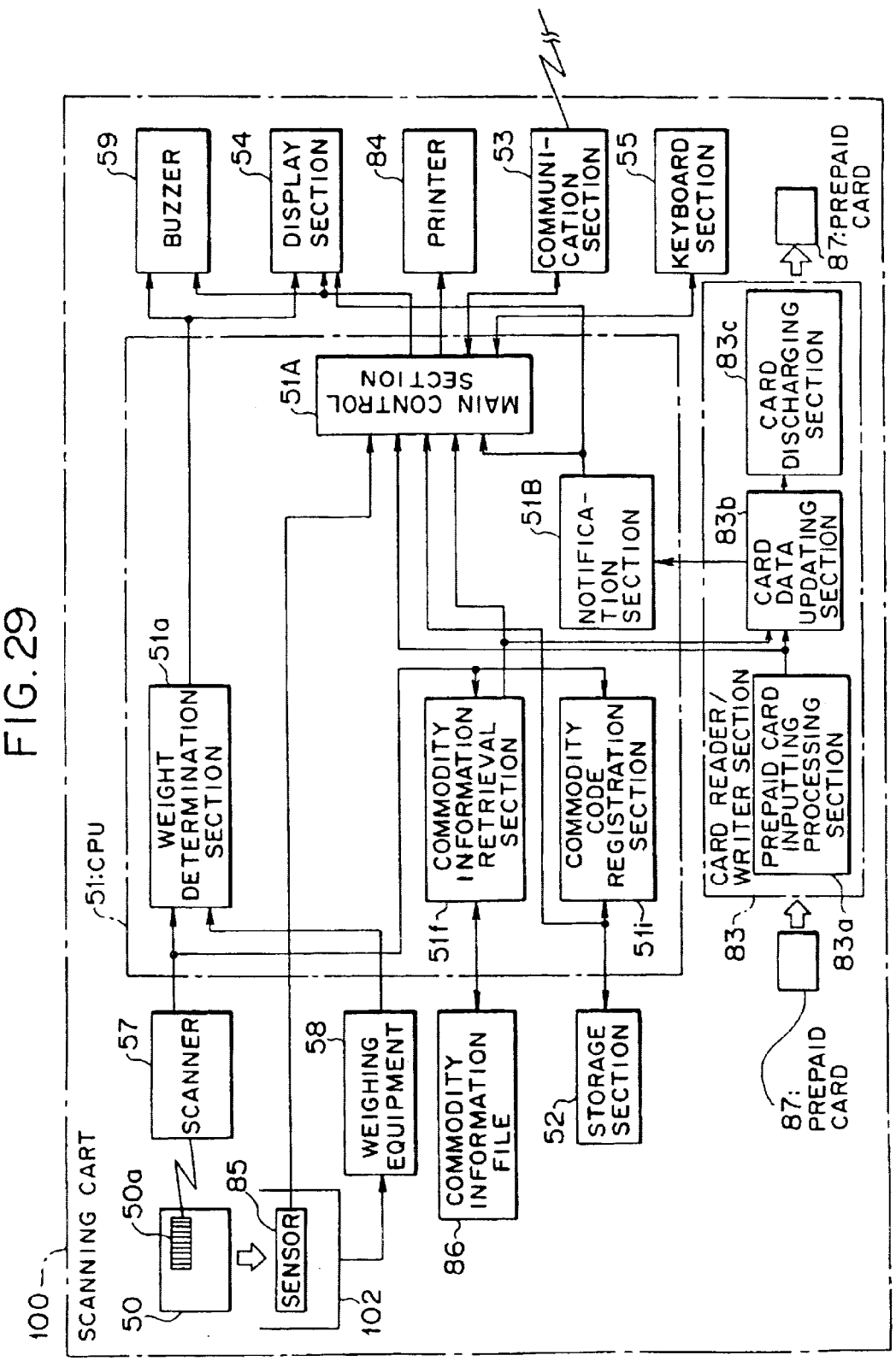
FIG. 29 is a block diagram showing a functional construction of a purchased commodity accommodating and transporting apparatus according to a sixth preferred embodiment of the present invention.
Figure 30:
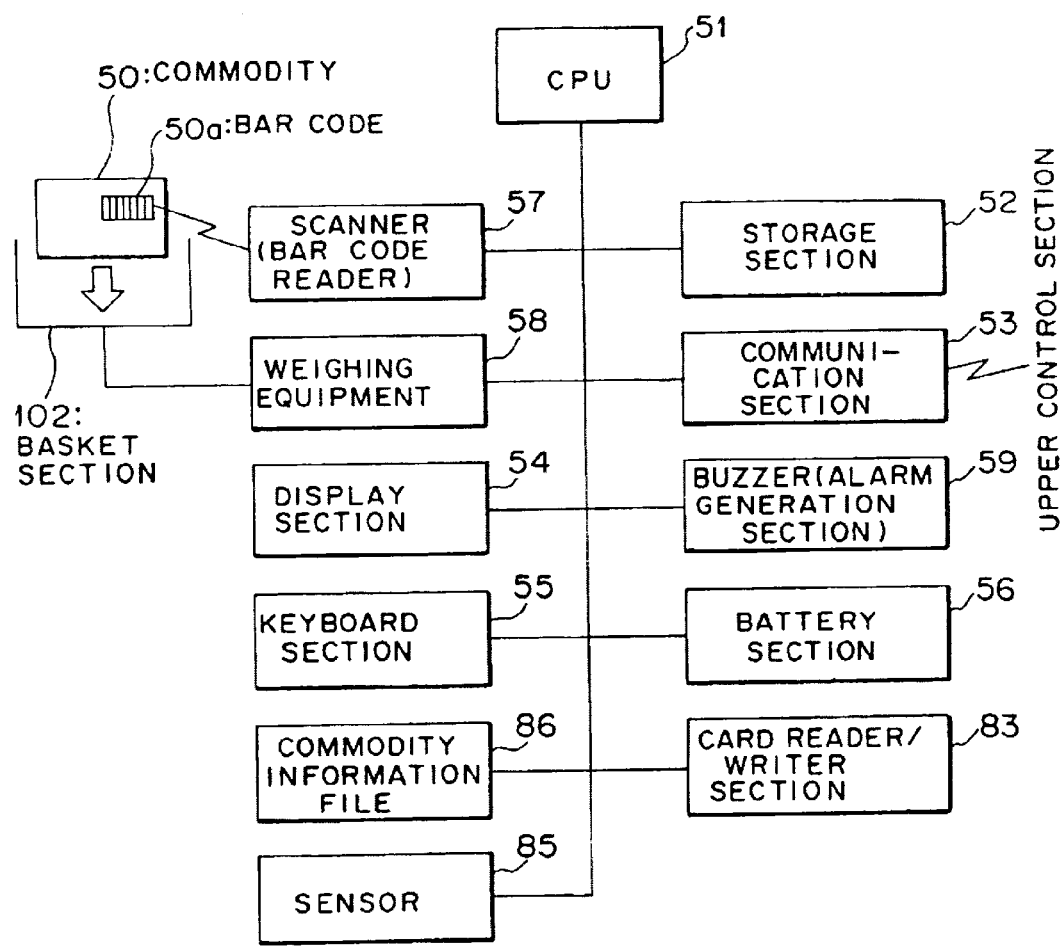
FIG. 30 is a block diagram showing a hardware construction of a control system of the purchased commodity accommodating and transporting apparatus shown in FIG. 29.

While the hardware construction of the control system of the scanning cart 100 in the sixth embodiment is substantially similar to that of the first embodiment (refer to FIG. 8), the control system in the present embodiment additionally includes, as shown in FIG. 30, a communication section 83, a printer (receipt issuance section) 84 (FIG. 29), a sensor 85, and a commodity information file 86.

The communication section 83 updates, when a prepaid card 87 is inserted into it and remains information of the prepaid card 87 is read and then purchasing and settlement of accounts based on the prepaid card 87 is performed, the remains information of the prepaid card 87 and then discharges the prepaid card 87 as hereinafter described in detail with reference to FIG. 29.

Figure 31:
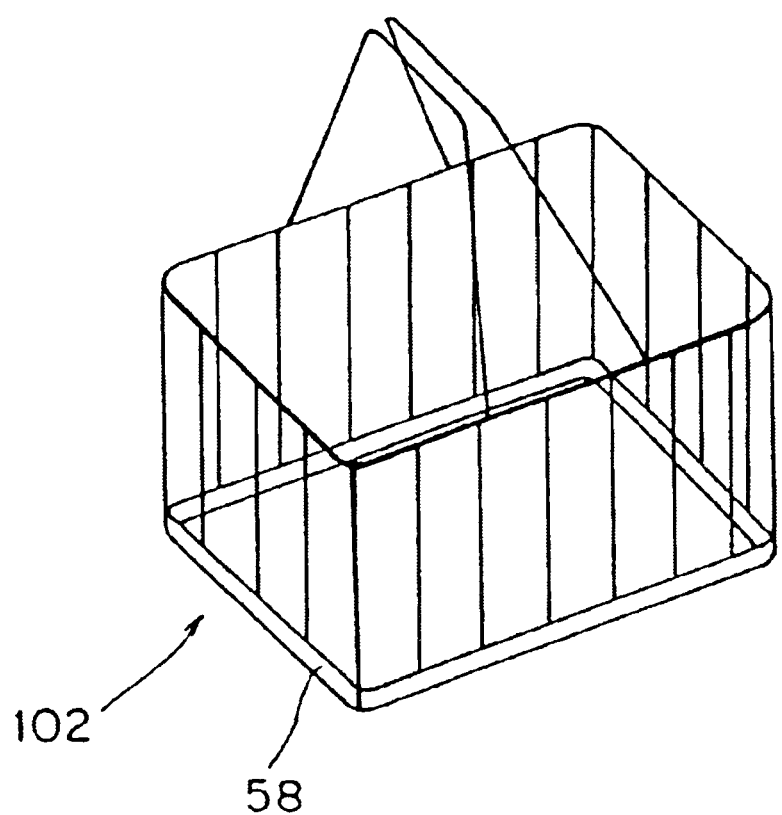
FIG. 31 is a perspective view showing an accommodation section of the purchased commodity accommodating and transporting apparatus shown in FIG. 29.

The printer 84 performs a printing operation in order to issue a receipt on the scanning cart 100. The sensor 85 is provided in the proximity of an upper opening of the basket section 102 as shown in FIG. 31 for optically detecting accommodation of a commodity 50 into the basket section 102 (particularly an unjust act of accommodation without scanning). The commodity information file 86 is an ordinary PLU file and stores commodity information such as the commodity numbers, the commodity names, the prices (unit prices) and so forth corresponding to commodity code information.

The control system of the scanning cart 100 in the present embodiment is functionally constructed in such a manner as shown in FIG. 29.

In particular, referring to FIG. 29, the CPU 51 of the scanning cart 100 has functions as the weight determination section 51a similar to that of the first embodiment and the commodity information retrieval section (commodity weight retrieval section) 51f and the commodity code registration section 51i similar to those of the second embodiment and further has functions as a main control section 51A and a notification section 51B.

The main control section 51A controls the CPU 51 and receives data inputted thereto from the upper control section by way of the communication section 53, key input data (input data from the end key, a purchase continuing key, a receipt issuance key and so forth) from the keyboard section 55, a detection signal from the sensor 85 and so forth to perform various functions (a display controlling function for the display section 54, a print controlling function for the printer 84, a function as a power on/off driving section and so forth) as hereinafter described.

The notification section 51B notifies, when data of a prepaid card 87 cannot be updated by the communication section 83*b* of the communication section 83, this to the main control section 51A and causes the display section 54 to display this as hereinafter described.

The communication section 83 is constituted from a communication section 83*a*, a communication section 83*b* and a communication section 83*c*.

The communication section 83*a* reads remains information of a prepaid card 87 inserted therein. The communication section 83*b* subtracts the price of a commodity 50 detected by the commodity information retrieval section 51*f* from remains information read by the communication section 83*a*, and registers a result of the subtraction as remains information of the prepaid card 87 to update the prepaid card 87.

The communication section 83*c* discharges a prepaid card 87 whose data have been updated by the communication section 83*b*.

In this instance, in the present embodiment, when the remains read by the prepaid card inputting processing section 31 are smaller than the price of a commodity 50 retrieved by the commodity information retrieval section 51*f* and consequently the data of the prepaid card 87 cannot be updated by the communication section 83*b*, the notification section 51B is activated in response to a signal from the communication section 83*b* so that this is notified to the main control section 51A and displayed on the display section 54.

Further, in the present embodiment, when it is displayed on the display section 54 based on the notification from the notification section 51B that the remains are short, the customer who refers to the display section 54 can select whether it depresses the purchase continuing key (not shown) of the keyboard section 55 and inserts a second prepaid card 87 into the communication section 83 (communication section 83*a*) to continue its purchasing processing or it depresses the end key (not shown) of the keyboard section 55 to end the purchasing processing (function as selection section).

Further, in the present embodiment, the receipt issuance key (not shown, receipt issuance selection section) is provided on the keyboard section 55, and a customer can select whether issuance of a receipt by the printer (receipt issuance section) 84 is necessary or unnecessary depending upon whether or not the customer depresses the receipt issuance key upon ending of the purchase.

It is to be noted that the main control section 51A in the present embodiment has a function as a power on/off driving section which automatically turns the power source (56) of the scanning cart 100 on or off in response to a power on/off instruction when the instruction is received from the upper management section (not shown) such as a station controller by way of the communication section (data reception section) 53.

Further, also in the present embodiment, the weight determination section 51*a* similar to that of the first embodiment is provided in the scanning cart 100, and when it is determined by the weight determination section 51*a* that the total weight of the commodities 50 in the basket section 102 measured by the weighing equipment 58 has increased without reading a bar code 50*a* by means of the scanner 57, a sounding operation of the buzzer 59 and an alarm display of the display section 54 are performed.

Simultaneously with this, the main control section 51A in the present embodiment has a function of causing a sounding operation of the buzzer 59 and an alarm display of the display section 54 to be performed also when a detection signal from the sensor 85 is received to detect an accommodation operation of a commodity 50 into the basket section 102 without reading a bar code 50*a* by means of the scanner 57.

Figure 32:
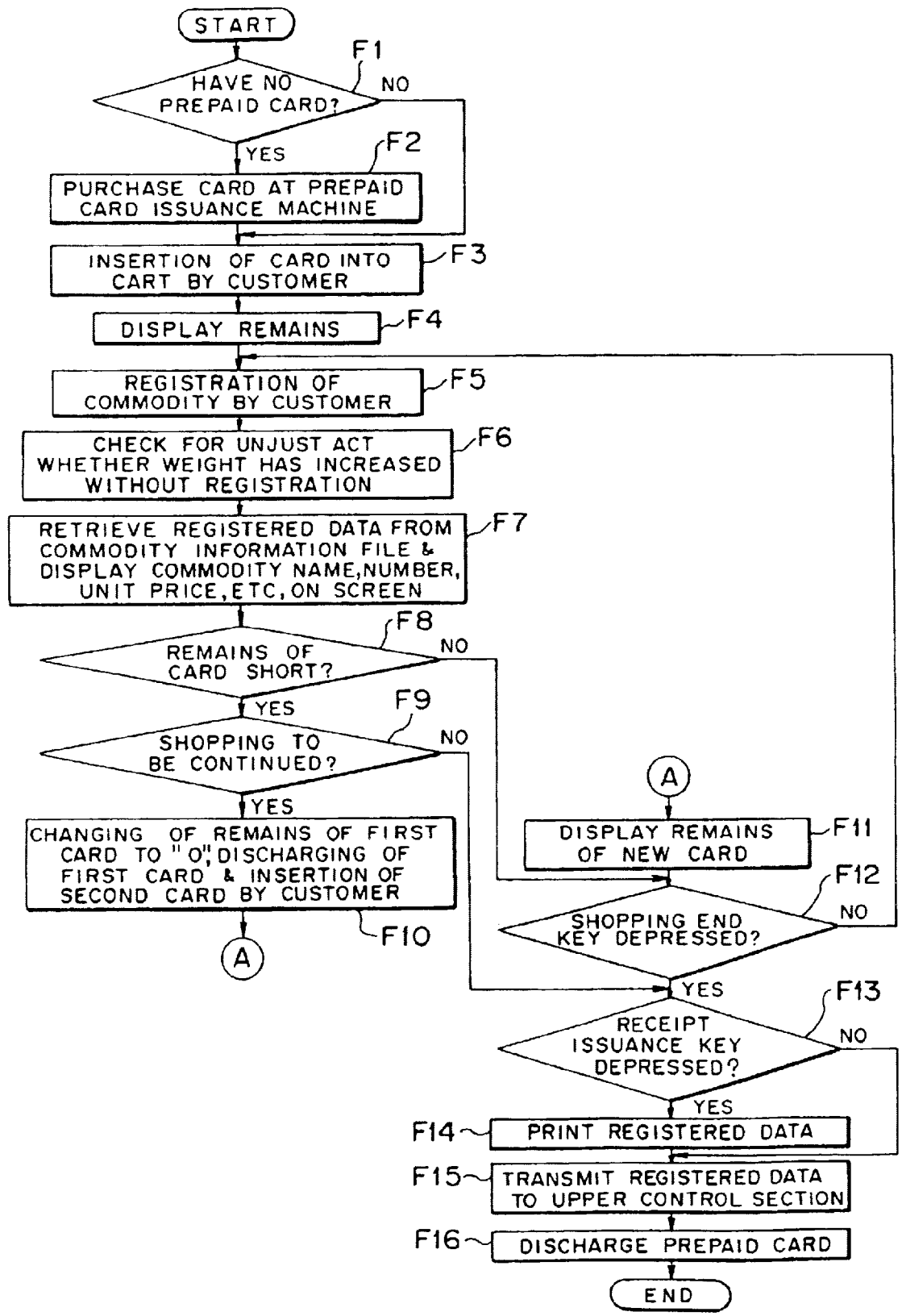
FIG. 32 is a flow chart illustrating operation of the purchased commodity accommodating and transporting apparatus shown in FIG. 29.

The scanning cart 100 of the sixth embodiment of the present invention having the construction described above operates in such a manner as illustrated in FIG. 32. Referring to FIG. 32, when a customer does not have a prepaid card 87 (step F1), it will purchase a prepaid card 87 at a prepaid card issuance machine (not shown) (step F2) and insert the prepaid card 87 into the communication section 83 of the scanning cart 100 (step F3). At a point of time when the prepaid card 87 is inserted into the communication section 83 in this manner, remains information of the prepaid card 87 is read by the communication section 83*a* and displayed on the display section 54 (step F4).

Then, the customer reads the bar code 50*a* applied to a commodity 50 to be purchased by means of the scanner 57 to register commodity code information of the bar code 50*a* into the storage section 52 and places or stores the commodity into the basket section 102 (step F5).

It is to be noted that, in the present embodiment, while a customer uses the scanning cart 100 in order to purchase commodities, the total weight of the commodities 50 in the basket section 102 of the scanning cart 100 is normally monitored by the weighing equipment 58 and the weight determination section 51*a* and unjust accommodation of a commodity 50 is monitored by the sensor 85, and when it is determined that the total weight of the commodities 50 in the basket section 102 from the weighing equipment 58 has increased without scanning a bar code 50*a* or when an accommodation operation of a commodity 50 into the basket section 102 is detected by the sensor 85, a warning to the customer (checking of an unjust act) is immediately given there by a sounding operation of the buzzer 59 and an alarm display of the display section 54 (step F6).

Then, when the customer reads the bar code 50*a* of a commodity 50 to be purchased by means of the scanner 57, commodity information such as the commodity number, the commodity name, the price (unit price) and so forth of the commodity corresponding to the commodity code information is retrieved from the commodity information file 66 by the commodity information retrieval section 51*f*, and the thus retrieved commodity information is displayed on the display section 54 (step F7).

Thereafter, the communication section 83*b* of the communication section 83 registers a result of subtraction of the retrieved price of the commodity 50 from the remains information of the prepaid card 87 as new remains information of the prepaid card 87 to update the prepaid card 87 thereby to effect settlement of the accounts for the commodity 50.

In this instance, when it is determined that the remains information of the prepaid card 87 is short, that is, when the determination at step F8 is YES, the shortage of the remains is notified by the notification section 51B and displayed on the display section 54, and the customer thus refers to the display and selects whether it depresses the purchase continuing key of the keyboard section 55 and inserts a second prepaid card 87 into the communication section 83 to continue the purchasing processing (determination of YES at step F9) or it depresses the end key of the keyboard section 55 to end the purchasing processing (determination of NO at step F9).

When the continuing processing is selected, the remains information of the first prepaid card 87 is updated to "0" by the communication section 83*b* and the prepaid card 87 is discharged from the communication section 83*c* (step F10), and then the remains information of the second prepaid card 87 inserted by the customer is read by the communication section 83*a* and displayed on the display section 54 (step F11).

The processes at the steps F5 to F11 are repeated until the customer depresses the end key of the keyboard section 55 to effect inputting of ending of use (step F12).

After the customer depresses the end key of the keyboard section 55 to end its purchasing (when the determination at step F9 is NO or when the determination at step F12 is YES), it is determined whether or not the receipt issuance key of the keyboard section 55 is depressed (step F13). When it is depressed, the registered data in the storage section 52 are printed by the printer 84 to issue a receipt (step F14).

After issuance of a receipt or determination of NO at step F13, the registered data in the storage section 52 are transmitted to the upper control section by way of the communication section 53 by the main control section 51A (step F15), and then the prepaid card 87 is discharged by the communication section 83*c* (step F16). Then, the customer receives the receipt from the printer 84 and the prepaid card 87 discharged from the communication section 83, thereby completing the settlement processing of the accounts.

It is to be noted that, in the scanning cart 100 in the present embodiment, when the business of the store starts, the power is automatically supplied by the main control section 51A in response to a power-on instruction transmitted from the upper control section, and when the business of the store ends, the power supply is automatically stopped by the main control section 51A. In other words, the power on/off of the scanning cart 100 can be managed without artificial operation of a customer, an operator or some other person.

In this manner, according to the sixth embodiment of the present invention, since final settlement of accounts, which is conventionally performed by a settlement POS terminal, can be performed by self service using a prepaid card 87, not only reduction of the burden on an operator and reduction of the number of operators can be achieved, but the waiting time at a settlement POS terminal is eliminated at all and a disagreeable feeling arising from such waiting time is not given to a customer. Accordingly, remarkable reduction of the shopping time and/or remarkable enhancement in convenience in a self shopping form can be realized.

Further, according to the present embodiment, since, when it is determined by the weight determination section 51*a* or the sensor 85 that a commodity 50 has been accommodated into the basket section 102 without scanning the bar code 50*a*, a sounding operation of the buzzer 59 and an alarm display of the display section 54 are immediately performed there to give a warning to the customer, such an unjust act that a customer carries out a commodity without performing reading of the commodity code whether it is intentional or accidental can be prevented with certainty in a POS system wherein all steps up to final settlement of accounts are performed by self service.

It is to be noted that, while, in the embodiment described above, data are updated by the communication section 83*b* each time commodity code information is read by the scanner 57, another construction wherein, after completion of the shopping, a total amount of money for commodities purchased in the current shopping is calculated in accordance with registered data registered in the storage section 52 and the total amount of money is subtracted from the remains information at the communication section 83*b* may be employed alternatively.

Figure 33:
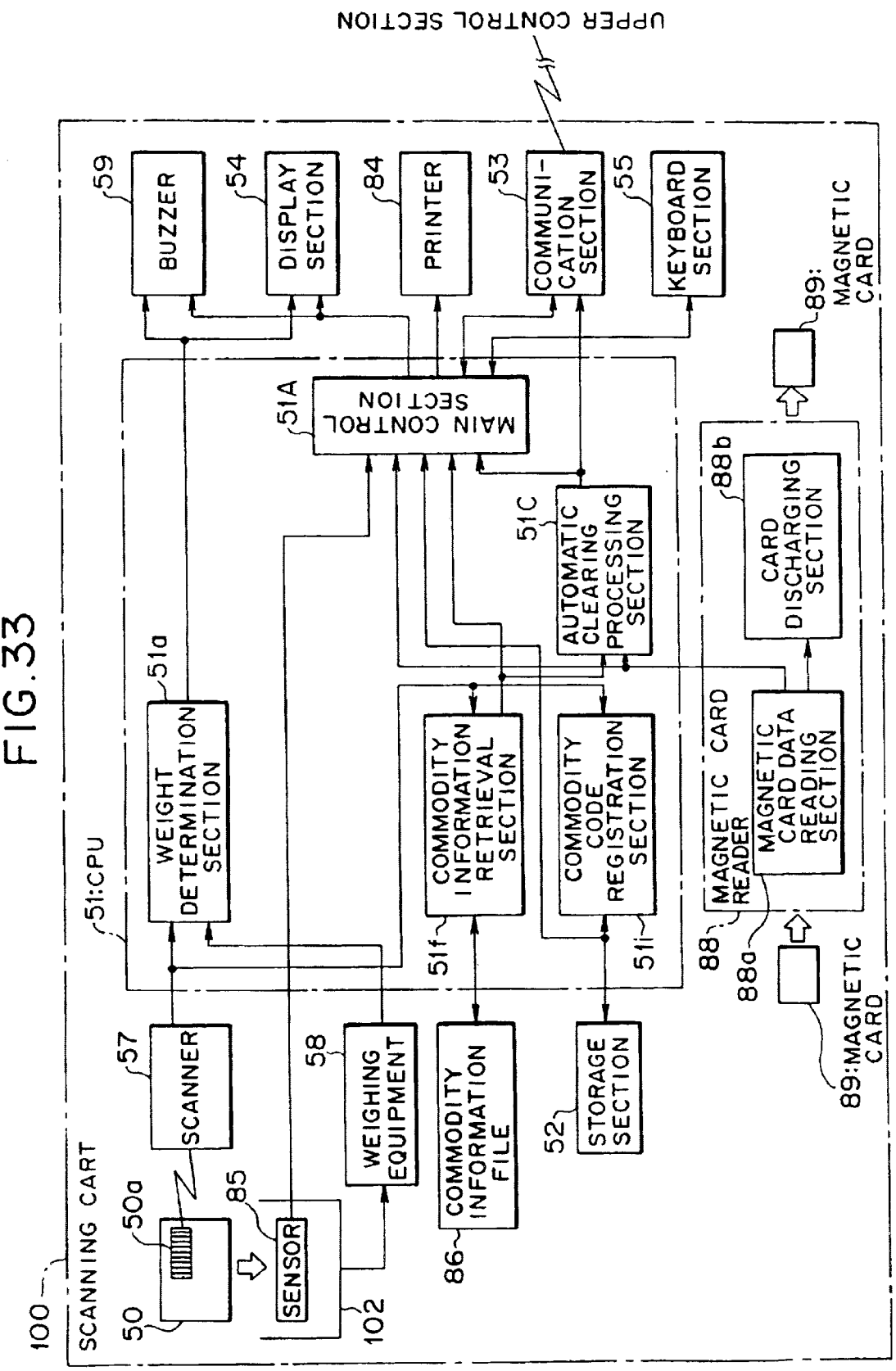
FIG. 33 is a block diagram showing a functional construction of a modification to the purchased commodity accommodating and transporting apparatus shown in FIG. 29.

Further, while, in the embodiment described above, a prepaid card 87 is used, another construction that a credit card or a bank card is used in place of the prepaid card 87 and the payment is deferred while the settlement of accounts is performed by self service may be employed alternatively. In this instance, in place of the communication section 83 and the notification section 51B shown in FIG. 29, a magnetic card reader 88 and an automatic clearing processing section 51C are provided as shown in FIG. 33.

In particular, the magnetic card reader 88 includes a magnetic card data reading section 88*a* for receiving a magnetic card 89 such as a bank card to read magnetic information of the magnetic card 89, and a card discharging section 88*b* for discharging such magnetic card 89 after completion of the processing.

The automatic clearing processing section 51C calculates, after completion of shopping, when a personal identification number inputted from the keyboard section 55 by a customer and personal identification number data included in the magnetic information from the magnetic card data reading section 88*a* coincide with each other, a total amount of money of commodities purchased in the current shopping in accordance with registered data registered in the storage section 52 (prices of the commodities 50 retrieved by the commodity information retrieval section 51*f*), and transmits automatic clearing processing data to the upper control section by way of the communication section 53 so that the amount of money may be automatically paid later from an account corresponding to the magnetic information from the magnetic card data reading section 88*a*.

With such construction, final settlement of accounts can be performed by self service even where a magnetic card 89 such as a bank card or a credit card is used.

It is to be noted that, where the magnetic card reader 88 and the automatic clearing processing section 51C described above are provided together with the communication section 83 and the notification section 51B, the scanning cart 100 on which settlement of accounts can be performed using any of a prepaid card 87 and a magnetic card 89 such as a bank card or a credit card can be constructed.

Further, while, the commodity information file 86 in the embodiment described above is provided in the control system of the scanning cart 100, the commodity information file may alternatively be provided in the upper control section. In this instance, retrieval of price information is performed by way of communications between the commodity information retrieval section 51*f* and the upper control section having the commodity information file by way of the communication section 53.

Further, while, in the embodiment described above, commodity code information read from the bar code 50*a* of a commodity 50 by the scanner 57 is registered or stored into the storage section 52 in the scanning cart 100 by the commodity code registration section 51*i*, another construction wherein the commodity code information is transmitted to the upper control section by way of the communication section 53 so that it may be stored into the storage section of the upper control section may alternatively be employed.

Furthermore, while, in the embodiments described above, a purchased commodity accommodating and transporting apparatus having a self scanning function of the present invention is a shopping cart, the present invention can be applied to a shopping basket or the like in a similar manner as described above. Also in this instance, similar effects to those of the embodiments described above can be obtained.

The present invention is not limited to the specifically described embodiment, and variations and modifications may be made without departing from the scope of the present invention.

What is claimed is:

1. An independently mobile shopping cart, which is movable in a shop to collect and purchase one or more commodities, comprising:
   a cart body for carrying the one or more commodities; and
   a payment processor for handling a payment for the commodities with a prepaid card, having
   a commodity code reader for reading a commodity code applied to the individual commodity,
   a commodity price identifying section for identifying the price of the individual commodity based on the commodity code read by said commodity code reader,
   a prepaid card reader for reading information about a current remainder of prepayment from the prepaid card, and
   a registering section for subtracting the price of the individual commodity identified by said commodity price identifying section from the current remainder of prepayment read by said prepaid card reader, and registering the result of the subtraction on the prepaid card as a new remainder of prepayment without any communication with an external processor or computer.

2. An independently mobile shopping cart as defined in claim 1, wherein said payment processor further comprises a indicating section for indicating, if necessary, that the current remainder read by said prepaid card reader is insufficient for the price of the individual commodity identified by said commodity price identifying section.

3. An independently mobile shopping cart as defined in claim 2, wherein said payment processor further comprises:
   a first selecting section for selecting, when the current remainder is insufficient for the individual price of the commodity, either (i) to carry out the payment with another prepaid card or (ii) to cancel the payment, and controlling said prepaid card reader and said remainder registering section accordingly.

4. An independently mobile shopping cart as defined in claim 3, wherein said payment processor further comprises a receipt issuing section for issuing a receipt upon completion of the payment.

5. An independently mobile shopping cart as defined in claim 4, wherein said payment processor further comprises:
   a second selecting section for choosing whether or not to receive a receipt for the payment, and controlling said receipt issuing section accordingly.

6. An independently mobile shopping cart as defined in claim 2, wherein said payment processor further comprises:
   a receipt issuing section for issuing a receipt upon completion of the payment.

7. An independently mobile shopping cart as defined in claim 6, wherein said payment processor further comprises:
   a second selecting section for choosing whether or not to receive a receipt for the payment, and controlling said receipt issuing section accordingly.

8. An independently mobile shopping cart as defined in claim 1, wherein said payment processor further comprises:
   a receipt issuing section for issuing a receipt upon completion of the payment.

9. An independently mobile shopping cart as defined in claim 8, wherein said payment processor further comprises:
   a second selecting section for choosing whether or not to receive a receipt for the payment, and controlling said receipt issuing section accordingly.

10. An independently mobile shopping cart as defined in claim 1, wherein said payment processor further comprises:
    an instruction receiver for receiving a power on/off instruction from an external management apparatus; and
    a power on/off section for automatically turning on/off the power of said payment processor in response to the power on/off instruction received by said data reception section.

11. An independently mobile shopping cart as defined in claim 10, wherein said payment processor further comprises:
    a measuring section for measuring the total weight of the commodities carried by said cart body;
    a observing section for observing whether a change in the total weight measured by said measuring section accompanies the reading operation of the commodity code by said commodity code reader; and
    an alarm generating section for generating an alarm when said observing section observes that any change in the total weight does not accompany the reading operation of the commodity code.

12. An independently mobile shopping cart as defined in claim 1, wherein said payment processor further comprises:
    a measuring section for measuring the total weight of the commodities carried by said cart body;
    an observing section for observing whether a change in the total weight measured by said measuring section accompanies the reading operation of the commodity code by said commodity code reader; and
    an alarm generating section for generating an alarm when said observing section observes that any change in the total weight does not accompany the reading operation of the commodity code.

* * * * *